US011115735B2

(12) United States Patent
Rousseaux et al.

(10) Patent No.: US 11,115,735 B2
(45) Date of Patent: Sep. 7, 2021

(54) RECONFIGURABLE OPTICAL NETWORKS

(71) Applicant: COMMSCOPE TECHNOLOGIES LLC, Hickory, NC (US)

(72) Inventors: Olivier Hubert Daniel Yves Rousseaux, Brussels (BE); Joseph Christopher Coffey, Burnsville, MN (US); David James Mather, Altrincham (GB); John Charles Chamberlain, Hickory, NC (US); Erik J. Gronvall, Bloomington, MN (US); Peter Merlo, Holsbeek (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 16/617,852

(22) PCT Filed: May 30, 2018

(86) PCT No.: PCT/US2018/035169
§ 371 (c)(1),
(2) Date: Nov. 27, 2019

(87) PCT Pub. No.: WO2018/222740
PCT Pub. Date: Dec. 6, 2018

(65) Prior Publication Data
US 2020/0196035 A1 Jun. 18, 2020

Related U.S. Application Data

(60) Provisional application No. 62/512,380, filed on May 30, 2017, provisional application No. 62/625,590, filed on Feb. 2, 2018.

(51) Int. Cl.
*H04B 10/00* (2013.01)
*H04Q 11/00* (2006.01)
(Continued)

(52) U.S. Cl.
CPC ....... *H04Q 11/0062* (2013.01); *G02B 6/3596* (2013.01); *H04B 10/40* (2013.01);
(Continued)

(58) Field of Classification Search
USPC ...................................... 398/43–57
See application file for complete search history.

(56) References Cited

U.S. PATENT DOCUMENTS 7,124,143 B2 * 10/2006 Matsunami ........... G06F 3/0605
7,137,742 B2 * 11/2006 Theuerkorn ......... G02B 6/3831
385/53
(Continued)

FOREIGN PATENT DOCUMENTS

WO 2012/112344 A1 8/2012
WO 2012/152343 A1 11/2012
(Continued)

OTHER PUBLICATIONS

International Search Report and Written Opinion of the International Searching Authority for International Patent Application No. PCT/US2018/035169 dated Sep. 20, 2018, 17 pages.
(Continued)

*Primary Examiner* — Agustin Bello
(74) *Attorney, Agent, or Firm* — Merchant & Gould P.C.

(57) ABSTRACT

Switching technology may be incorporated into various systems, components, and/or architectures in a fiber optic network to promote network reconfigurability and design flexibility. A signal access unit comprises an input, an output, an access port, a switch arrangement including a switch, and a controller. The switch optically couples the input to the output and not to the access port when in a first configuration, and optically couples the access port to at least one of the input and the output without optically coupling the input and the output together when in a second
(Continued)

configuration. The controller is configured to receive an indication of a selected wavelength and to operate the switch arrangement to change the switch between the first and second configurations based on the indication of the selected wavelength.

34 Claims, 38 Drawing Sheets

(51) Int. Cl.
*G02B 6/35* (2006.01)
*H04B 10/40* (2013.01)
*H04J 14/02* (2006.01)

(52) U.S. Cl.
CPC ........ *H04J 14/021* (2013.01); *H04Q 11/0005* (2013.01); *G02B 6/3518* (2013.01); *G02B 6/3522* (2013.01); *G02B 6/3538* (2013.01); *H04Q 2011/0015* (2013.01); *H04Q 2011/0016* (2013.01); *H04Q 2011/0079* (2013.01)

(56) References Cited

U.S. PATENT DOCUMENTS

| | | | | |
|---|---|---|---|---|
| 7,146,090 B2* | 12/2006 | Vo | ............ | G02B 6/387 385/138 |
| 7,218,827 B2* | 5/2007 | Vongseng | ............ | G02B 6/445 385/135 |
| 7,244,066 B2* | 7/2007 | Theuerkorn | ......... | G02B 6/3825 385/53 |
| 7,397,997 B2* | 7/2008 | Ferris | ............ | G02B 6/3897 385/134 |
| 7,512,304 B2* | 3/2009 | Gronvall | ............ | G02B 6/4477 385/135 |
| 7,568,844 B2* | 8/2009 | Luther | ............ | G02B 6/3869 385/52 |
| 7,572,065 B2* | 8/2009 | Lu | ............ | G02B 6/3877 385/78 |
| 7,744,288 B2* | 6/2010 | Lu | ............ | G02B 6/3894 385/60 |
| 7,816,602 B2* | 10/2010 | Landry | ............ | G02B 6/4452 174/50 |
| 7,844,158 B2* | 11/2010 | Gronvall | ............ | G02B 6/4471 385/135 |
| 8,213,760 B2* | 7/2012 | Rudenick | ............ | G02B 6/4455 385/135 |
| 8,556,520 B2* | 10/2013 | Elenbaas | ............ | G02B 6/3887 385/55 |
| 8,672,705 B2* | 3/2014 | Schneider | ............ | H01R 13/5816 439/460 |
| 8,989,550 B2* | 3/2015 | Allen | ............ | G02B 6/4454 385/135 |
| 9,348,096 B2* | 5/2016 | Kmit | ............ | H04B 10/25 |
| 9,948,082 B2* | 4/2018 | Coenegracht | ........ | H02G 15/013 |
| 2005/0018959 A1* | 1/2005 | Wachsman | ............ | H04J 14/0212 385/24 |
| 2006/0072918 A1 | 4/2006 | Gerstel et al. | | |
| 2015/0358109 A1* | 12/2015 | D'Errico | ............ | H04Q 11/0005 398/19 |
| 2018/0045893 A1* | 2/2018 | Huybrechts | ............ | G02B 6/125 |
| 2020/0196035 A1* | 6/2020 | Rousseaux | ............ | H04B 10/40 |

FOREIGN PATENT DOCUMENTS

| | | |
|---|---|---|
| WO | 2013/117598 A2 | 8/2013 |
| WO | 2015/048198 A1 | 4/2015 |
| WO | 2015/150204 A2 | 10/2015 |
| WO | 2016/043922 A1 | 3/2016 |
| WO | 2016/100384 A1 | 6/2016 |
| WO | 2016/107769 A1 | 7/2016 |
| WO | 2016/131825 A1 | 8/2016 |
| WO | 2017/009468 A1 | 1/2017 |
| WO | 2017/068170 A1 | 4/2017 |
| WO | 2017/134285 A1 | 8/2017 |
| WO | 2017/134286 A1 | 8/2017 |
| WO | 2017/134287 A1 | 8/2017 |
| WO | 2017/191224 A1 | 11/2017 |
| WO | 2018/049398 A1 | 3/2018 |
| WO | 2018/049399 A1 | 3/2018 |
| WO | 2018/126173 A1 | 7/2018 |
| WO | 2018/136552 A1 | 7/2018 |
| WO | 2019/035918 A1 | 2/2019 |
| WO | 2019/111051 A2 | 6/2019 |

OTHER PUBLICATIONS

U.S. Appl. No. 62/512,286, filed May 30, 2017, 47 pages.
Extended European Search Report for European Patent Application No. 18810793.2 dated Feb. 19, 2021, 9 pages.

* cited by examiner

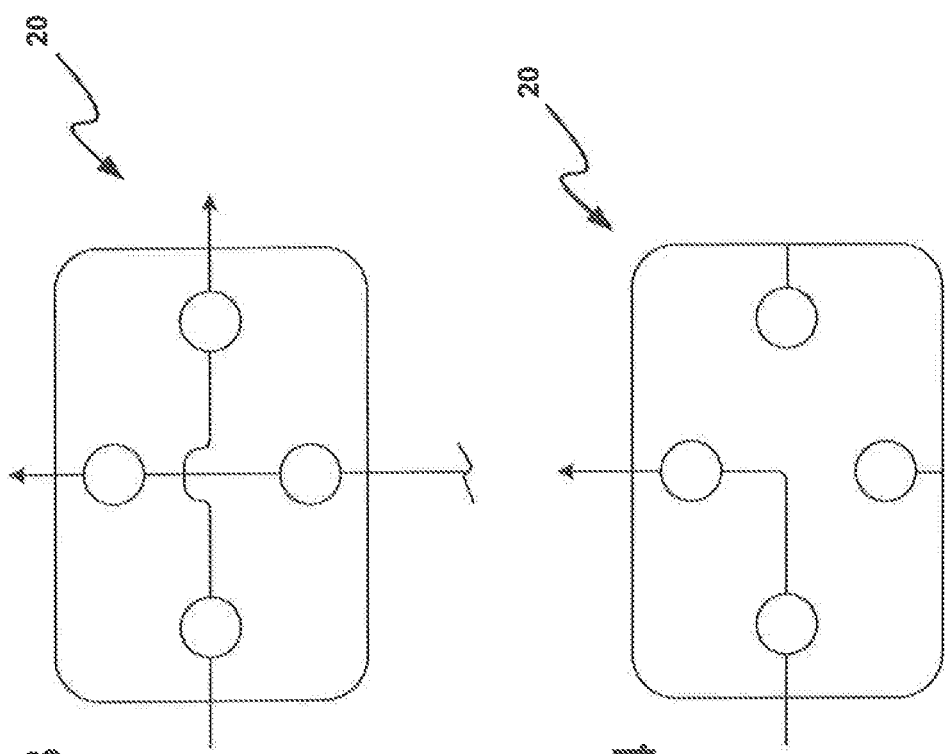

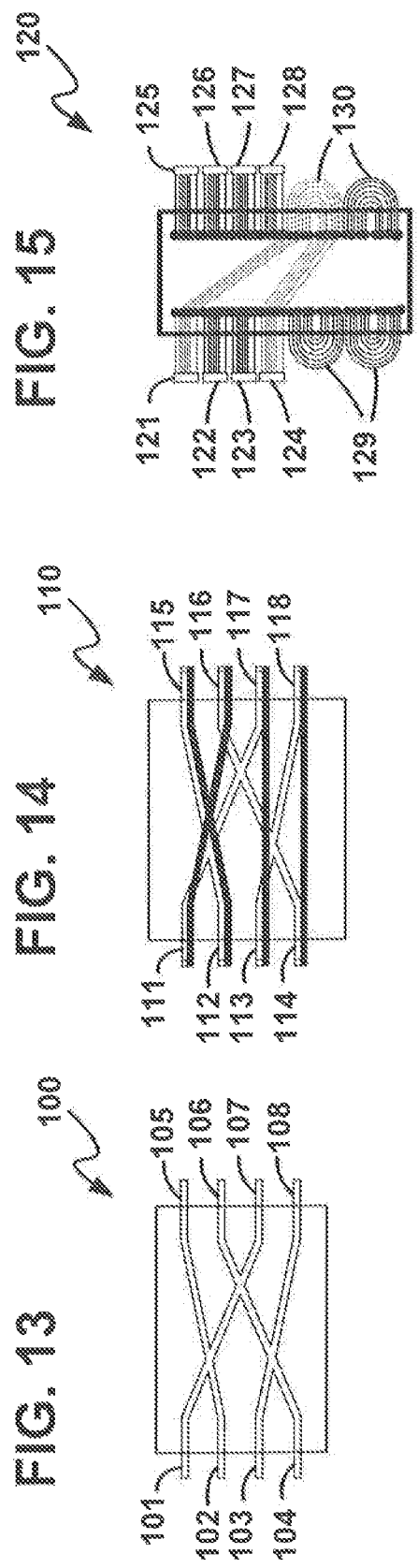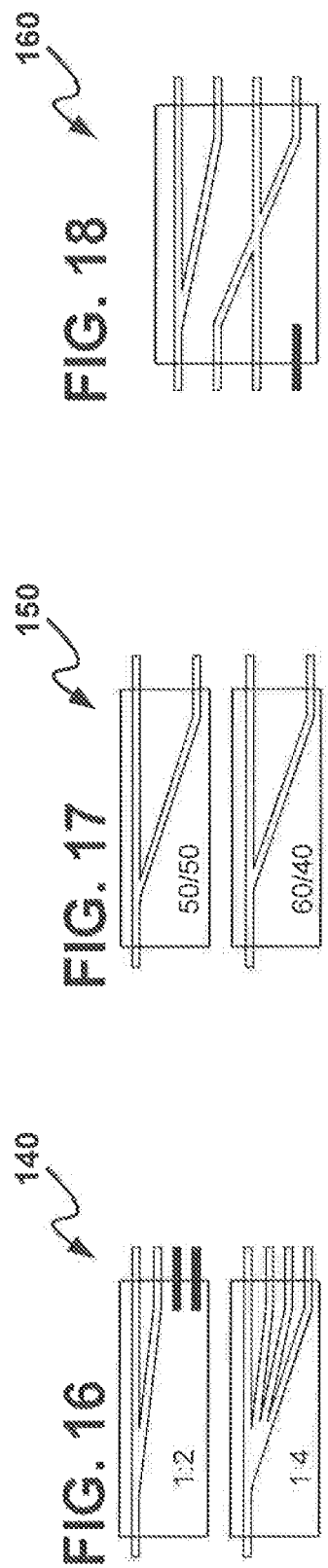

RECONFIGURABLE OPTICAL NETWORKS

CROSS-REFERENCE TO RELATED APPLICATIONS

This application is a National Stage Application of PCT/US2018/035169, filed on May 30, 2018, which claims the benefit of U.S. Patent Application Ser. No. 62/512,380, filed on May 30, 2017, and claims the benefit of U.S. Patent Application Ser. No. 62/625,590, filed on Feb. 2, 2018, the disclosures of which are incorporated herein by reference in their entireties. To the extent appropriate, a claim of priority is made to each of the above disclosed applications.

TECHNICAL FIELD

The present disclosure relates generally to fiber optic network architectures and optical components and devices integrated in fiber optic networks.

BACKGROUND

One traditional type of fiber optic network has a tapered configuration that expands as the network extends outwardly from a central location (e.g., a service provider central office, data center, headend, mobile switching center or the like) toward the outer edge of the network. Generally, the network radiates outwardly from a main trunk with subscribers being serviced by branches that cover regions close to the trunk, regions at intermediate locations relative to the trunk and outer regions furthest from the trunk at the outer edge of the network. The network can include branch locations (e.g., junctions) where branch lines radiate outwardly from feeder/distribution lines to expand the network. The branch locations can include closures such as fiber distribution hubs, splice terminals, drop terminals and the like. Typically, the optical fiber density of the network decreases as the network extends outwardly from the central location, with all communications being routed through the central location.

SUMMARY

As indicated above, in a typical tapered network, communication transmitted between different locations at the edge of the network are routed through the central location. Aspects of the present disclosure relate to the use of reconfigurable switching technology integrated at branch locations of the network to overlay a mesh network on top of the tapered architecture. In certain examples, the overlaid mesh network enables direct point to point connection of two points in the network without requiring signals to pass through the central location. Thus, the central location is by-passed. In certain examples, computing (e.g., baseband processing, miniature data center functionality, etc.) can be provided at locations throughout the network including, for example, at the edge of the network. In certain examples, non-centralized computing (e.g., edge computing) can be used to support centralized/cloud radio access networks (CRAN) integrated within the network. The centralized radio access networks can include CRAN hubs with localized edge computing power (e.g., baseband unit functionality). The CRAN hubs can support cellular/radio cites such as macro cells and small cells. The CRAN hubs can form sub-networks interwoven with the main network.

Aspects of the present disclosure relate to optical switching structures (e.g., total internal reflection (TIR) switches and/or adiabatic switches and/or micro-electrical mechanical switches (MEMS) and related devices/components incorporating such switches) which can be integrated throughout a fiber optic network (e.g., from core to edge) to enhance network agility, initial configurability and re-configurability. In certain examples, the components incorporating switching technology can include fiber distribution hubs, optical termination enclosures, multi-service terminals, splice enclosures, splice cabinets, tap modules, splitter modules, indexing modules, factory installed cable break-out locations and the like. In certain examples, the switching architecture can provide switching matrices (e.g., N×N matrices), loop-back switching, cross-connect switching, switching to drop lines and other switching. In certain examples, the switching architectures can provide devices with reconfigurable tap ratios, reconfigurable split ratios, reconfigurable optical power outputs, customizable optical power outputs and the like. In certain examples, switching architectures in accordance with the principles of the present disclosure can be integrated with wavelength division multiplexing and de-multiplexing equipment to provide enhanced agility, connection options, initial configurability option and subsequent re-configurability options.

The present disclosure also is directed to a reconfigurable signal access unit that receives an input of optical signals having a plurality of different wavelengths. The signal access unit has a main output and at least one access port. The signal access unit is configured to selectively direct optical signals having a selected wavelength between the input and the access port and/or between the access port and the output. Optical signals not having the selected wavelength pass through the signal access unit between the input and the main output.

For convenience, the signal access unit is referred to selecting a particular wavelength throughout the specification. It will be understood, however, that the signal access unit also could select a wavelength band (i.e., multiple wavelengths within a particular range).

In certain implementations, the signal access unit has multiple access ports. In such implementations, each access port is associated with a different selected wavelength. Accordingly, optical signals having a first selected wavelength are directed to a first access port and optical signals having a second selected wavelength are directed to a second access port. Non-selected wavelengths are passed between the input and the main output.

In some implementations, the signal access unit can be pre-programmed to select a particular wavelength or wavelengths to direct to the access port or ports. In other implementations, the signal access unit is configured to receive an indication of a selected wavelength or wavelengths. For example, the signal access unit may include a user interface (e.g., buttons, touch screen, etc.) that enables a user to input a selected wavelength or wavelengths. In another example, the signal access unit may include a controller input port at which the signal access unit may be coupled to a management network. Accordingly, the signal access unit is reconfigurable throughout the life of the signal access unit so that the wavelength associated with an access port can be changed.

In some implementations, the access port is a drop port to which optical signals from the input that have the selected wavelength are directed. In other implementations, the access port is an add port at which optical signals having the selected wavelength can be directed to the main output. In still other implementations, the access port is an add/drop port at which optical signals can be received from the input and from which optical signals can be directed to the output.

In certain implementations, only a portion of an optical signal (i.e., a percentage of the power) having the selected wavelength is tapped off and optically coupled to the access port. A remainder of the optical signal is directed to the main output.

The access port receive optical signals having the respective selected wavelength. In certain implementations, a plug-in module can be disposed at the access port to receive a connectorized end of a cable and to convert signals carried by the cable to optical signals having the selected wavelength. In an example, the plug-in module may be configured to convert between an electrical signal and the optical signal having the selected wavelength. In another example, the plug-in module may be configured to convert between an optical signal having a full wavelength spectrum and the optical signal having the selected wavelength.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 3 is another schematic representation of the total internal reflection optical switch of FIG. 1 shown in the bar state;

FIG. 4 is another schematic representation of the total internal reflection optical switch of FIG. 1 shown in the cross state;

FIG. 13 schematically illustrates an example switching matrix that can be used in devices and configurations in accordance with the principles of the present disclosure;

FIG. 14 illustrates another switching matrix including multiplexing and de-multiplexing capabilities that can be incorporated into devices and configurations in accordance with the principles of the present disclosure;

FIG. 15 illustrates a block switching and loop-back switching configuration that can be incorporated into devices and configurations in accordance with the principles of the present disclosure;

FIG. 16 illustrates an example reconfigurable splitting system that can be integrated into devices and configurations in accordance with the principles of the present disclosure;

FIG. 17 illustrates an arrangement for reconfiguring optical power that can be integrated into devices and systems in accordance with the principles of the present disclosure:

FIG. 18 illustrates an arrangement including combined switching and splitting capabilities that can be integrated into devices and configurations in accordance with the principles of the present disclosure;

DETAILED DESCRIPTION

I. System Overview

Figure 2:
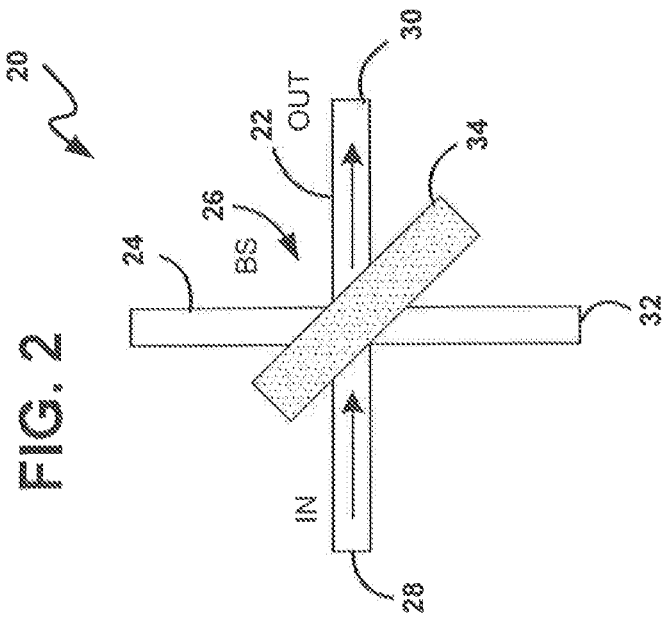
FIG. 2 schematically illustrates the total internal reflection switch of FIG. 1 in a bar state.

The present disclosure relates generally to fiber optic networks and to equipment/components integrated within fiber optic networks. Certain aspects of the present disclosure relate to fiber optic networks having switching technology integrated into the network at various locations between a central location of the network and an outer edge of the network. In certain examples, the switching technology can have low power consumption and a compact configuration. In certain examples, switching technology can be incorporated within various equipment/components of the fiber optic network. Example equipment/components that can incorporate switching technology can include fiber distribution hubs (FDH), optical splicing enclosures (OSE), optical termination enclosures (OTE) and multi-service terminals (MST). In certain examples, the switching technology within the fiber optic network can assist in allowing the fiber optic network to be readily re-configurable. In certain examples, the switching technology allows the fiber optic network to be reconfigured while substantially reducing or eliminating the need for truck roll-outs. Thus, portions of the fiber optic network distant from the core/center of the network can be reconfigured without requiring technician visits. Furthermore, the switching technology and ability to reconfigure the system can allow for deployed optical fiber of the system to be used more efficiently by reconfiguring the system over time to match fiber capacity with customer demand so as to optimize network resource usage. Additionally, optical switching in the network can be used to allow the network to operate in a mesh-type architecture in which point-to-point communication between different points at the edge of the network is facilitated without requiring signaling to pass through the central location of the network. Additionally, automated switching can facilitate faster customer turn-ups, can reduce patching mistakes, and can provide automated documentation of port assignment information.

II. Optical Switching Platform

In certain examples, optical switching systems in accordance with the principles of the present disclosure can relate to optical switching systems integrated on a chip. In certain examples, the optical switching systems can include photonic integrated circuits (PIC) or planar light wave circuits (PLC). In certain examples, the optical switching circuits can include totally internally reflecting waveguide (TIRW) switches or adiabatic coupler switches. An example of an adiabatic coupler switch can include electro-wetting on a dielectric (EWOD)-activated optical switch. In certain examples, the switching systems can be made using a silicon platform. Example silicon platforms can include a silicon on insulator (SOI) platform or a silicon nitride (SiN) platform. An advantage of silicon platforms relate to the ability to provide compact, high density optical circuits. Additionally, this type of optical circuit can be made using existing CMOS (complementary metal oxide semiconductor) processing. This type of processing provides high yields at relatively low cost.

Figure 1:
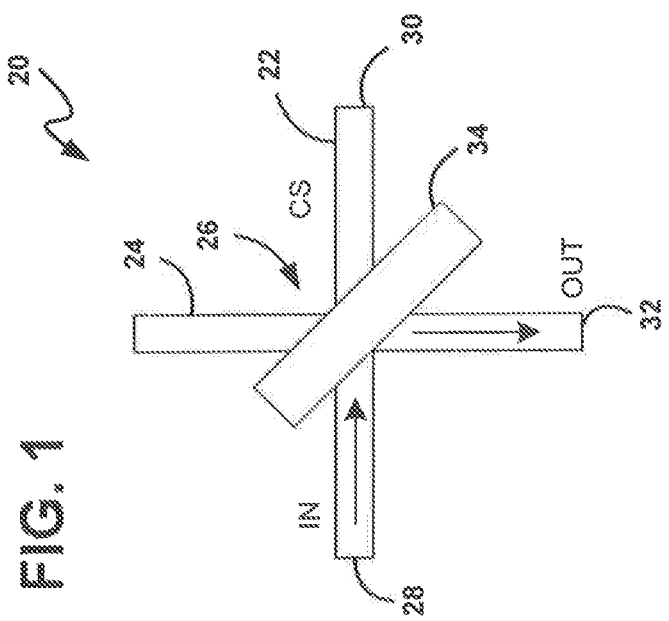
FIG. 1 schematically shows a total internal reflection optical switch that can be incorporated into devices in accordance with the principles of the present disclosure, the optical switch is shown in a cross state.

FIGS. 1 and 2 show an example opto-fluidics total internal reflection switch 20 that is one example of a type of switch that can be incorporated into switching devices in accordance with the principles of the present disclosure. The TIR switch 20 includes first and second waveguides 22, 24 that cross at an optical interface 26. The TIR switch 20 includes an input 28 and a first output 30 positioned on opposite sides of the optical interface 26. The second waveguide 26 defines a second output 32 of the TIR switch 20. A slot 34 passes through the first and second waveguides 22, 24 at the optical interface 26. When the slot 34 is filled with air, light from input 28 is reflected by a total internal reflection to the second output 32 defined by the second waveguide 24 (see FIG. 1). This is called a "cross state" because the light is switched from the first waveguide 22 to the second waveguide 24 at the optical interface 26. When the slot 34 is filled with an opto-fluid having an index of refraction that generally matches the index of refraction of the waveguides 22, 24, light from the input 28 passes through the optical interface 26 to the first output 30 defined by the first waveguide 22 (see FIG. 2). This condition can be referred to as a "bar state." In the bar state, light passing through this switch along the first waveguide 22 remains within the first waveguide as the light passes through the optical interface 26. In certain examples, while the TIR switch 20 is in the bar state, light can concurrently pass through the optical interface 26 along the second waveguide 24 and will remain in the second waveguide 24 as the light passes through the optical interface 26.

FIG. 3 is a more schematic representation of the TIR switch 20 showing the TIR switch 20 in the bar state. FIG. 4 is a more schematic representation of the TIR switch 20 showing the TIR switch 20 in the cross state.

Figures 5, 6:
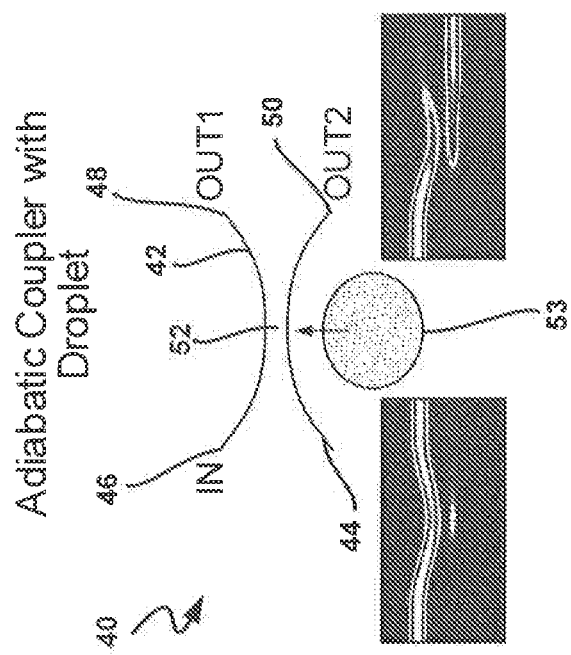
FIG. 5 schematically depicts an adiabatic optical switch that can be incorporated into devices in accordance with the principles of the present disclosure.
FIG. 6 schematically illustrates a micro electromechanical switch that can be incorporated into devices in accordance with the principles of the present disclosure.

FIG. 5 schematically depicts an adiabatic switch 40 that is another example of a type of switch that can be incorporated into devices in accordance with the principles of the present disclosure. Similar to the TIR switch 20, the adiabatic switch 40 can be integrated on a chip/substrate and is adapted for providing compact switching configurations with low power requirements. The adiabatic switch 40 is an example of an electro-wetting on dielectric (EWOD)-activated optical switch. The adiabatic switch 40 includes a first waveguide 42 and a second waveguide 44. The first waveguide 42 defines an input 46 and a first output 48. The second waveguide 44 defines a second output 50. The first and second waveguides 42, 44 pass in proximity to one another at an optical interface 52. By moving a droplet 53 of fluid relative to the optical interface 52, the adiabatic switch 40 can be switched between a bar state and a cross state. In the bar state, light passes through the adiabatic switch 40 from the input 46 to the first output 48. In the cross state, light passes through the adiabatic switch 40 from the input 46 to the second output 50.

FIG. 6 schematically illustrates an example micro electro mechanical switch 60 (MEMS) that can be incorporated into devices in accordance with the principles of the present disclosure to provide compact switching configurations requiring relatively low power. The MEMS 60 includes waveguides defining an input 62, a first output 64 and a second output 66. A micro electromechanical device moves a waveguide 68 between a first position and a second position relative to the input 62 and the outputs 64, 66. When the waveguide 68 is in the first position (depicted), the MEMS 60 reflects light by total internal reflection from the input 62 to the first output 64. When the waveguide 68 is in the second position, the MEMS 60 directs light from the input 62 to the second output 66.

In certain examples, optical switches in accordance with the principles of the present disclosure can be integrated onto substrates or chips and can be configured for compact, low power operation. In certain examples, the switches can be latching switches that utilize relatively small amounts of power to move between switching states, but remain in the established switching state in the absence of power (i.e., the switches latch in selected positions and hold the selected positions in the absence of power). The power for switching the switching devices can be provided by a variety of different techniques such as RF (radio frequency) power harvesting (e.g., from radiated power from an antenna, a hand-held device, or other RF power source). The switches can also be powered by energy harvesting from external ambient sources such as wind, solar, vibration or heat. Harvested energy can be stored by means such as batteries for later use. In other examples, energy for remotely powering the switches can be obtained by harvesting energy from light transferred through optical fibers carrying optical signals through the switching devices. Example optical harvesting circuits for remotely powering and controlling optical switches are disclosed by PCT International Publication No. WO 2016/131825, filed on Feb. 16, 2016, which is hereby incorporated by reference in its entirety. In other examples, power for switching remote optical switches in accordance with the principles of the present disclosure can be obtained by inductive power transfer from a hand-held device. The hand-held device can also transfer data. In certain examples, the hand-held device can function as a tool for allowing a technician to configure switches within a closure. In certain examples, the closure can be environmentally sealed. In certain examples, the closure can be designed so as to be not enterable. In certain examples, the tool functionality can be integrated into a device such as a mobile phone. In certain examples, in addition to powering switches, the tool can collect and store data for mapping the various switches and their switching states so as to map the port configuration of the fiber optic network. In certain examples, the device can include a global positioning system that assists in mapping the locations of the various switching devices. In certain examples, power can be provided to the switching devices by using hybrid cable in which electrically conductive elements are includes with the optical fibers to provide power to the various devices.

III. Optical Switching Functions and Configurations

In certain examples, switches in accordance with the principles of the present disclosure can be incorporated throughout a fiber optic network from the central location out to the edge of the fiber optic network to provide loop-back switching locations for testing signal path integrity from a central location. For example, a test signal can be sent out from a central location along a first optical fiber, looped back to a second optical fiber at the loop-back connection, and returned to the central location along the second fiber. The signal on the second optical fiber can be sensed at the central office to confirm signal integrity along the first and second optical fibers. Switching in the fiber optic network can also be incorporated into the network to facilitate Optical Time Domain Reflectometer (OTDR) testing. Example OTDR testing systems are disclosed in PCT International Publication No. WO 2017/068170, which is hereby incorporated by reference in its entirety.

In certain examples, switches in accordance with the principles of the present disclosure can be incorporated throughout a fiber optic network from the central location out to the edge of the fiber optic network. In certain examples, switches such as TIR switches and/or adiabatic switches and/or MEMS can be incorporated into components of a fiber optic network such as fiber distribution hubs and/or optical termination enclosures and/or multi-service terminals and/or optical splice enclosures and/or break-out locations on fiber optic cables. In certain examples, switching devices such as TIR switches and/or adiabatic switches and/or MEMS can be incorporated within non-re-enterable enclosures or packages that are integrated throughout a fiber optic network. In certain examples, switches in accordance with the principles of the present disclosure such as TIR switches and/or adiabatic switches and/or MEMS can be incorporated into switching modules that can be plugged into other devices in a plug-and-play arrangement. In certain examples, switches in accordance with the principles of the present disclosures such as TIR switches and/or adiabatic switches and/or MEMS can be incorporated into hardened enclosures that are environmentally sealed and that include hardened optical interfaces for coupling the devices to the fiber optic network. The hardened optical interfaces can include hardened connectors having robust fasteners such as threaded fasteners and/or bayonet-style fasteners and also including environmental sealing at the optical connection interfaces. The hardened fiber optic connectors can provide dematable optical connections. In certain examples, the fiber optic connectors can be connectors having optical ferrules or ferrule-less fiber optic connectors.

In certain examples, optical devices in accordance with the principles of the present disclosure can include closures containing switches such as TIR switches and/or adiabatic switches and/or MEMS and that also include input optical interfaces and/or output optical interfaces and/or add/drop optical interfaces. In certain examples, the input optical interfaces and/or the output optical interfaces and/or the add/drop optical interfaces can include a variety of configurations such as: a) plug and play optical interfaces; and/or b) one or more optical fibers that are splice ready; and/or c) one or more optical fibers that are connectorized by single-fiber optical connectors so as to form single-fiber optical pigtails; and/or d) optical fibers that are arranged in a ribbon and are ready for mass fusion splicing; and/or e) optical fibers that are terminated by a multi-fiber fiber optic connector such as an MPO connector; and/or f) hardened single-fiber or multi-fiber connectors which may be female hardened fiber optic connectors or hardened male fiber optic connectors; and/or g) non-hardened fiber optic connectors which may include single-fiber or multi-fiber connectors; and/or h) ferrule-less fiber optic connectors which may include single-fiber or ferrule-less fiber optic connectors or multi-fiber ferrule-less fiber optic connectors. Example hardened fiber optic connectors are disclosed by U.S. Pat. Nos. 7,568,844; 7,146,090; 7,137,742; 7,244,066; 7,744,288; 7,572,065; 8,556,520; and 8,672,705, which are all hereby incorporated by reference in their entireties. Example ferrule-less fiber optic connectors and connection systems are disclosed by PCT International Publication No. WO2012/112344; PCT International Publication No. WO2013/117598; PCT Publication No. WO2016/043922; PCT International Publication No. WO2016/100384; and PCT International Publication No. WO2015/048198, all of which are hereby incorporated by reference in their entireties.

Figure 9:
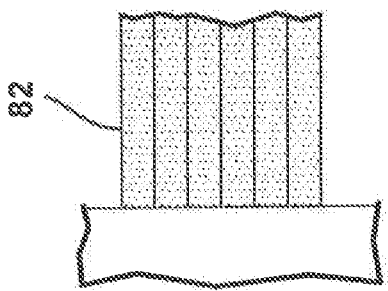
FIG. 9 shows a ribbon-fiber interface suitable for use with the device of FIG. 7.
Figure 8:
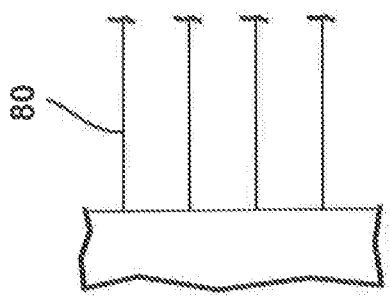
FIG. 8 shows an individual fiber, splice-ready interface suitable for use with the device of FIG. 7.
Figure 7:
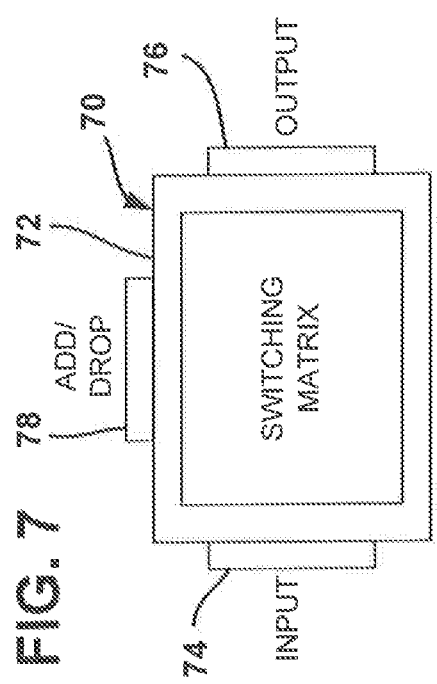
FIG. 7 is an example layout of an optical switching device that can be incorporated into components and architectures in accordance with the principles of the present disclosure.

FIG. 7 shows an example of an optical switching device 70 having an enclosure 72. In certain examples, the enclosure 72 may be non-re-enterable. In other examples, the enclosure 72 may be re-enterable. In certain examples, the enclosure 72 may be environmentally sealed. In other examples, the enclosure 72 may not be environmentally sealed. In certain examples, the enclosure 70 may include one or more switches such as TIR switches and/or adiabatic switches and/or MEMS which may be arranged in a switching matrix within the enclosure 70. In certain examples, the optical switching device 70 may include an optical input interface 74 that optically connects to the one or more optical switches; and/or an optical output interface 76 that optically connects to the one or more optical switches; and/or an optical add/drop interface 78 that optically connects to the one or more optical switches. In one example, the optical input interface 74 and/or the optical output interface 76 and/or the add-drop interface 78 can include one or more optical fibers 80 (see FIG. 8) that are ready for individual splicing. In another example, the optical input interface 74 and/or the optical output interface 76 and/or the add/drop interface 78 can include a plurality of optical fibers 82 that are arranged to facilitate mass fusion splicing (e.g., the optical fibers 82 can be arranged in a ribbon configuration as shown at FIG. 9).

Figure 11:
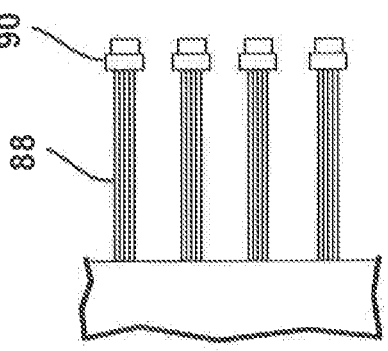
FIG. 11 shows a multi-fiber connectorized pigtail interface that can be used with the device of FIG. 7.
Figure 10:
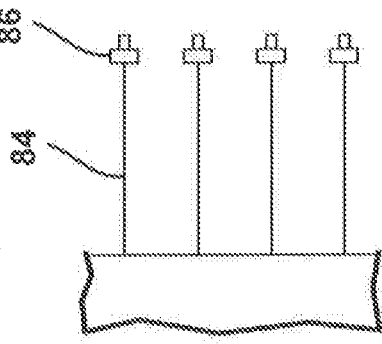
FIG. 10 shows a single fiber optical pigtail interface suitable for use with the device of FIG. 7.

In certain examples, the optical input interface 74 and/or the optical output interface 76 and/or the add/drop interface 78 can include one or more optical fibers 84 terminated by single-fiber optical connectors 86 as shown at FIG. 10. The single-fiber fiber optic connectors can be non-hardened (e.g., LC connectors or SC connectors) or can be hardened fiber optic connectors. In certain examples, the fiber optic connectors 86 can be ferruled connectors or ferrule-less connectors. In certain examples, the optical fibers 84 and the connectors 86 can form pigtails in which the optical fibers 84 are contained within a protective jacket and may include reinforcing elements such as Aramid yarn. In certain examples, the optical input interface 74 and/or the optical output interface 76 and/or the add/drop interface 78 can include a plurality of optical fibers 88 terminated by one or more multi-fiber fiber optic connectors 90 (see FIG. 11). The multi-fiber fiber optic connectors 90 can be non-hardened (e.g., MPO connectors) or hardened. The multi-fiber fiber optic connectors 90 can be ferruled or ferrule-less. In the depicted example, the optical fibers 88 and the fiber optic connectors 90 form pigtails that can include a protective jacket surrounding the optical fibers 88 and can also include reinforcing elements such as Aramid yarn that run along the length of the pigtails.

Figure 12:
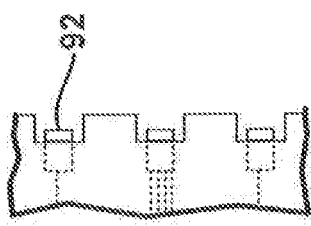
FIG. 12 shows single-fiber port and multi-fiber port interfaces that can be used with the device of FIG. 7.

In certain examples, the optical input interface 74 and/or the optical interface 76 and/or the add/drop interface 78 can include one or more ports 92 (e.g., fiber optic adapter ports) adapted to mate with fiber optic connectors (see FIG. 12). The ports 92 can be referred to as female fiber optic connectors. In certain examples, the ports 92 can include internal fiber optic adapters that receive internal fiber optic connectors and are also adapted to receive external fiber optic connectors from outside the enclosure 70. In certain examples, the ports 92 can be hardened or non-hardened. In certain examples, the ports 92 can include threaded or bayonet-style interfaces for connecting with the external connectors. In certain examples, each of the ports 92 can each include a single-fiber or a plurality of fibers. In certain examples, each of the ports 92 can be configured to be environmentally sealed when mated with a corresponding external connector. In certain examples, each of the ports 92 can be ferruled or ferrule-less.

FIG. 13 shows a switching matrix 100 that can include switches in accordance with the principles of the present disclosure (e.g., TIR switches, adiabatic switches, MEMS or other switches). The switching matrix 100 includes inputs 101-104 and outputs 105-108. As depicted, switches (indicated by cross-over locations) allow: inputs 101 and 102 to be coupled to any of outputs 105-107; and inputs 103 and 104 to be coupled to any of outputs 106-108. By adding more cross-overs and corresponding switches, the switching matrix can be an N×N switching matrix which allows any of the inputs 101-104 to be optically coupled to any of the outputs 105-108.

FIG. 14 schematically depicts a wavelength dependent switching matrix 110. The switching matrix 110 includes inputs 111-114 and outputs 115-118. The switching matrix can include integrated multiplexing and de-multiplexing for separating and combining wavelengths or bands of wavelengths. In certain examples, the switching matrix 110 can also provide switching between the input and the outputs without multiplexing or de-multiplexing (e.g., see the optical connection between input 112 and output 115). In other examples, signals from a given input can be de-multiplexed and connected to separate outputs. For example, the signal directed to input 111 is de-multiplexed into separate wavelengths or bands of wavelengths which are coupled to outputs 116 and 117. In certain examples, the switching matrix can also perform a multiplexing function. For example, signals de-multiplexed from input 111 and 113 are multiplexed and coupled to output 117. Switches correspond to cross-over locations. By adding more cross-overs/switches the matrix can provide N×N switching functionality.

FIG. 15 shows a block switching arrangement 120 having sets of inputs 121-124 and sets of outputs 125-128. Each of the sets of inputs 121-124 and outputs 125-128 includes a plurality of optical paths. A switching matrix can be provided between the inputs and the outputs. The switching matrix can optionally be an N×N switching matrix. The inputs and the outputs are switched relative to one another as a group or block. Thus, each of the sets of inputs 121-124 can be selectively coupled to each of the sets of outputs 125-128. Block switching is advantageous for applications such as for use in a redundant loop in a fiber optic network. In this type of situation, one of the sets of inputs 121-124 can be coupled to one of the sets of outputs 125-128 to direct signals in a forward direction through a fiber optic loop in a network, and the selected set of inputs can be coupled to another one of the sets of output to direct signals in a reverse direction through the fiber optic loop. The block switching arrangement 120 also includes loop-back arrangements 129 at the input side and loop-back arrangements 130 at the output side. As depicted, the sets of inputs 121, 124 are connected to one of the loop-backs 130 at the output side of the block switching arrangement. In this way, blocks of inputs 121, 124 are be cross-connected with respect to one another. Similarly, by coupling the outputs 125-128 to the cross connect structures 130 at the input side of the block switching arrangement 120, blocks of the outputs 125-128 can be cross-connected to one another. Block switching is also advantageous for loop-back testing.

FIG. 16 shows a switching arrangement 140 for allowing a passive optical splitter to be programmed between two different split ratios, or to be reconfigurable between two different split ratios. As depicted, the schematic splitter includes a 1×2 splitter and a 1×4 splitter. In other examples, the splitter can be configured to accommodate different split ratios such as 1×8, 1×16, or 1×32.

FIG. 17 shows a switching arrangement 150 adapted for use with a passive optical splitter that is programmable or reconfigurable with respect to signal power. For example, the splitter can be set in different operating states in which different optical power levels are provided between input ports and output ports of the splitter. For example, in one operating state, an input can be split into two 50/50 outputs. In another operating state, the input can be split into a 60 output and a 40 output. Of course, other split ratios could be used. In certain examples, the splitter can have one or more inputs that can selectively provide selected power levels to one or more output ports.

FIG. 18 shows a combined switching splitter 160. In certain examples, the combined switch and splitter 160 can provide connections between inputs and outputs without splitting the inputs, and also can provide connections between the inputs and the outputs with splitting. Switches can be utilized to select whether a given signal is split or not before being output.

Figure 19:
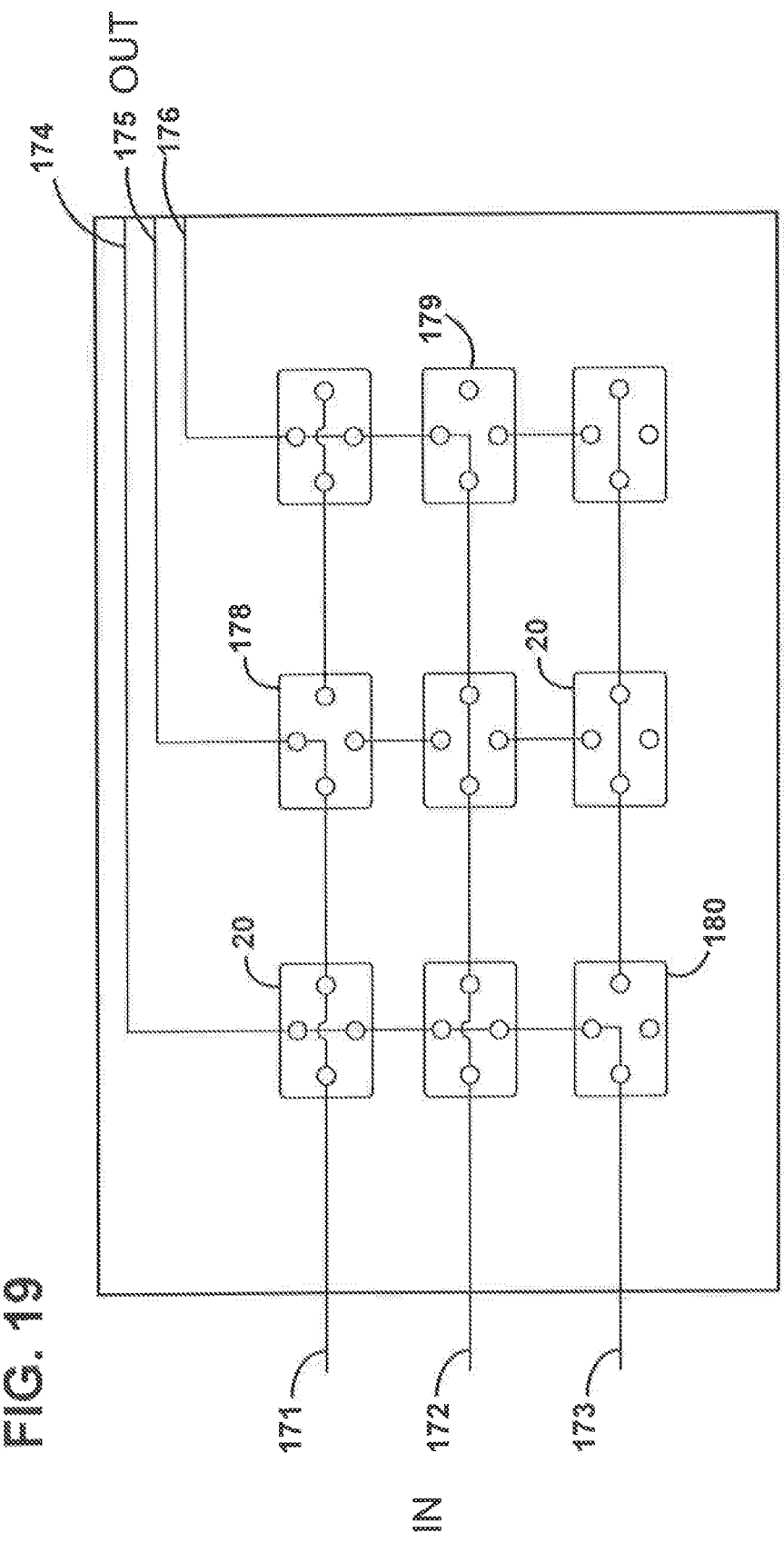
FIG. 19 illustrates an example N×N switching matrix that can be integrated into devices and configurations in accordance with the principles of the present disclosure.

FIG. 19 shows an example switching matrix 170 (e.g., an N×N switching matrix) including TIR switches 20. The switching matrix 170 includes inputs 171-173 and outputs 174-176. The TIR switches 20 are arranged in a matrix configuration such that any of the inputs 171-173 can be coupled to any of the outputs 174-176. While the inputs 171-173 have been identified as inputs and the outputs 174-176 have been identified as outputs, it will be appreciated that signal traffic through this switching matrix or any matrix disclosed herein can be bi-directional. In the depicted example of FIG. 19, switch 178 is in the cross state to couple the input 171 to the output 175. Similarly, switch 179 is in the cross state to couple input 172 to output 176. Also, switch 180 is shown in the cross state to couple input 173 to output 174. The other switches in the matrix are in the bar state. By modifying the bar and cross states of the various switches 20, any of the inputs 171-173 can be coupled to any of the outputs 174-176.

Figure 20:
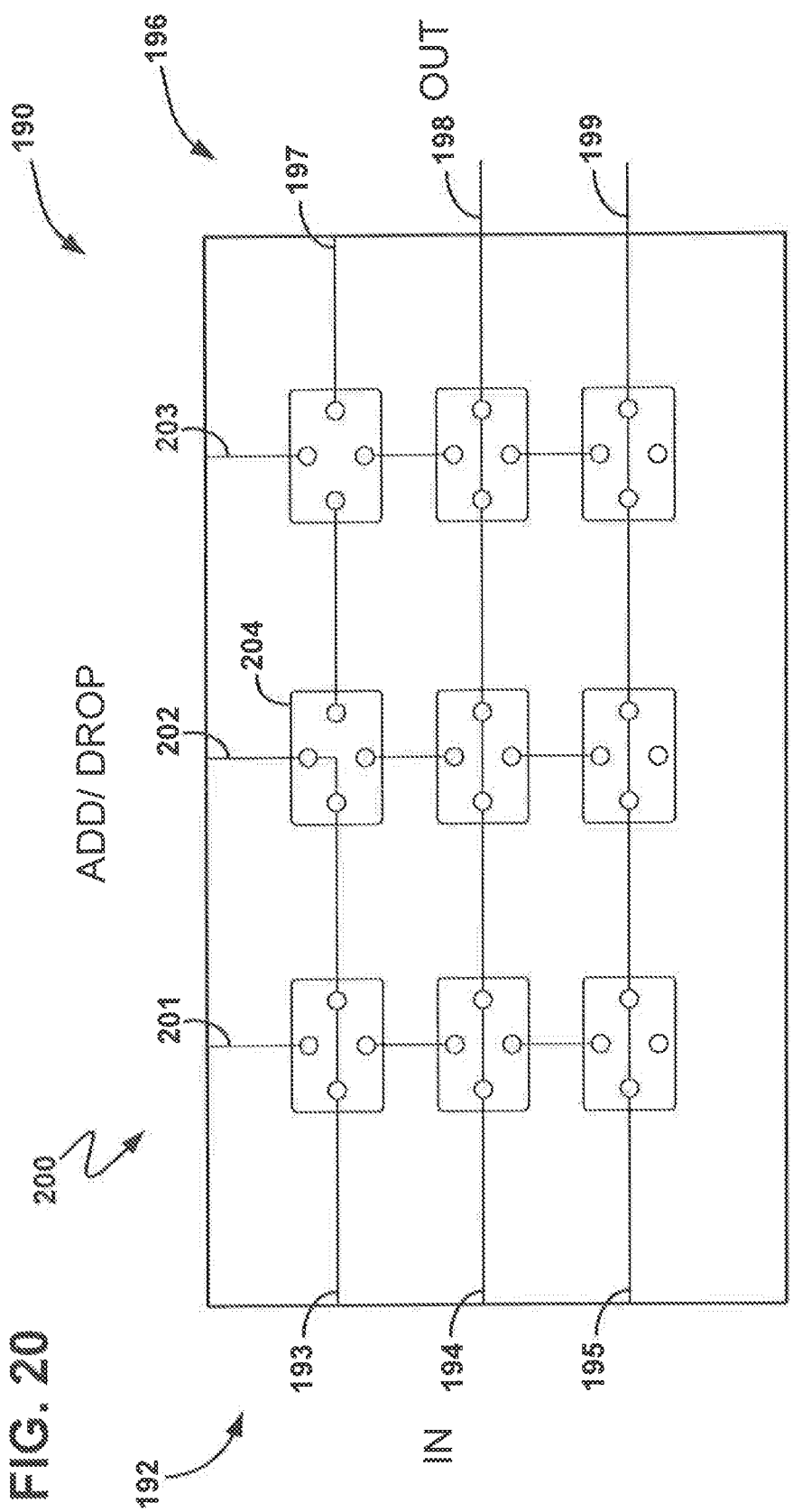
FIG. 20 illustrates an example switching arrangement capable of coupling pass-through transmission pathways to drop locations that can be integrated into devices and configurations in accordance with the principles of the present disclosure.

FIG. 20 shows a switching matrix 190 including a plurality of TIR switches 20 arranged in the matrix. The switching matrix 190 includes an input interface 192 including inputs 193-195, an output interface 196 having outputs 197-199 and an add/drop interface 200 having add/drop locations 201-203. The TIR switches 20 are configured to allow any of the inputs 193-195 to be coupled to any of the add/drop locations 201-203. When the switches are in the bar state, the inputs 193-195 are respectively coupled to the outputs 197-198 so as to pass through the device. As depicted at FIG. 20, switch 204 is in the cross state to couple input 193 to add/drop location 202. All the other switches 20 in the matrix are in the bar state. Thus, input 194 is shown coupled to output 198 and input 195 is shown coupled to output 199. The switching matrix 190 can be referred to as a drop matrix since it allows any of the signals to be selectively dropped from a through path to a drop line coupled to one of the add/drop locations. In other examples, switching arrays can be configured to allow any of inputs 193-195 or any of the outputs 197-199 to be coupled to any of the add/drop locations 201-203. In other examples, switching arrays can be configured to allow any of inputs 193-195 to be connected to any of the outputs 197-199

Figure 21:
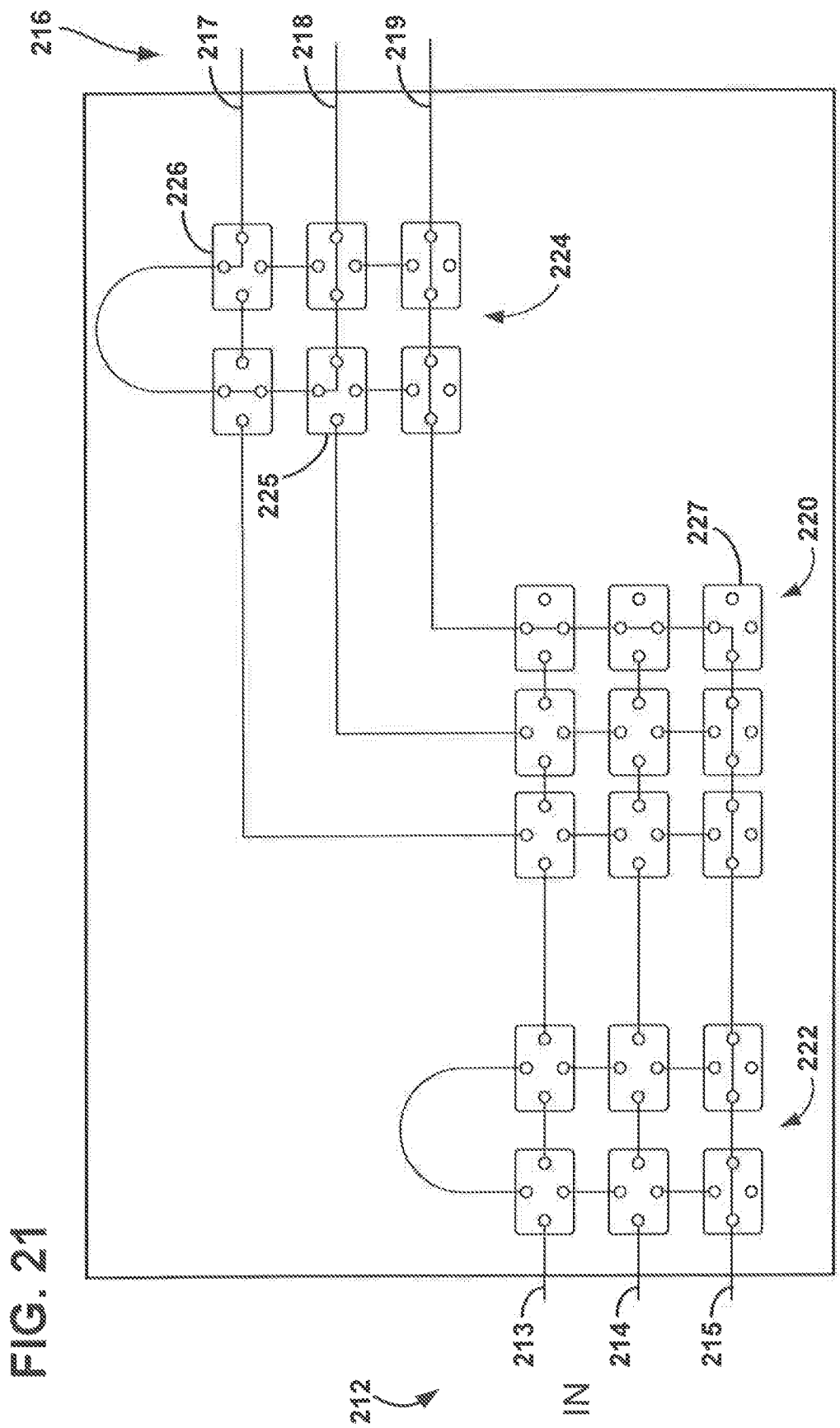
FIG. 21 illustrates a switching arrangement having switches for cross connecting inputs of the arrangement, switches for cross connecting outputs of the arrangement, and switches for coupling selected inputs to selected outputs of the arrangement.

FIG. 21 shows a switching matrix 210 including a plurality of TIR switches 20. The switching matrix includes an input interface 212 having inputs 213-215 and an output interface 216 including outputs 217-219. A switching sub-matrix 220 is adapted for optically coupling any of the inputs 213-215 to any of the output 217-219. The switching sub-matrix 222 is adapted for cross connecting any two of the inputs 213-215 together. Switching submatrix 224 is adapted for cross connecting any two of the outputs 217-219 together. As shown at FIG. 21, switches 225 and 226 are in the cross state such that output 218 is cross connected to output 217. Also, switch 227 is in the cross state to couple input 215 to output 219. The remainder of the switches are in the bar state.

Figure 22:
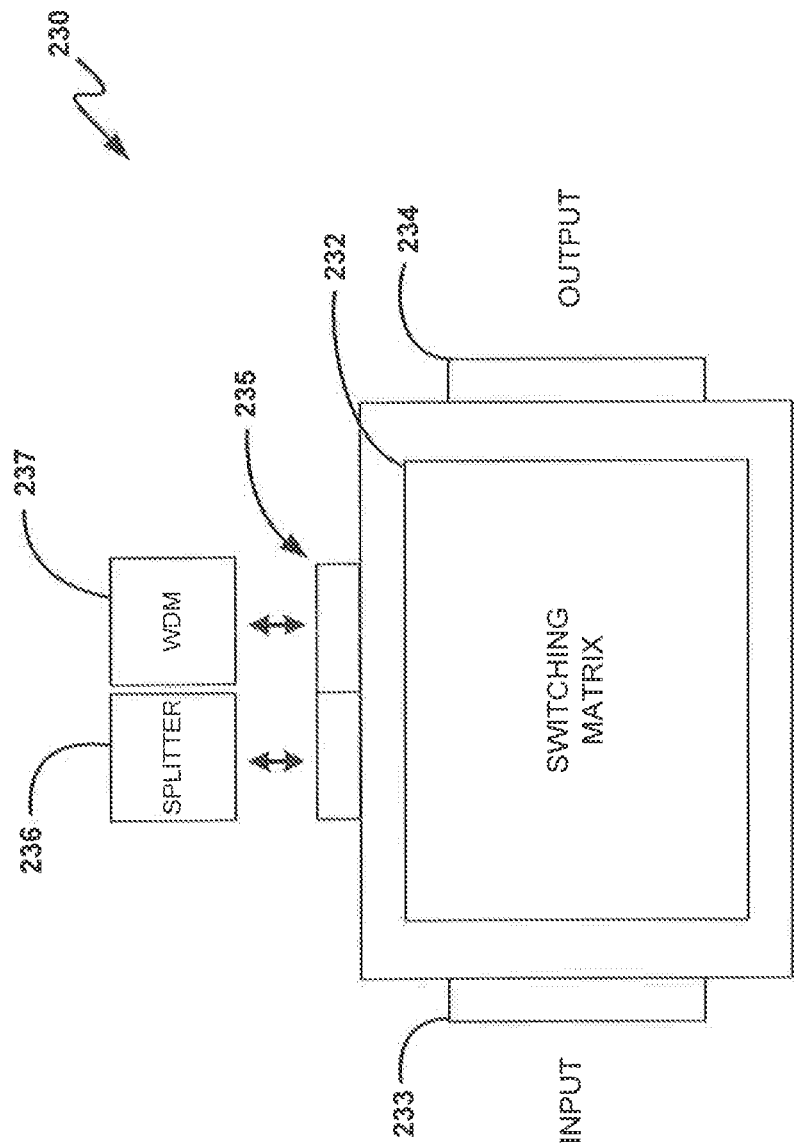
FIG. 22 schematically illustrates a switching device capable of interfacing with modules such as splitter modules or WDM modules.

FIG. 22 shows another switching device 230 in accordance with the principles of the present disclosure. The switching device 230 includes a switching matrix 232 that provides an interface between an input interface 233, an output interface 234, and an add-on interface 235. The input interface 233 can include a plurality of input locations and the output interface 234 can include a plurality of output locations. The switching matrix 232 can be configured to optically couple any of the input locations to any of the output locations. The add-on interface 235 is adapted to couple with add-on modules such as an add-on splitter module 236 and/or an add-on wavelength multiplexing module 237. In certain examples, the switching matrix 232 is compatible with add-on splitter modules 232 having different split ratios. Similarly, the switching matrix 232 can be compatible with add-on modules having different multiplexing characteristics. The main body of the switching device 230 can function as a base unit that is initially installed in the field. For later upgrades, or network changes, the modules 236, 237 can be added. Alternatively, the add-on interface 235 can allow the switching device 230 to be programmed in the factory by installing the suitable add-on devices. In this way, the number of different product configurations can be built in the factory by assembling a limited number of components.

In certain examples, the drop switching arrangement can be configured to allow any of the input and/or output locations to be coupled to the drop locations. In certain examples, there can be more inputs and/or outputs than the number of drop locations. In certain examples, the switching matrix may be configured only to make connections between the input locations and the drop locations and/or between the output locations and the drop locations without providing an N×N matrix between the input and output locations.

In certain examples, N×N switching matrixes provide optical connections between any of the input locations and any of the output locations of the matrix. In other examples, the switching matrices can be configured such that at least some of the inputs of the switching matrix can be switched between at least some of the outputs of the switching matrix. In this type of arrangement, a more simplified switching matrix can be utilized by reducing the number of switching options.

Figure 23:
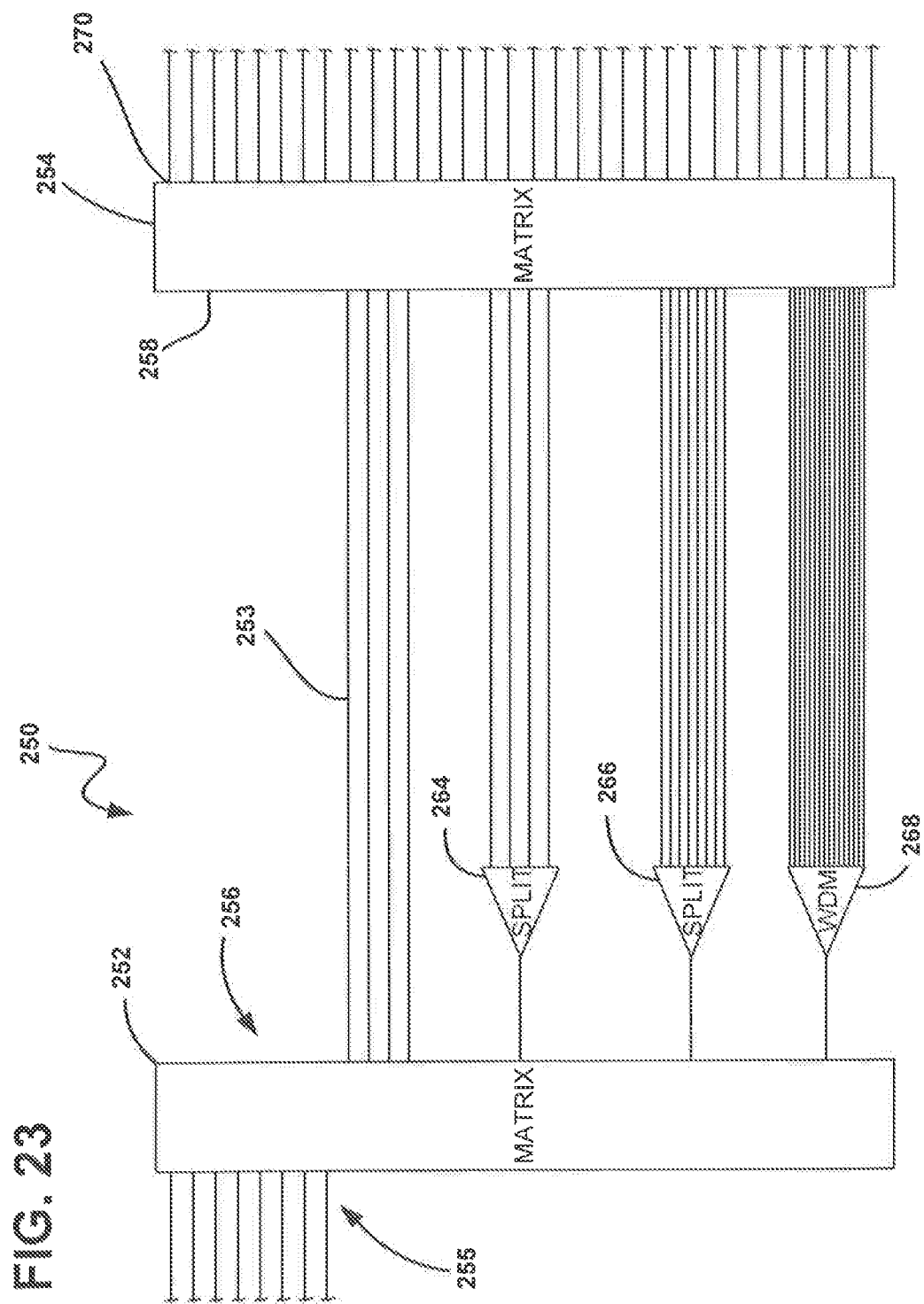
FIG. 23 illustrates a switching arrangement having the ability to select between pass-through lines, different power split levels and wavelength de-multiplexed lines.

FIG. 23 shows another switching device 250 in accordance with the principles of the present disclosure. The switching device 250 includes a first switching matrix 252 and a second switching matrix 254. The first switching matrix 252 includes an input interface 255 and an output interface 256. The input interface 255 includes a plurality of inputs and the output interface 256 includes a plurality of outputs. The first switching matrix 252 allows for switching between at least some of the inputs of the input interface 255 and at least some of the outputs of the output interface 256. In one example, the matrix provides the ability to connect any one of the inputs at the input interface 255 to any one of the outputs at the output interface 256. In certain examples, the output interface 256 of the first switching matrix 252 and an input interface 258 of the second switching matrix 254 are coupled by a variety of optical circuits having different parameters and/or characteristics. For example, a certain number of un-split optical pass-throughs 253 can extend between the first and second switching matrices 252, 254 (i.e., between the output side of the first switching matrix 252 and the input side of the second switching matrix 254) so as to provide the ability to have point-to-point connections at downstream locations. Also, passive optical power splitters 264, 266 are provided between the first and second switching matrices 252, 254. The splitters have inputs coupled to the output side of the first switching matrix 252 and outputs coupled to the input side of the second switching matrix 254. Further, a wavelength de-multiplexer 268 is also provided between the output side 256 of the first switching matrix 252 and the input side of the second switching matrix 254. The de-multiplexer has inputs coupled to the output side of the first switching matrix 252 and outputs coupled to the input side of the second switching matrix 254. The second switching matrix 254 provides a switchable interface between its input interface 258 and a corresponding output interface 270. The second switching matrix 254 allows at least some of the input locations at the input interface 258 to be switched between at least some of the output locations at the output interface 270. In one example, the switching matrix allows any of the inputs at the input interface 258 to be coupled to any of the outputs at the output interface 270. The combination of the two switching matrices 252, 254 and the various intermediate components and connection types allows for a large range of flexibility in the switching device 250. For example, selected inputs from the input side of the first switching matrix 252 can be either split by one of the passive power splitters, passed directly through by the pass-through lines or be de-multiplexed. Thus, the first switching matrix 252 provides switching flexibility with respect to the input side of the device. The second switching matrix 254 provides input flexibility with respect to the output side of the switching device 250. For example, any given downstream location can be preferably provided with a point-to-point (e.g., non-split) signal, a signal having a selected split ratio or a de-multiplexed signal.

IV. Splitters, Taps, Drop Module, and Break-Out Cable

Figure 24:
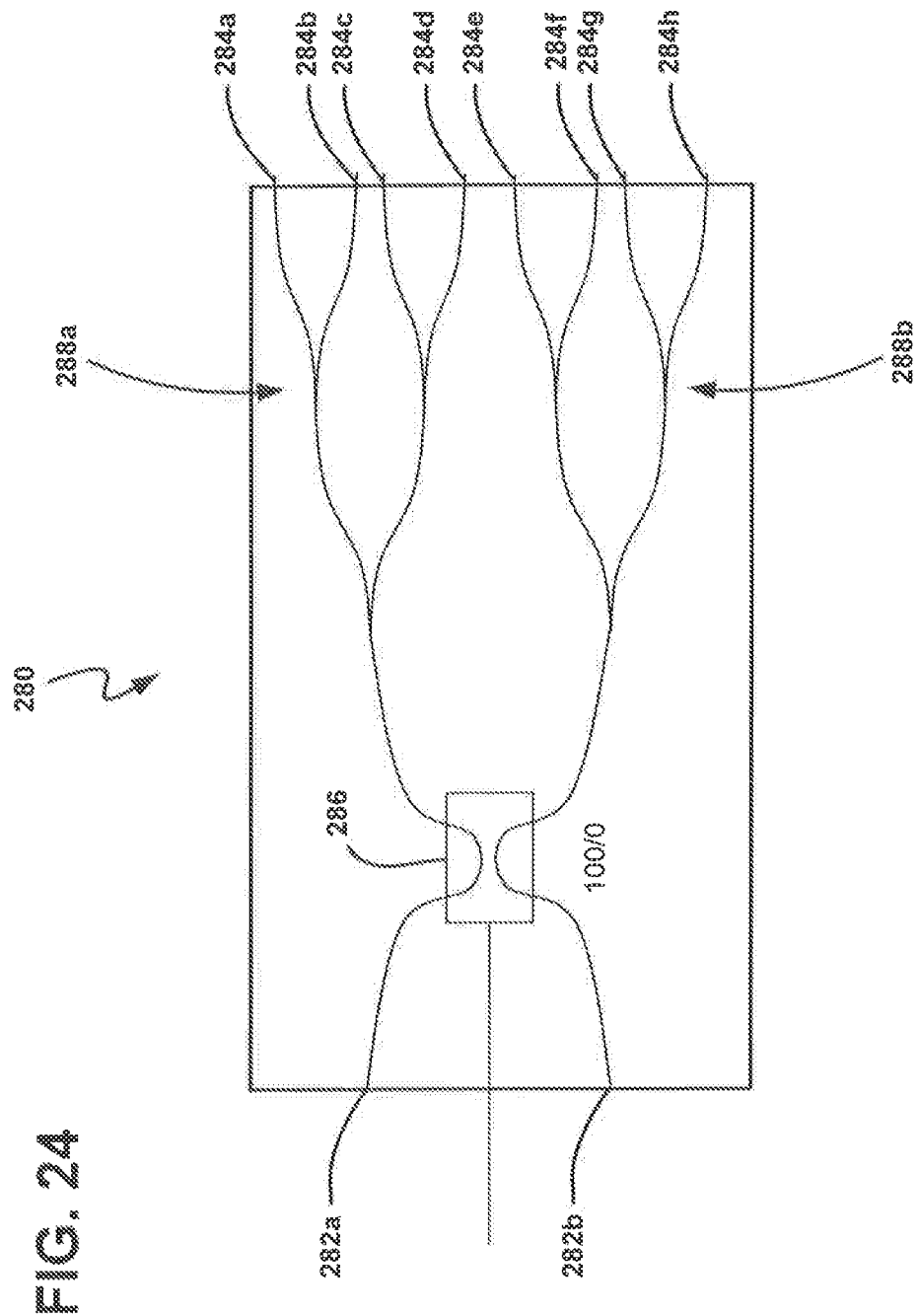
FIG. 24 shows an example reconfigurable splitter that can be integrated into devices and configurations in accordance with the principles of the present disclosure.

FIG. 24 shows a reconfigurable or programmable optical splitter 280 suitable for integration in a reconfigurable network in accordance with the principles of the present disclosure. The optical splitter 280 includes inputs 282a, 282b and outputs 284a-285h. An optical switching device 286 is provided within the optical splitter 280. Passive optical splitting circuits 288a and 288b are also provided as part of the optical splitter 280. When the optical splitter 280 is operated with the optical switching device 286 in a first state (i.e., a pass-through state), the input 282a and the outputs 284a-284d can function as a 1×4 splitter, and the input 282b and the outputs 284e-284h can operate as a 1×4 splitter. In contrast, when the optical switching device 286 is operated in a splitting mode and only one of the two inputs 282a, 282b is active, the optical splitter 280 can function as a 1×8 splitter. Thus, the configuration of the optical splitter 280 allows different split ratios to be selected. Thus, it can be programmed with different split ratios or it can be reconfigured to have different split ratios.

Figure 25:
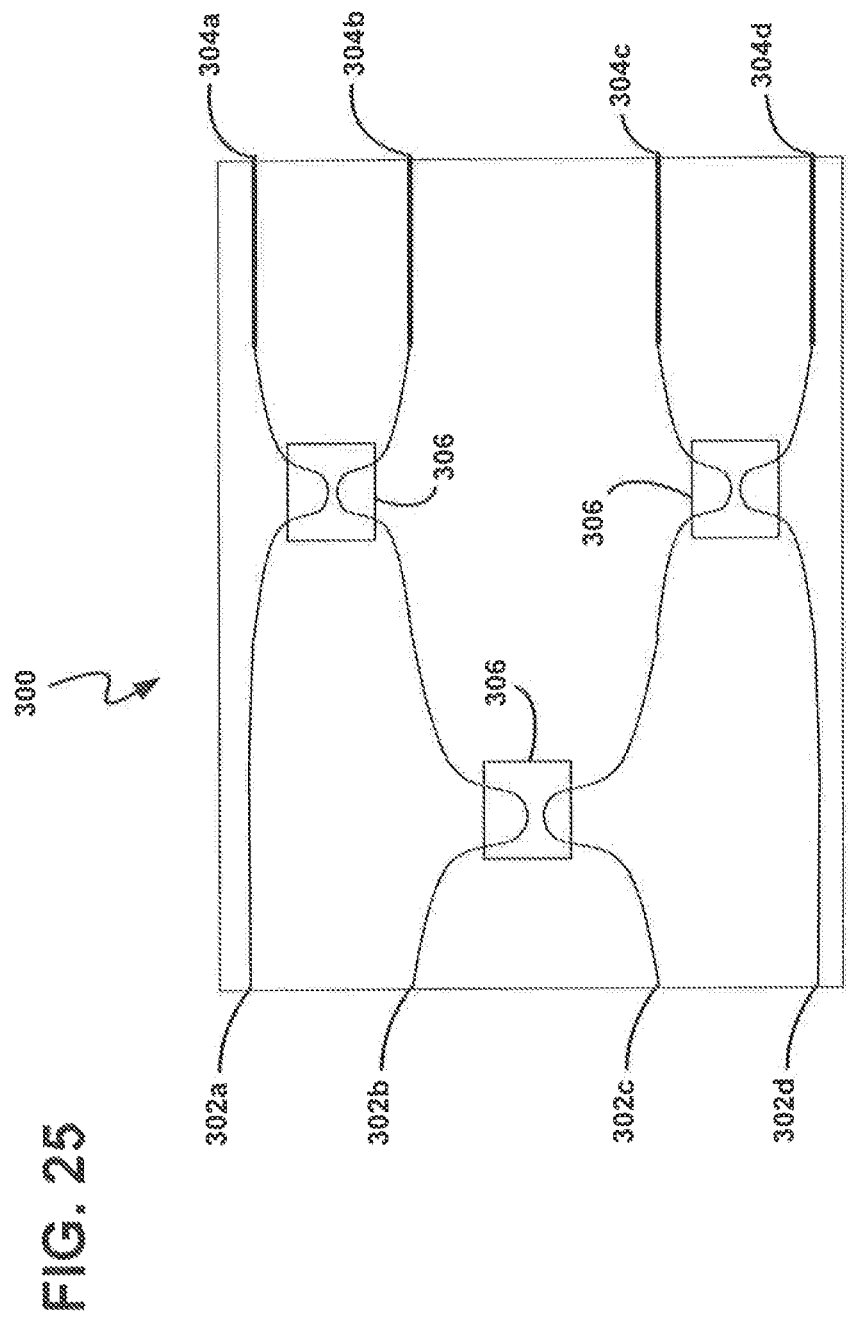
FIG. 25 illustrates another reconfigurable splitter that can be integrated into devices and configurations in accordance with the principles of the present disclosure.

FIG. 25 shows another optical splitter device 300 having inputs 302a-302d and outputs 304a-304d. Optical switching devices 306 are provided between the input and the output. The optical switching devices 306 can be operated in a pass-through state or a split optical splitting state. By operating all the optical switching devices 306 in the pass-through state, inputs 302a-302d can be optically coupled to outputs 304a-304d without optical splitting. Thus, point-to-point connections are provided. By selectively operating the switching devices 306 in either the pass-through mode or the splitting mode, the outputs 304a-304d can be set at different power reduction levels such as at a 50% power reduction level (e.g., corresponding to a 1×2 split ratio) or at a 75% power reduction level (e.g., corresponding to a 1×4 split ratio). Further details relating to the splitter configurations of FIGS. 24 and 25 are provided in U.S. Patent Application Publication No. 2018/0045893, which is hereby incorporated by reference in its entirety.

It will be appreciated that programmable and/or reconfigurable splitter configurations in accordance with the principles of the present disclosure can be incorporated within hardened, environmentally sealed enclosures such as MSTs and OTEs. In such examples, the outputs of the splitter configurations can include sealed, hardened dematable connection interfaces. In certain examples, the connection interfaces can include hardened fiber optic adapters (e.g., hardened female fiber optic connectors). In certain examples, the hardened dematable fiber optic connection locations can be adapted to interface with a corresponding hardened fiber optic connector of a drop cable routed to a location such as a subscriber location.

It will be appreciated that in other examples, different split ratios can be used in the splitter configurations as compared to those specifically disclosed. Additionally, in certain examples, splitters can be configured to provide customized and reconfigurable power levels at each of the outputs of the splitter configuration.

It will be appreciated that the ability to reconfigure optical splitters and to switch or reassign optical power levels with respect to different signal paths allows for better allocation of the total optical power budget. In certain examples, as additional subscribers are added in additional region, the overall distributed split arrangement can be modified by increasing the split ratio near the edge where the additional subscribers are in need of service and by decreasing the split ratio at a location closer to the central location of the network so that the total optical power budget is maintained. Similarly, as different subscribers are in need of point-to-point service throughout the network, modifications at split ratios throughout the network can be made to ensure the most efficient allocation of the optical power while concurrently maintaining at least the minimum required optical power levels for each of the subscribers in compliance with acceptable service requirements.

In certain examples, programmable optical taps can be incorporated within reconfigurable fiber optic networks in accordance with the principles of the present disclosure. A reconfigurable optical tap is an optical tap that allows the power level of a signal tap from the main signal to be adjusted or modified. For example, in the event a subscriber is added to a chain of tap terminals at an intermediate location along the chain, it may be necessary to modify the power levels of the taps of each of the downstream tap locations to ensure an acceptable allocation of optical power is provided to all subscribers along the length of the optical tap chain.

Figure 26:
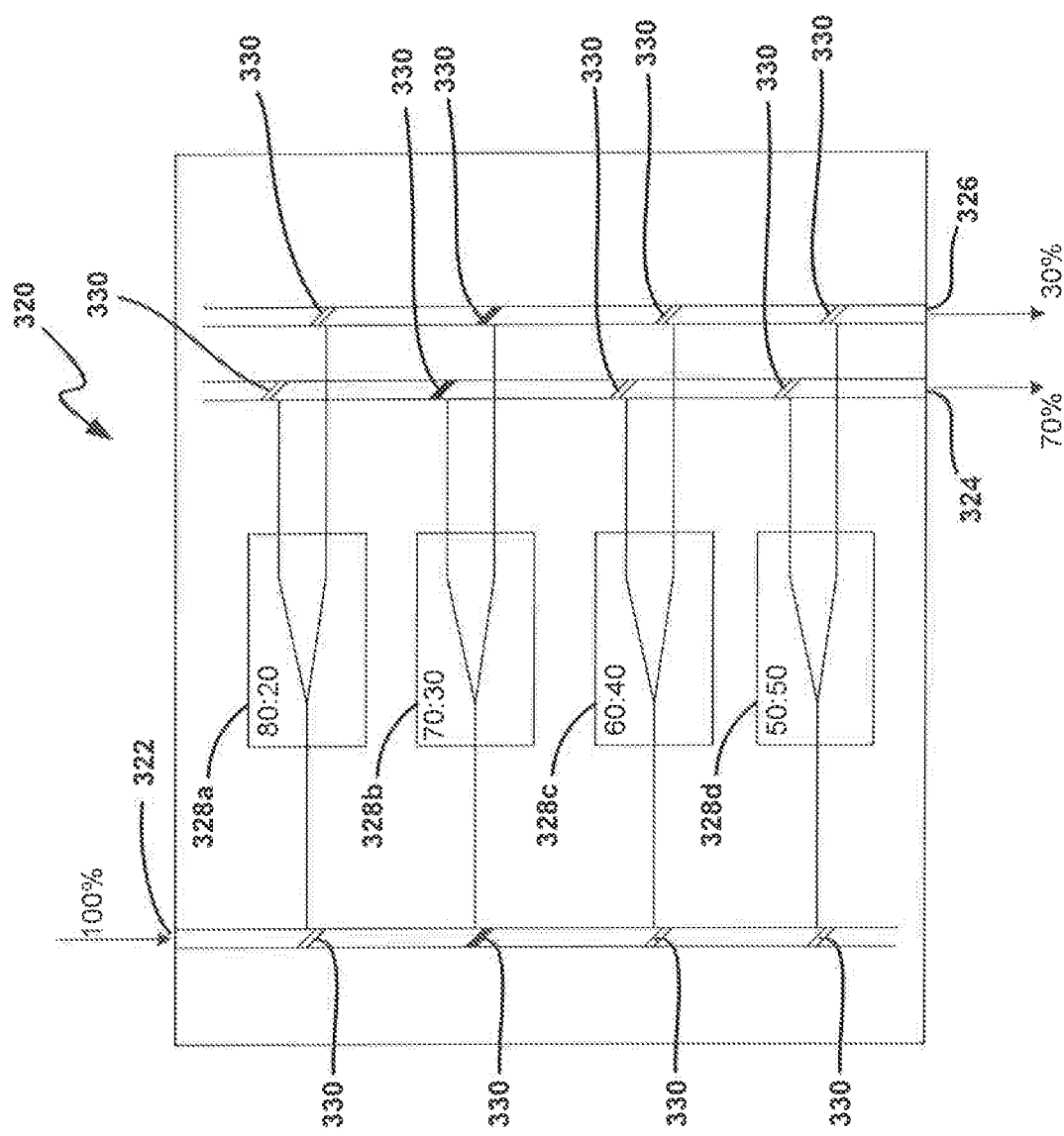
FIG. 26 illustrates a reconfigurable tap device that can be integrated into devices and configurations in accordance with the principles of the present disclosure.

FIG. 26 schematically depicts a programmable or reconfigurable tap 320 that can be integrated within a reconfigurable network in accordance with the principles of the present disclosure. The reconfigurable tap 320 includes an input 322, a main output 324 and a tap output 326. The reconfigurable tap 320 also includes a plurality of optical splitters 328a-328d each having a different power split ratio. The reconfigurable tap 320 further includes a plurality of switches 330 for allowing one of the optical power splitters 328a-328d to be selected so as to configure the tap with a particular split ratio. In certain examples, the reconfigurable tap 320 can be incorporated within an environmentally sealed enclosure such as an OTE, an MST or a splice enclosure. In other examples, the reconfigurable tap 320 can be packaged in a stand-alone housing that is environmentally sealed. In certain examples, the reconfigurable tap 320 can include hardened and sealed dematable fiber optic connection locations that in certain examples may include twist-to-lock engagement structures such as threaded interfaces or bayonet-style interfaces for coupling with corresponding structures of hardened fiber optic connectors.

In other examples, other split ratios can be used for the optical splitters. In one example, the split ratios can be varied in increments of 3%, and a much larger number of different tap ratios can be provided as split ratio options within the device. Further details about reconfigurable optical splitting configurations are disclosed by U.S. Provisional Patent Application No. 62/546,410, which is hereby incorporated by reference in its entirety.

Figure 27:
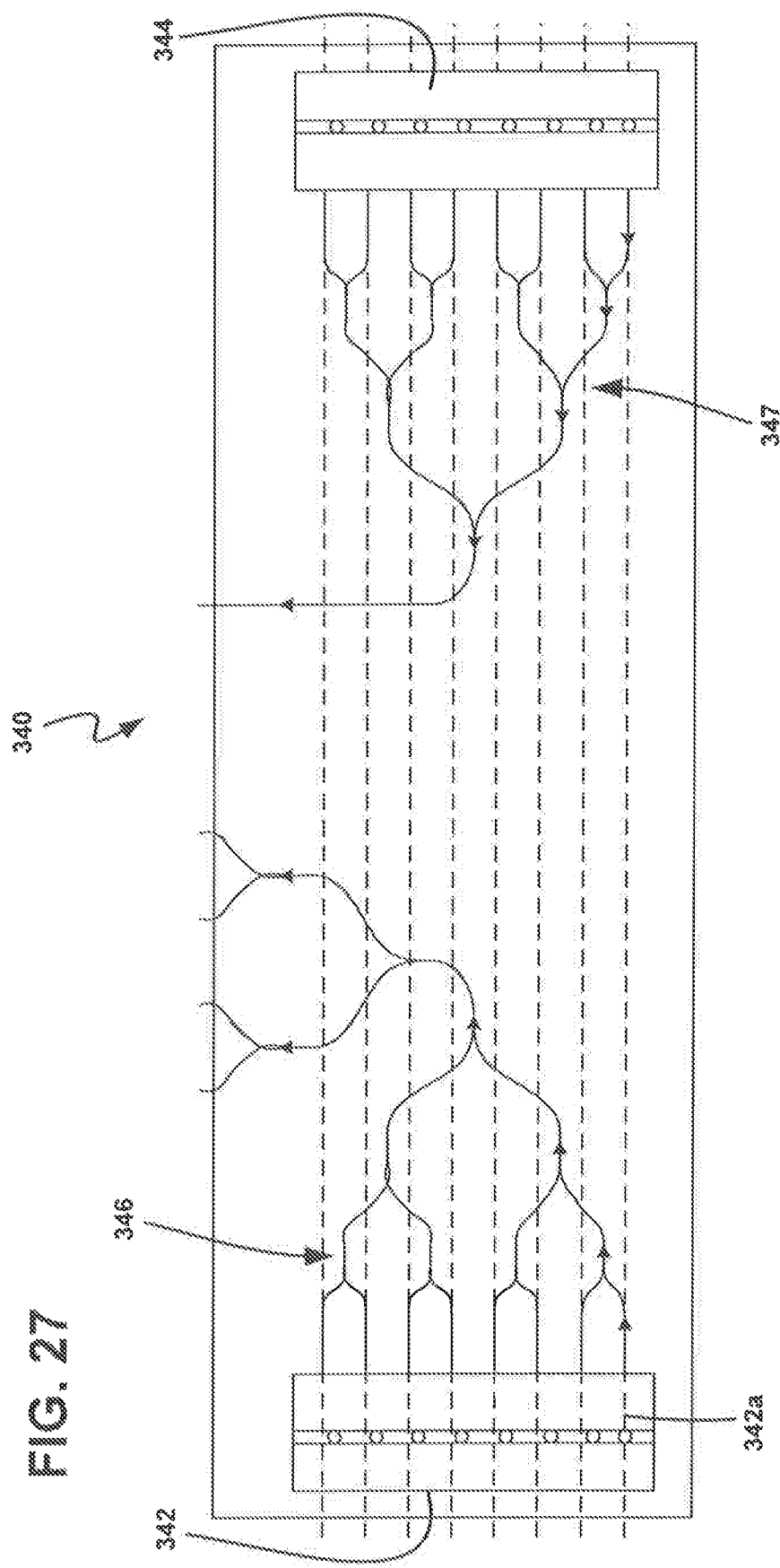
FIG. 27 illustrates a switching arrangement capable of selectively coupling individual pass-through optical lines to one or more drop locations that can be integrated into devices and configurations in accordance with the principles of the present disclosure.

FIG. 27 illustrates a terminal 340 (e.g., a drop module) having an input interface 342 and an output interface 344 as determined by a forward direction of signal travel through the device. An optical switch array 346 is configured for allowing any one of the inputs at the input interface 342 to be selectively dropped. In the depicted example, the switching array is configured such that input 342a is the selected input for dropping. A more detailed description of the array is disclosed at PCT International Publication No. WO 2017/134286, which is hereby incorporated by reference in its entirety. In the depicted example, the input is routed to splitters arranged to provide a 1×4 power splitting of the signal accessed. It will be appreciated that the device 340 is preferable by-directional, so signals can also travel though the device is a reverse direction from the output interface 344 to the input interface 342. A similar switching array 347 can be used to drop signal traveling in the reverse direction. No splitter is included with the array 347 such that the array can provide point-to-point service with a subscriber. In this way, both forward and reverse signals can be accessed. It will be appreciated that the terminal 340 can provide similar functionality to an indexing terminal. Example indexing terminals are disclosed by U.S. Pat. No. 9,348,096, which is hereby incorporated by reference in its entirety.

In certain examples, fiber optic cables with pre-manufactured breakout locations can be used to extend a fiber optic network. Typically, an area in need of service can be surveyed and service access locations are identified. Based on the survey, breakout locations can be integrated into the cable at the factory at predetermined lengths along the cable corresponding to anticipated access locations. In other examples, the breakout locations may be provided at set intervals or in a pattern. At each breakout location, optical fibers can be accessed from the main cable and broken out for access at the breakout location. For example, the optical fibers can be routed from the main cable to tethers that may be connectorized or splice ready. The breakout locations can be protected by a protective enclosure such as an overmold. U.S. Pat. No. 7,127,143, which is hereby incorporated by reference in its entirety, shows an example prefabricated cable having factory installed breakout locations.

To provide enhanced reconfigurability with respect to factory-manufactured breakout cable, one or more switches or a switching matrix can be incorporated within each breakout location (e.g., in each overmolded breakout location). The switches can be configured to selectively optically couple a drop location (i.e., a location adapted for connection to a drop cable) to a selected one of a plurality of optical fibers of the main cable that pass through the breakout location. In certain examples, the switches allow for a plurality of different optical fibers of the main cable to be capable of being individually coupled to the drop location based on the selected switch configuration. The switching matrix can be reconfigured remotely without requiring internal access of the breakout location. For example, the switching matrix could be controlled from the central office or data center. Alternatively, the switching matrix could be reconfigured using a reconfiguration device or tool from outside the enclosure.

Figure 28:
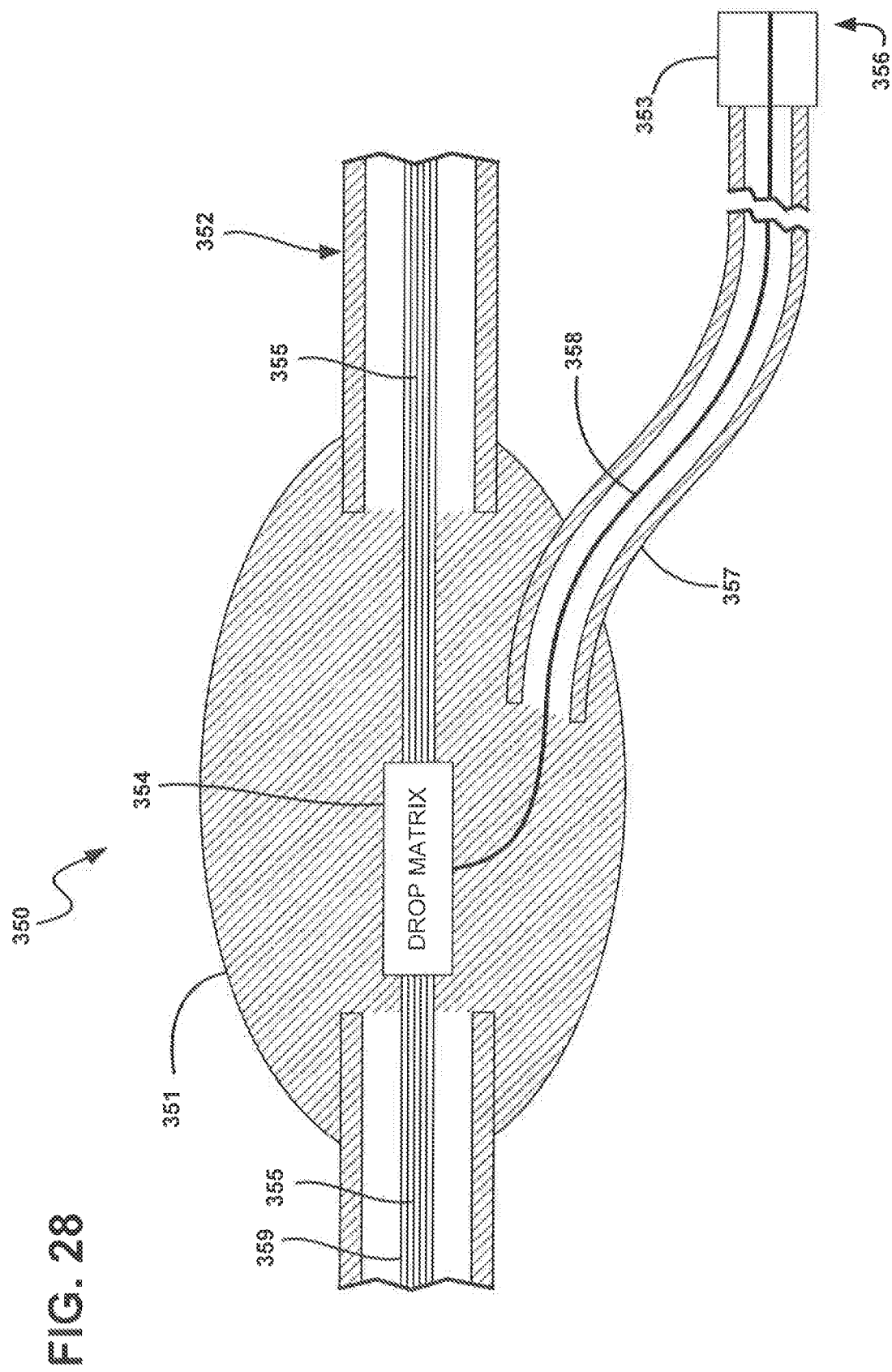
FIG. 28 illustrates a breakout location of a factory manufactured breakout cable in which one or more switches have been integrated into the breakout location.

FIG. 28 shows an example breakout location 350 of a factory-manufactured breakout cable 352. The cable 352 includes a main cable portion 354 that typically includes a strength layer, and a plurality of optical fibers 355 often enclosed within a protective buffer tube 359. The optical fibers are optically coupled to input and output sides of a switching matrix 354. The switching matrix allows for different ones of the optical fibers of the fiber optic cable to be selected for dropping at the breakout location 350 to a factory installed access location 356 (e.g., a tether 357 having a connectorized free end 353) adapted for connection to a drop cable. The dropped optical fiber or fibers are optically coupled to a corresponding optical fiber 358 or fibers protected within the tether 357. In certain examples, more than one optical fiber can be optically coupled to the tether. The switching matrix allows the breakout location to be reconfigured by optically coupling a different optical fiber of the main fiber optic cable to the optical fiber of the tether 357. An overmold 351 can cover and protect the breakout location 350, and the switching matrix can be positioned within the overmold 351. Alternatively, in certain examples where subscribers are delayed after installation of the cable, it may be desirable to initially not connect the tether optical fiber to any of the optical fibers of the main fiber optic cable. In this scenario, when a subscriber is identified for the tether cable 357, the switching matrix 354 can be used to optically couple the optical fiber 358 of the tether cable to one of the optical fibers 355 of the main fiber optic cable 352. In this way, service can be provided to the subscriber.

FIG. 28 depicts only a relatively short section of the break-out cable 352 in the vicinity of one of the break-out locations 350. It will be appreciated that a plurality of similar breakout locations 350 can be provided along the length of the fiber optic cable 352.

V. FDH's, MST's, OTE's and Splice Enclosures

Figure 29:
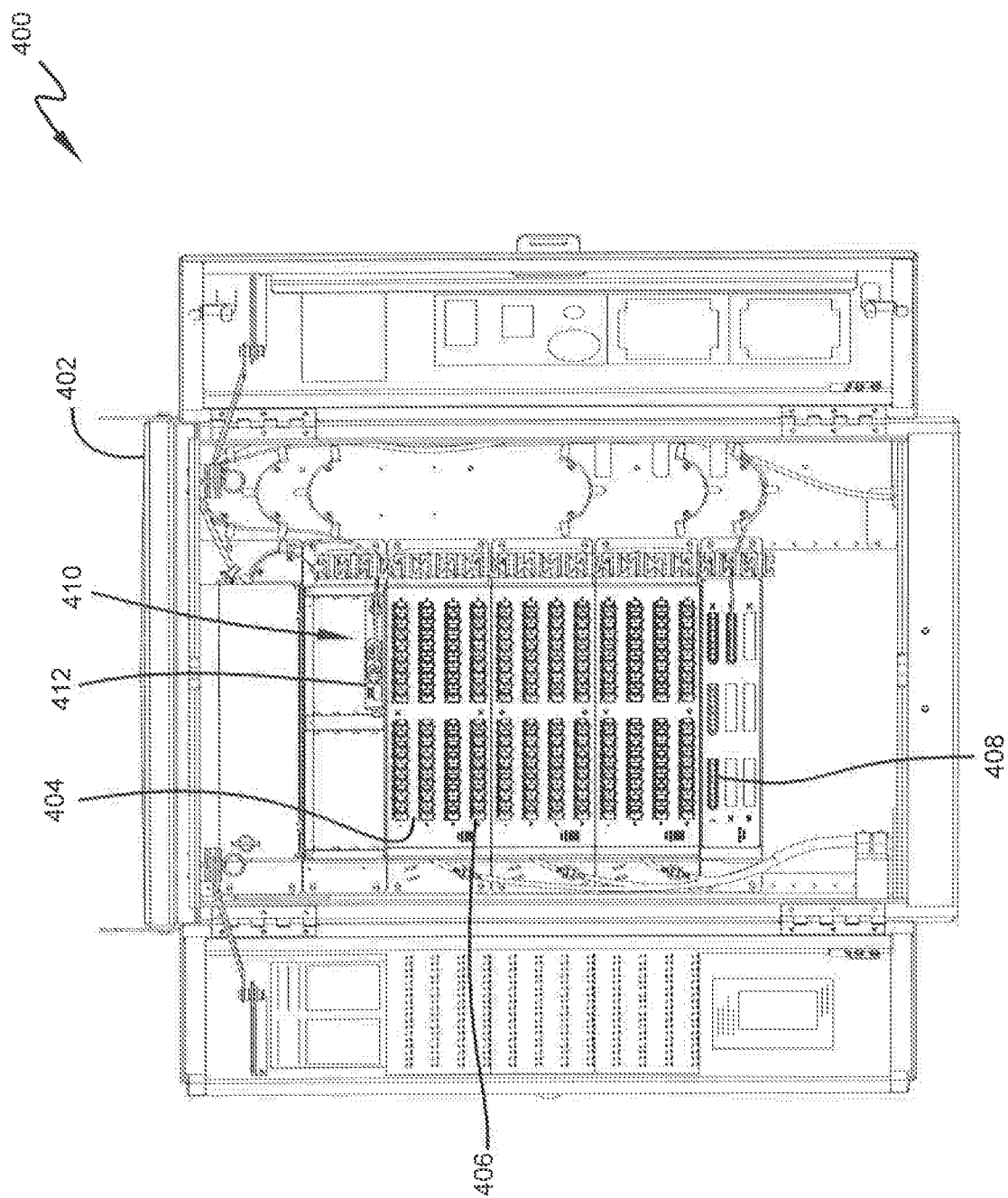
FIG. 29 is a front view of an example fiber distribution hub that can be used in fiber optic network architectures in accordance with the principles of the present disclosure.
Figure 30:
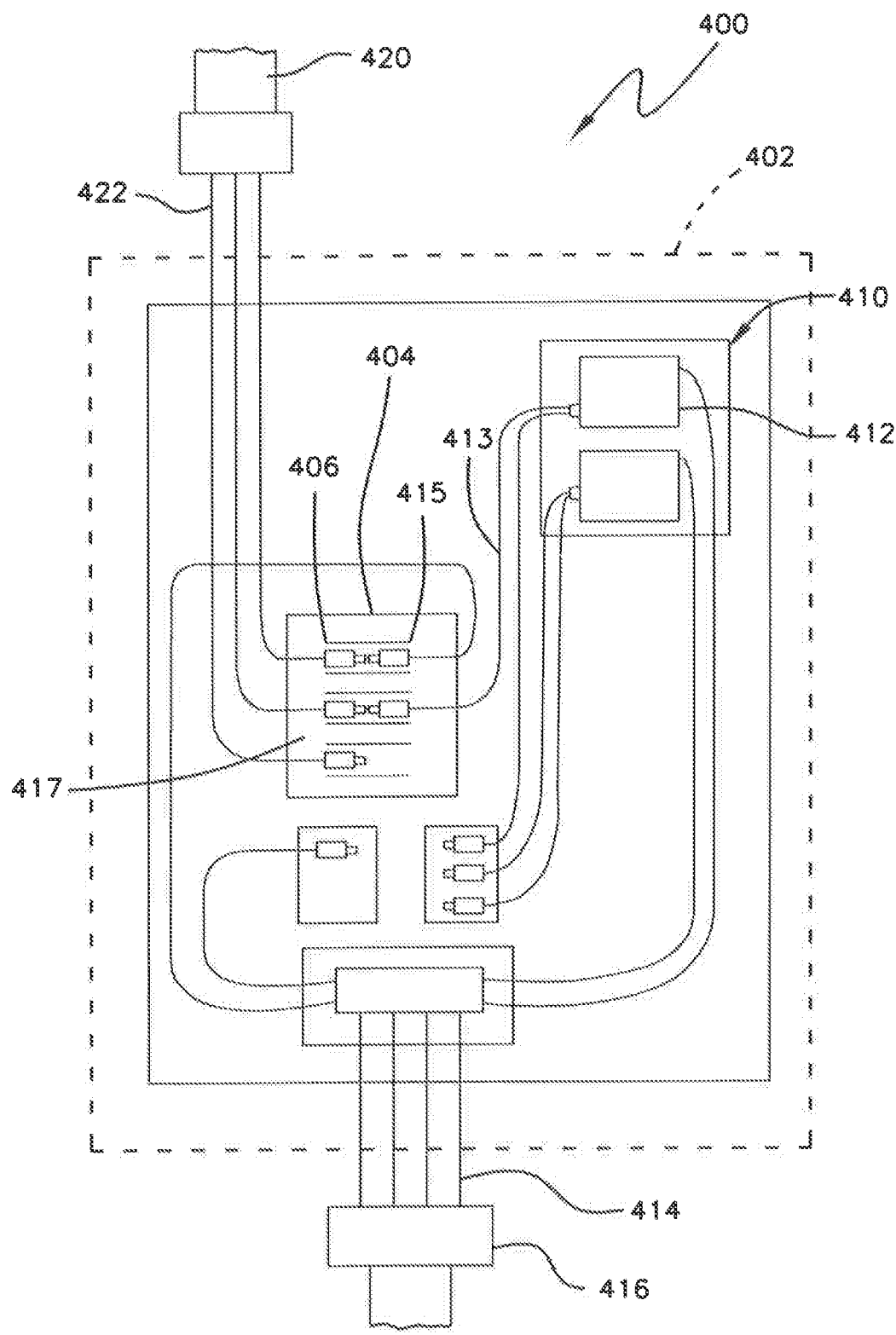
FIG. 30 is a schematic view of the fiber distribution hub of FIG. 29.

FIGS. 29 and 30 show an example fiber distribution hub 400 that can be incorporated within a reconfigurable network in accordance with the principles of the present disclosure. The fiber distribution hub 400 includes a cabinet 402 that can generally be pole mounted or pad mounted. The cabinet 402 is preferably environmentally sealed and has one or more access doors for accessing an interior of cabinet. Within the cabinet, the fiber distribution hub 400 includes a termination field 404 including an array of fiber optic adapters 406. The fiber optic adapters 406 are each adapted for optically connecting together two fiber optic connectors. The fiber distribution hub 400 can also include parking locations 408 for storing fiber optic connectors that are not in use. The fiber distribution hub 400 further includes a splitter mounting location 410 at which a plurality of passive optical power splitters 412 can be mounted. When installed in a network, optical fibers 414 of a feeder cable 416 can be optically coupled to inputs of the passive optical splitters 412. The optical splitters 412 can include connectorized pigtails 413 having connectorized ends that are plugged into adapter ports at a first side 415 of the termination field 406. A distribution cable 420 is also routed to the fiber distribution hub 400. Optical fibers 422 of the distribution cable can be connectorized and plugged into adapter ports at a second side 417 of the termination field. In this way, the output of the fiber optic splitters 412 can be coupled to the optical fibers 422 of the distribution cable. The optical fibers 422 of the distribution cable 420 can be routed to subscriber locations.

In certain examples, switching devices in accordance with the present disclosure can be used to retrofit the fiber distribution hub 400. For example, in certain examples, a switching module having fiber optic adapter ports at the input and output interfaces could be used at the termination field (e.g., the switching modules could be installed within openings in a panel or frame of the fiber distribution hub or can be otherwise attached to the frame of the fiber distribution hub). In this way, outputs of the optical splitters 412 can be plugged into the fiber optic adapters of the splitter matrix at the input side of the splitter matrix and the connectorized optical fibers 422 can be plugged into the adapter ports at the output side of the splitter matrix. In other examples, the splitter modules 412 can be replaced with a combined splitter and switching module that mounts at the splitter mounting location 410. The splitter and switching module can provide automated switching capabilities thereby eliminating the need for manual patching at the adapter termination field 404. In certain examples, the combined splitter and switching module can have an output interface including connectorized pigtails that plug into the first side of the termination field and thereby optically connect to the distribution fibers 422 of the distribution cable 420. The input interface of the combined splitter and switching module can have one or more optical fibers that are optically coupled to the optical fibers 414 of the feeder cable 416.

For first fit applications, modules having combined splitting and switching functionality can include output optical interfaces with compact configurations adapted for making a plurality of optical connections in a relatively small area. For example, the output interface can include a plurality of multi-fiber connectors (e.g., MPO connectors) or other high-fiber count connectors. Additionally, mass fusion splices could also be used to couple the outputs to the distribution cable fibers 422. By using compact optical switching and optical splitting circuits, the termination field can be greatly reduced in size or eliminated in place of the automated switching. Example fiber distribution hubs are disclosed by U.S. Pat. Nos. 7,218,827 and 7,816,602, which are hereby incorporated by reference in their entireties.

Figure 31:
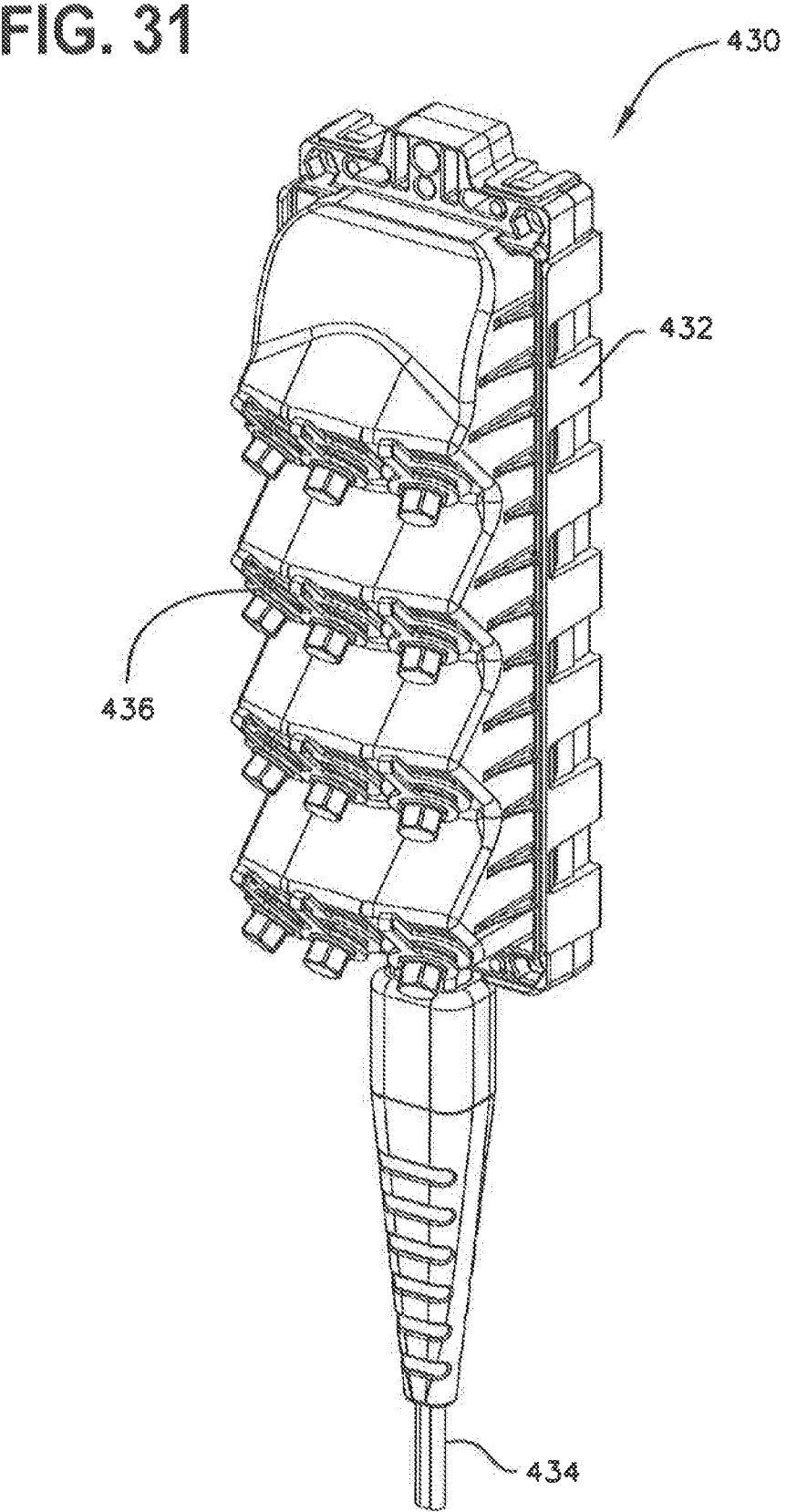
FIG. 31 is a perspective view of a multi-service terminal that can be integrated into fiber optic network architectures in accordance with the principles of the present disclosure.
Figure 32:
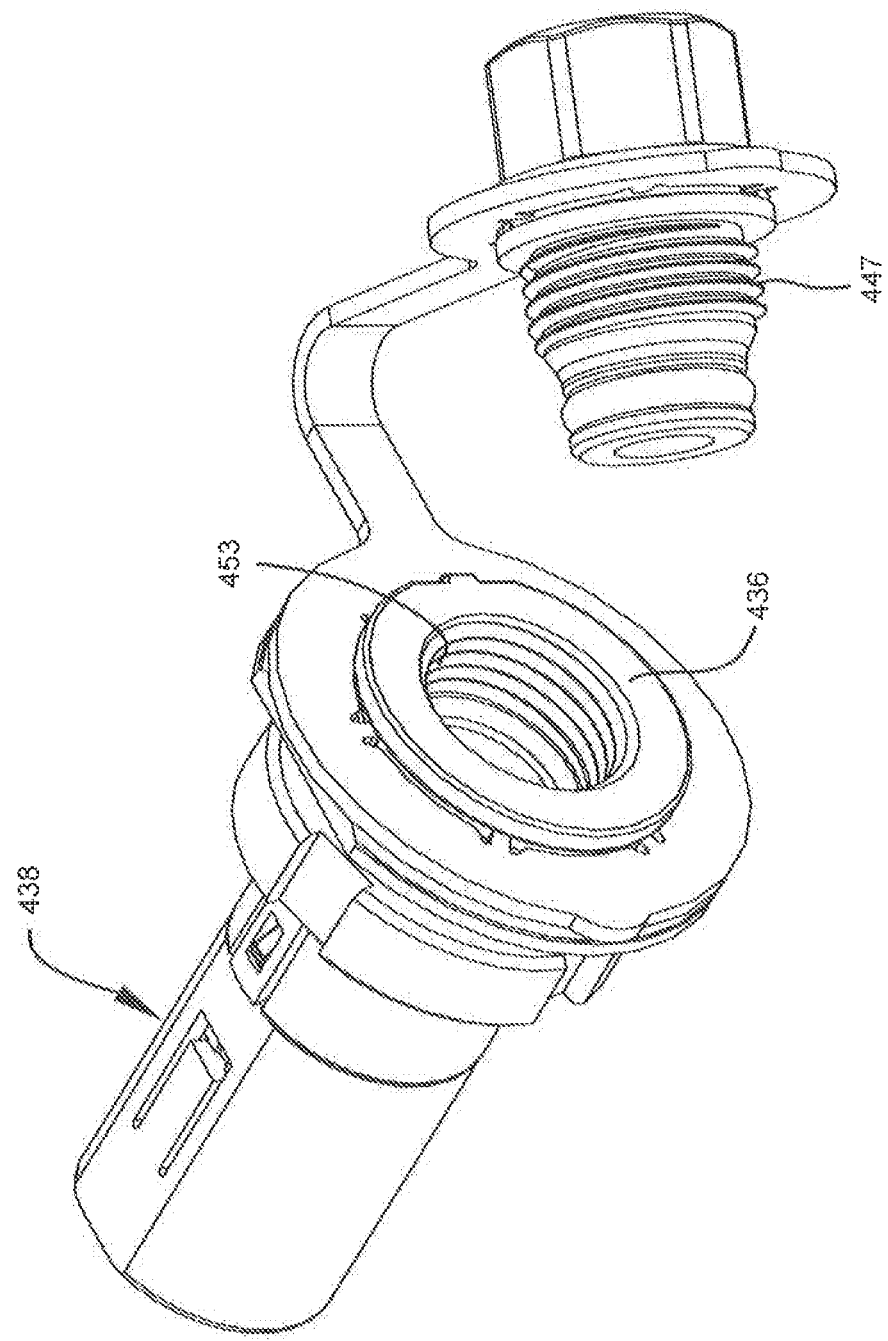
FIG. 32 is a perspective view of a hardened fiber optic adapter used to form a hardened port on the multi-service terminal of FIG. 31.
Figure 33:
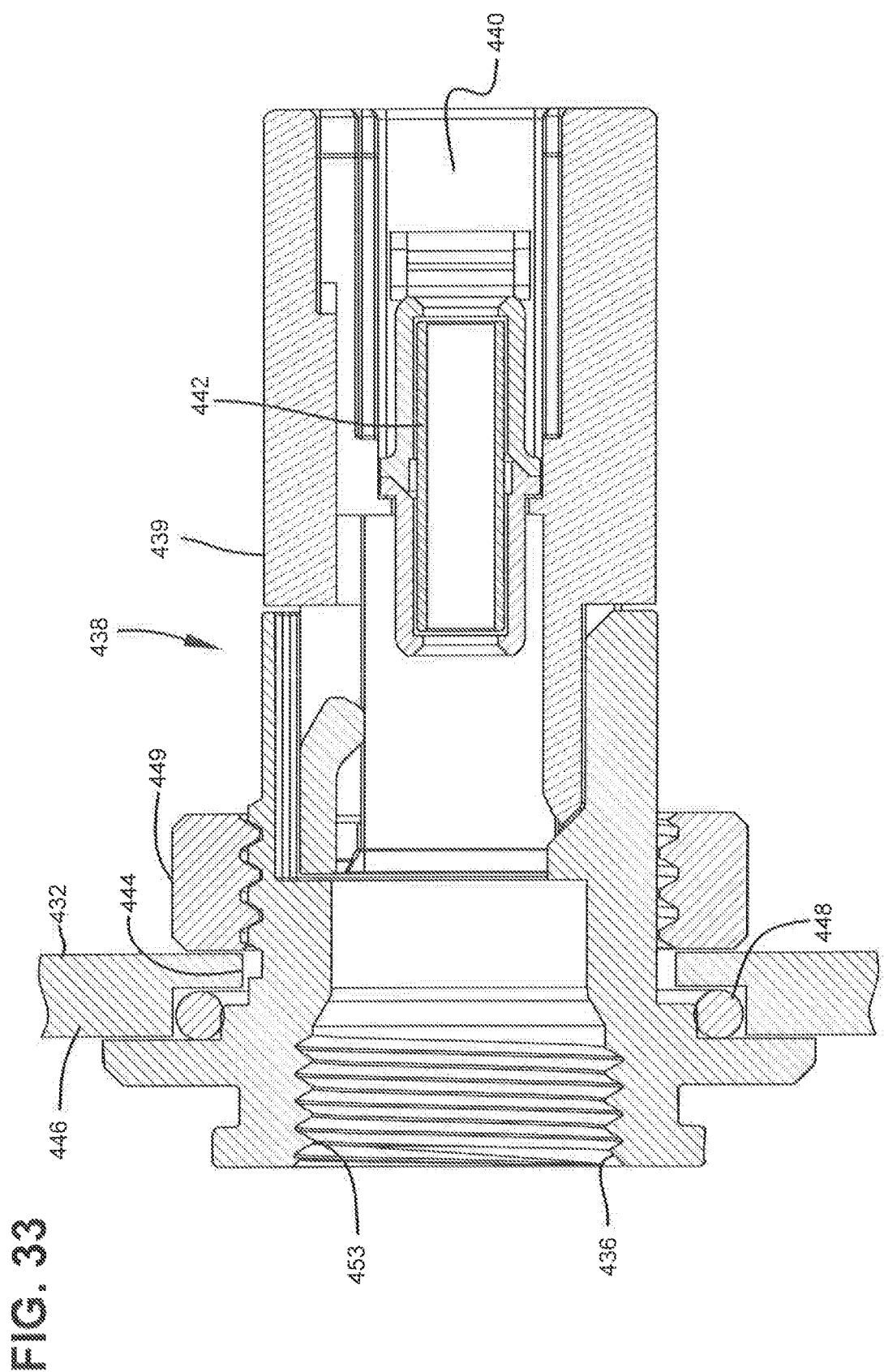
FIG. 33 is a lengthwise cross-sectional view of the hardened fiber optic adapter of FIG. 32.
Figure 34:
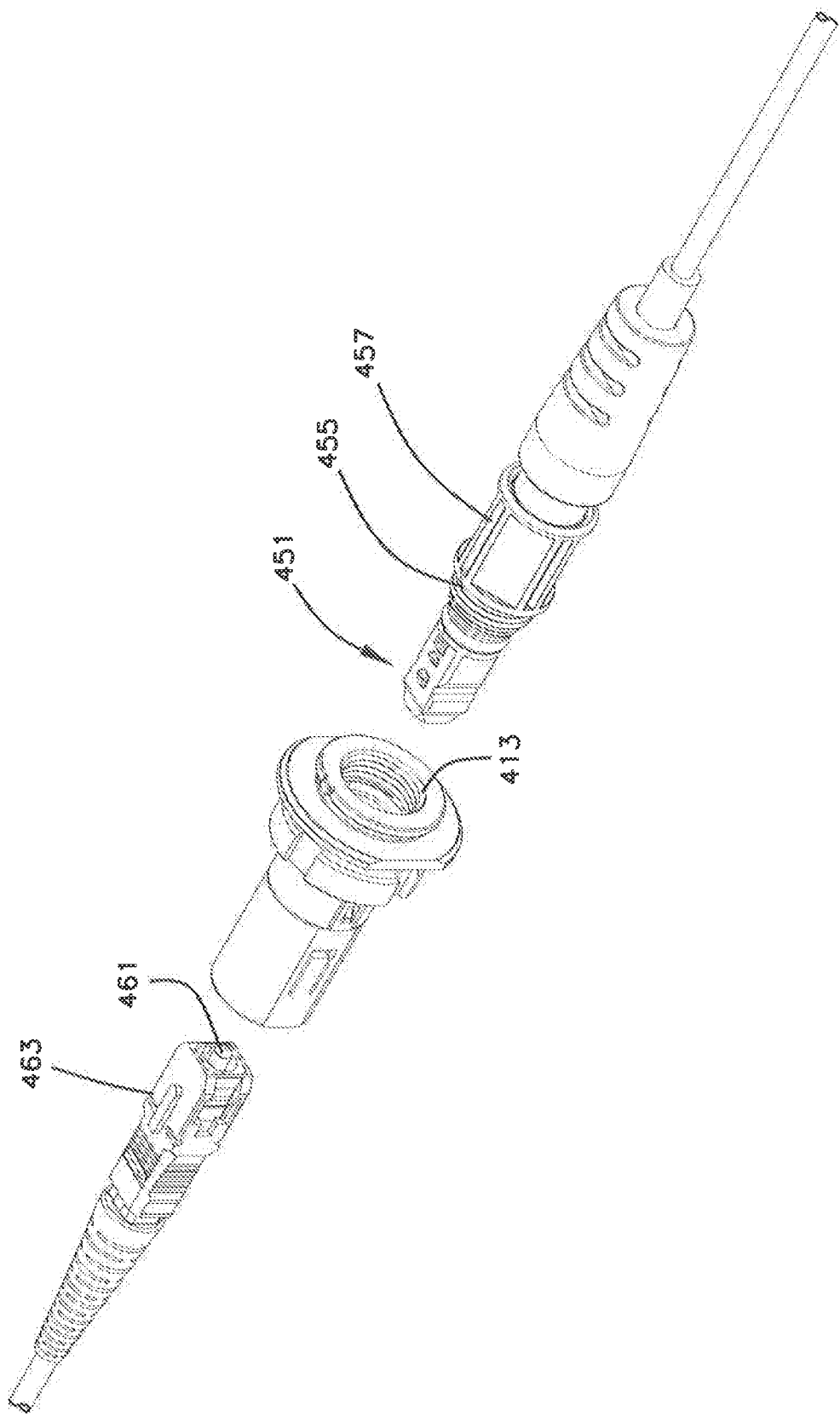
FIG. 34 is an exploded view showing fiber optic connectors suitable for mating with the hardened fiber optic adapter of FIG. 32.

FIG. 31 depicts an example multi-service terminal 430 that can be incorporated into a reconfigurable network in accordance with the principles of the present disclosure. The multi-service terminal 430 (i.e., drop terminal) includes an environmentally sealed housing 432. Typically, the housing 432 is not designed to be readily re-enterable. A fiber optic cable 434 (e.g., a drop cable) can enter the enclosure 432 through a sealed port location. In certain examples, the drop cable 434 includes a plurality of optical fibers which are fanned out within the interior of the enclosure 432. In other examples, the fiber optic cable 432 includes a relatively small number of fibers and a passive optical splitter or WDM device can be provided within the enclosure 432. The drop terminal 430 includes a plurality of ports 436 for receiving hardened fiber optic connectors from outside the exterior of the enclosure 432. The ports 436 can be formed at least in part by fiber optic adapters 438. The fiber optic adapters 438 can include hardened outer ports 436 that are accessible from outside the terminal housing 432 and non-hardened inner ports 440 that are accessible from inside the terminal housing 432. The fiber optic adapter 438 includes an adapter body 439 which may be one or more pieces. The adapter body 439 at least partially defines the hardened outer port 436 and the non-hardened inner port 440. A ferrule alignment sleeve 442 is mounted within the adapter body 439 in coaxial alignment with the non-hardened inner port 440 and the hardened outer port 436. In certain examples, the fiber optic adapter 438 is mounted within an opening 444 defined through a wall 446 in the terminal housing 432. A seal 448 can provide environmental sealing between the adapter body 439 and the wall of the terminal housing 432. A nut 449 can be threaded on a threaded portion of the adapter body to clamp the adapter body 439 in place relative to the terminal housing 432 and to compress the seal 448. When the hardened outer port 436 is not in use (i.e., when a connector is not inserted therein) a plug 447 having a seal and threads can be threaded into the hardened outer port 436 to keep the hardened outer port environmentally sealed. In certain examples, the hardened outer port 436 of the fiber optic adapter can include a twist-to-lock interface suitable for mating with a corresponding twist-to-lock interface provided on a ruggedized fiber optic connector 451 designed to be inserted within the hardened outer port. Example twist-to-lock interfaces include threaded interfaces and bayonet-style interfaces. As shown at FIG. 34, the twist-to-lock interface includes a threaded interface 453 defined within the threaded outer port which is adapted to mate with a threaded interface 455 provided on a threaded fastener 457 of the hardened fiber optic connector 451 designed to fit within the hardened outer port 436. The hardened fiber optic connector 451 can include a seal that provides environmental sealing between the fiber optic adapter 438 and the hardened fiber optic connector 451 when the hardened fiber optic connector 451 is inserted within the hardened port 436. The hardened fiber optic connector 451 includes a plug that fits within the hardened outer port 436. A ferrule 459 is positioned at an end of the plug. The ferrule 459 can support an optical fiber of an optical cable secured to the hardened fiber optic connector 451. When the hardened fiber optic connector 451 is installed within the hardened fiber optical port 436, the ferrule 459 fits within the ferrule alignment sleeve 442 such that the optical fiber supported within the ferrule 459 coaxially aligns with a fiber supported by a ferrule 461 of a non-ruggedized connector 463 within the interior of the drop terminal. In this way, an optical connection is made between the optical fiber inside the terminal and the optical fiber outside the terminal.

Figure 35:
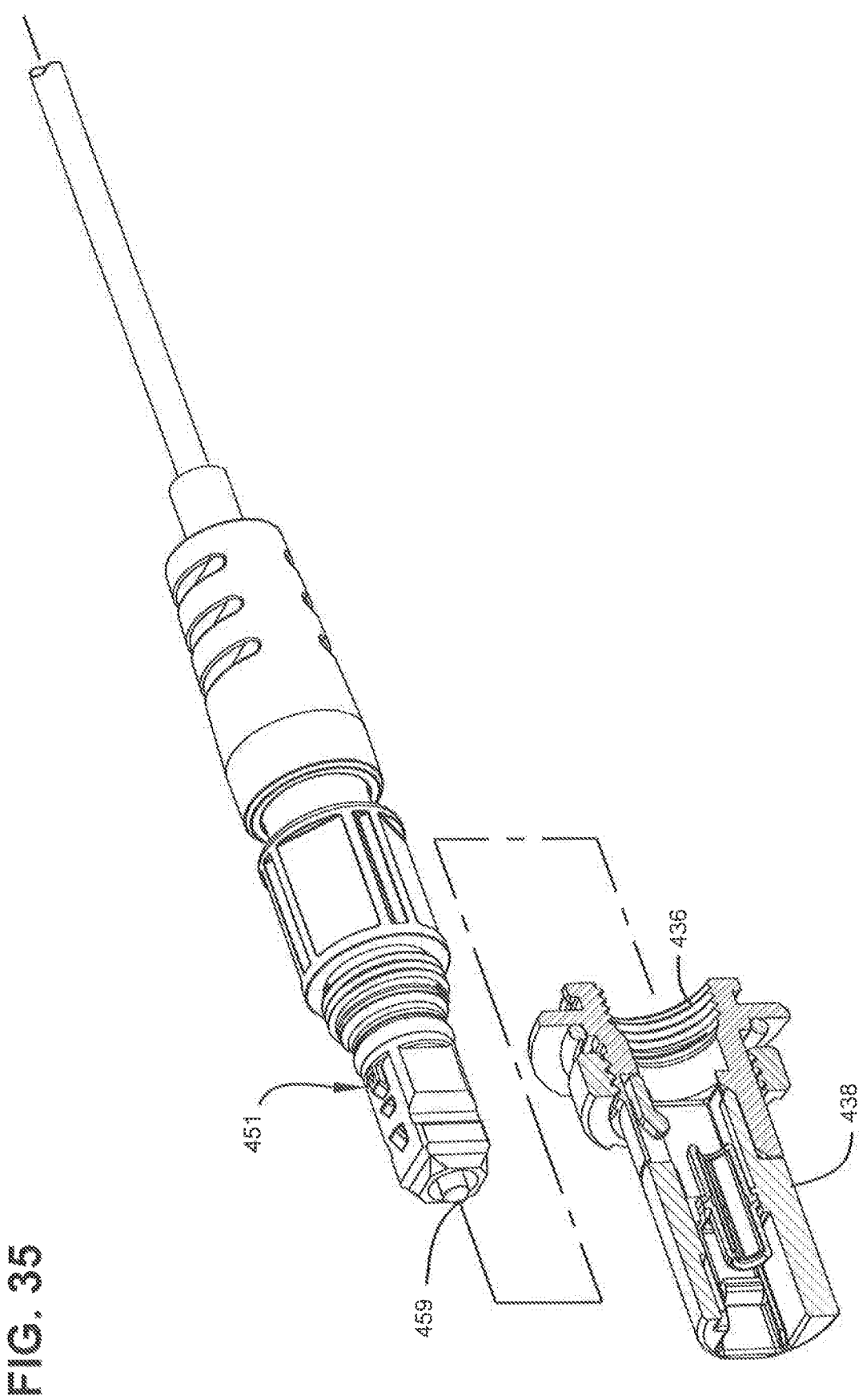
FIG. 35 is a partial cross-sectional view showing a hardened fiber optic connector adapted to be received within the hardened outer port of the hardened fiber optic adapter of FIG. 32.
Figure 36:
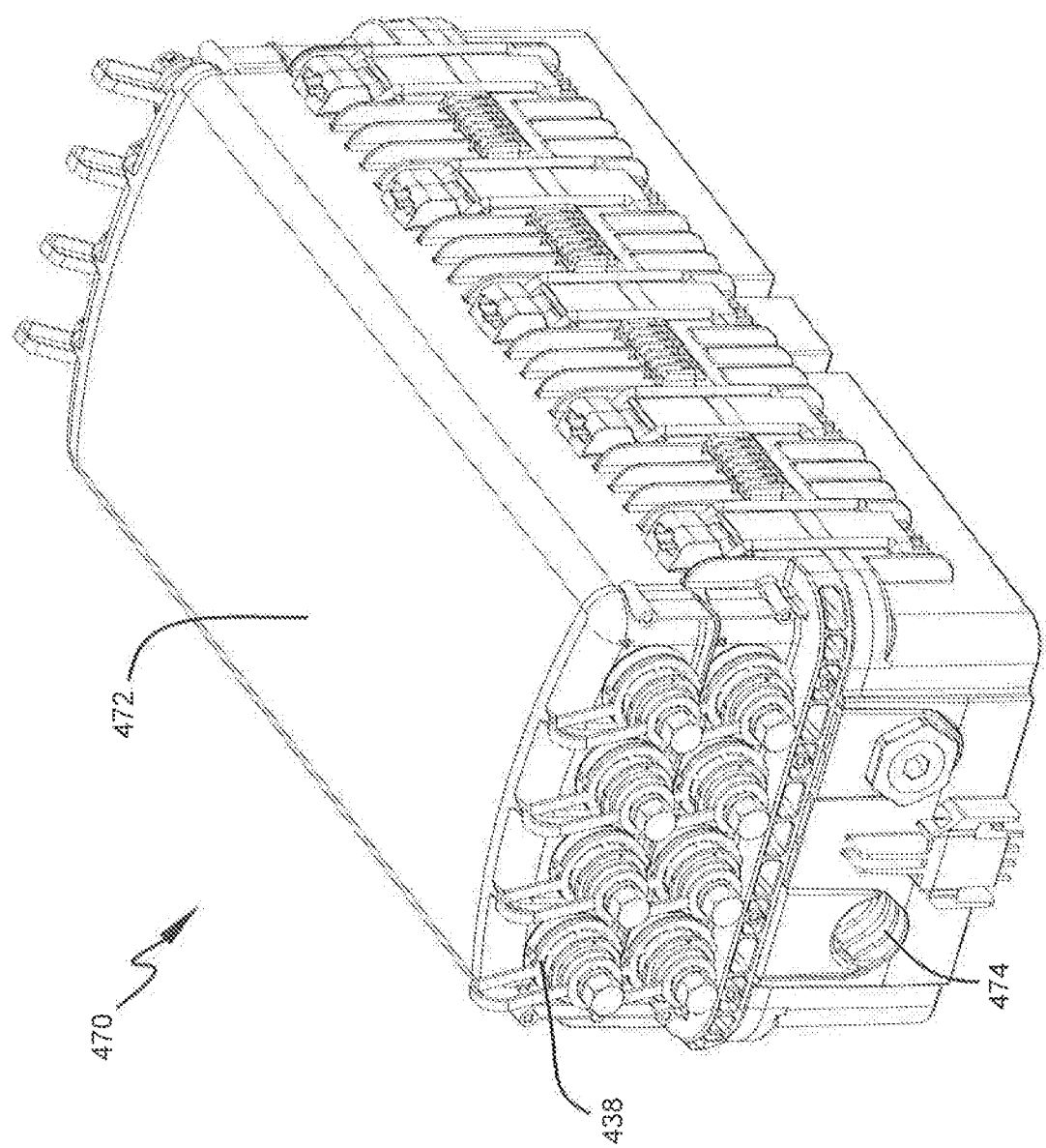
FIG. 36 illustrates an optical termination enclosure that can be integrated into fiber optic network architectures in accordance with the principles of the present disclosure.
Figure 37:
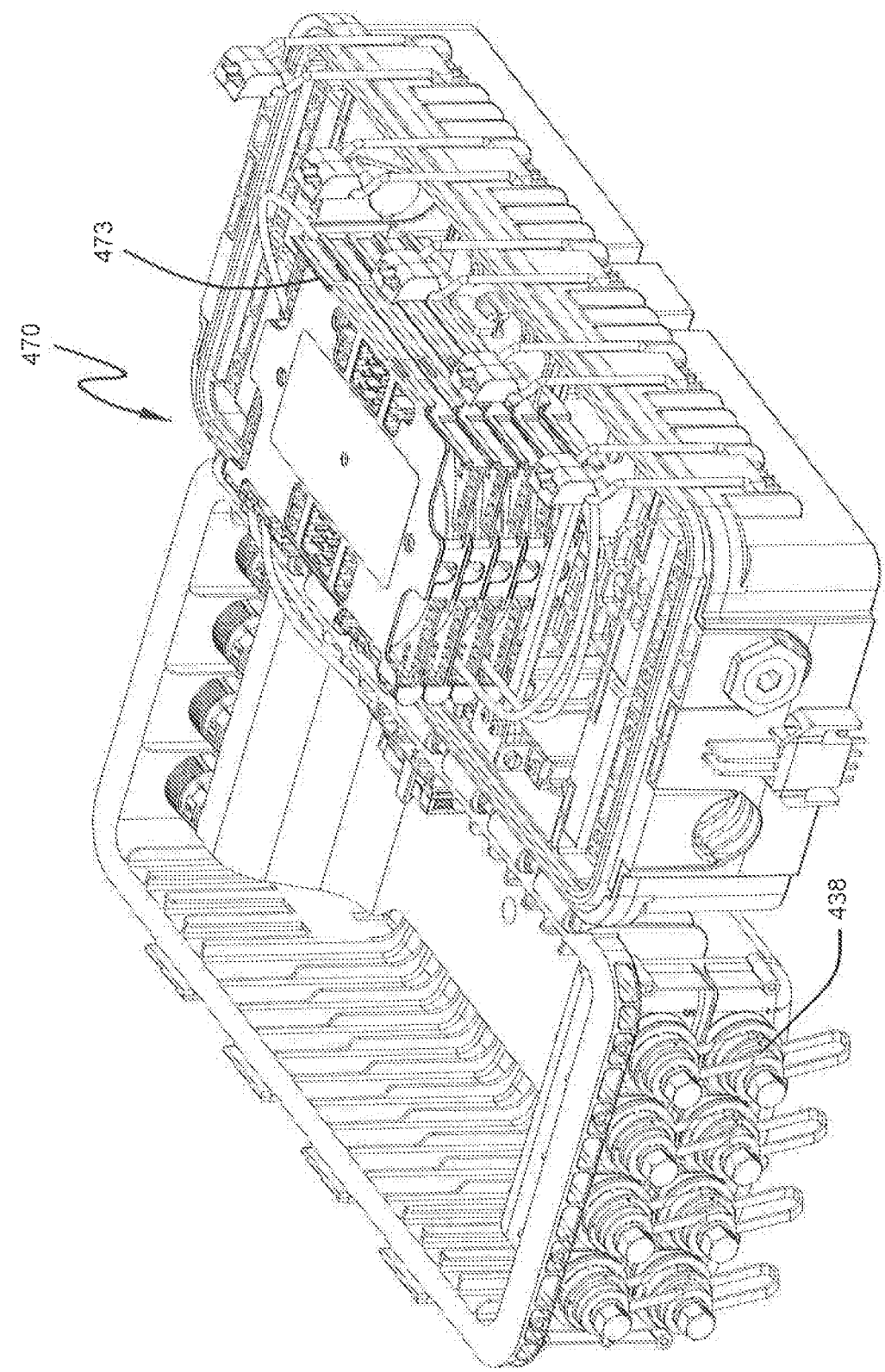
FIG. 37 shows the optical termination enclosure of FIG. 36 in an open configuration.

FIGS. 35 and 36 show an optical termination enclosure 470 suited to be integrated within a reconfigurable fiber optic network in accordance with the principles of the present disclosure. The optical termination enclosure includes a terminal housing 472 that is closed by latches or clamps and is designed to be open to facilitate accessing the interior. The enclosure 472 defines cable ports 474 for receiving pass-through cables. Typically, sealant is provided within the cable ports 474 for providing environmental seals around the cables (e.g., pass-through cables) routed into the terminal. Hardened connectivity can also be integrated with the terminal 472. For example, hardened fiber optic adapters 438 can be mounted to the terminal similar to the hardened fiber optic adapters 438 provided on the multi-service terminal 430. Within the interior of the terminal 472, fiber management trays and splice trays 473 are provided for managing optical splices between optical fibers of the pass-through cables and optical fibers routed to the hardened fiber optic adapters. In certain examples, drop cables can also be routed through sealed ports of the enclosure. In certain examples, additional components such as passive optical splitters and wavelength division multiplexing devices can be mounted within the terminal housing 472.

Example OTE's are disclosed by U.S. Pat. No. 8,213,760 and PCT Publication No. WO2015/150204 which are hereby incorporated by reference in their entireties. Example configurations for multi-service terminals are disclosed by U.S. Pat. Nos. 7,844,158; 7,397,997; and 7,512,304, which are hereby incorporated by reference in their entireties.

Figure 38:
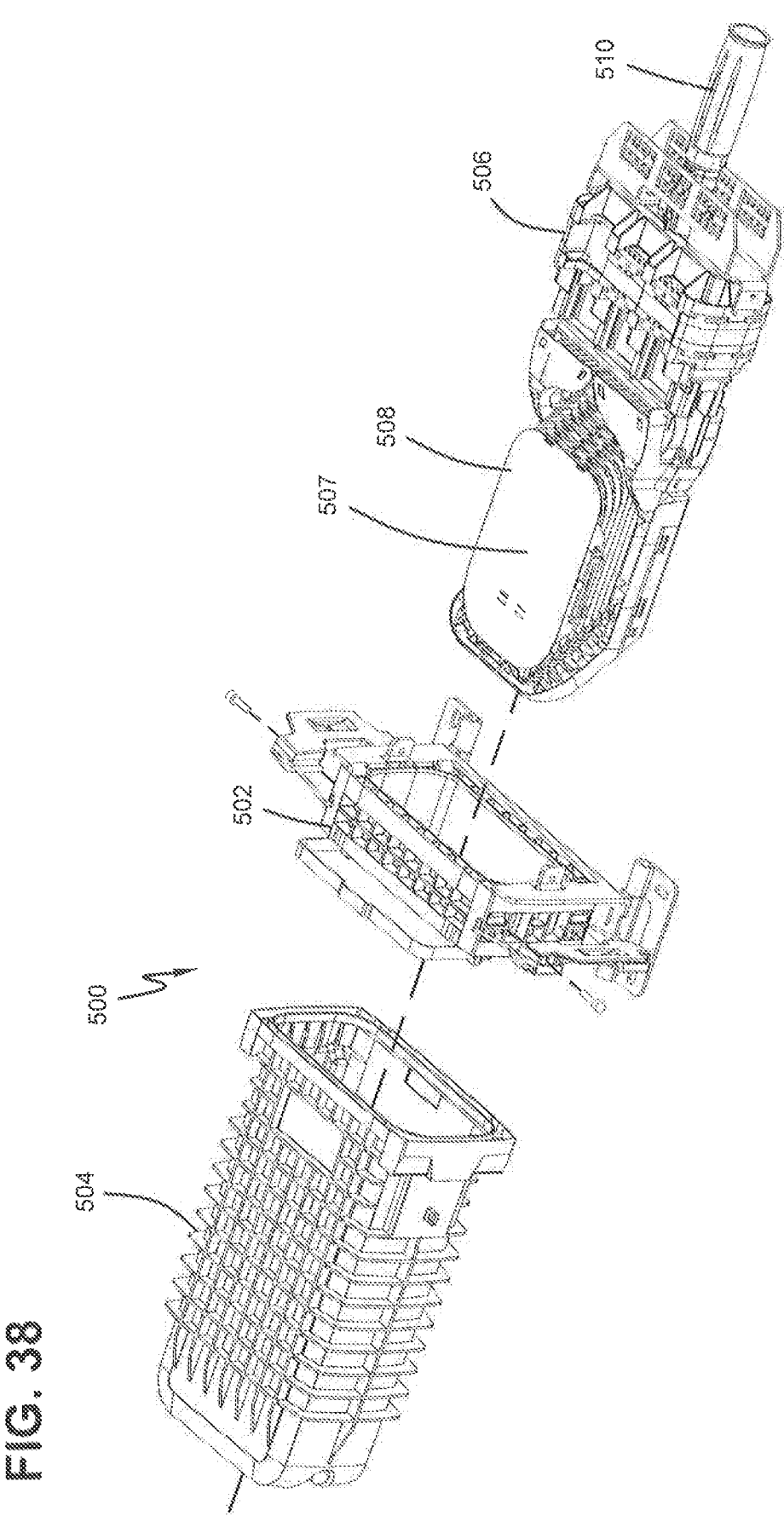
FIG. 38 is an exploded view of a splice enclosure that can be integrated into fiber optic network architectures in accordance with the principles of the present disclosure.

FIG. 38 shows an example splice enclosure 500 including a housing having a base 502 and a cover 504. The base 502 and the cover 504 can be secured together (e.g., clamped together) and a seal can be used to provide an environmental sealing between the base 502 and the cover 504. In certain examples, the cover 504 has a dome-style configuration with a closed end position opposite from an open end. The splice enclosure 500 also includes a sealing unit 506 attached to a fiber management unit 508. The fiber management unit can include a plurality of trays 507 for managing optical fibers and for supporting optical splices. Additionally, structures such as optical splitters and wavelength division multiplexing devices can be supported on the trays. The sealing unit typically includes a sealant such as gel which defines a plurality of cable ports for providing sealing about cables routed into the interior of the splice enclosure. An actuator 510 can be used to pressurize the sealant to cause the sealant to form tightly about the cables to provide a better seal. An outer periphery of the sealant can provide a circumferential seal with an inner surface of the base 502. Example splice enclosures are disclosed by U.S. Pat. Nos. 8,989,550 and 9,948,082, which are hereby incorporated by reference in their entireties.

VI. Fiber Optic Network Architecture

Figure 39:
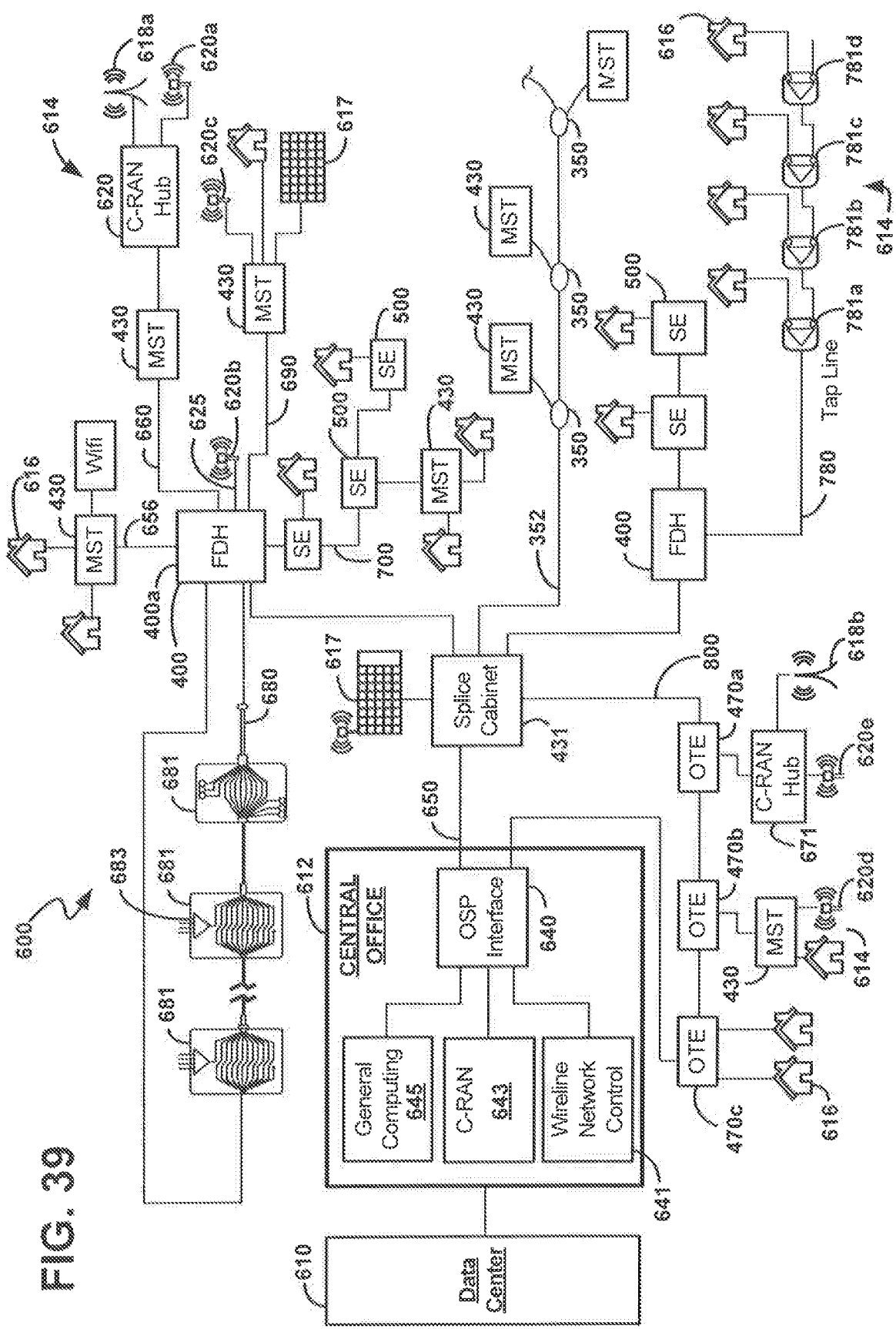
FIG. 39 shows an example fiber optic network architecture in accordance with the principles of the present disclosure.

FIG. 39 discloses a network 600 in accordance with the principles of the present disclosure. The fiber optic network 600 radiates outwardly from a central location including a data center 610 and a central office 612. A fiber optic core or backbone extends outwardly from the central office 612 and supports various branches that extend outwardly to an edge 614 of the network 600. The fiber optic network 600 provides services to individual subscriber locations 616 and larger facilities 617 (e.g., multi-dwelling units, businesses, universities, public facilities, stadiums and campuses). The fiber optic network can also provide fiber optic connectivity used to support cellular networks such as macro cells 618 and small cells 620.

In the depicted example, the network 600 includes fiber distribution hubs 400, multi-service terminals 430, splice cabinets 431, optical termination enclosures 470, and splice enclosures 500. In other networks in accordance with the principles of the present disclosure, one or more of the depicted types of components may be used to extend the network. It will be appreciated that switching technology of the type described herein (e.g., NXN switching matrices, drop line switching matrices, reconfigurable splitter architectures; loop back or cross connect switching architectures, and other switching architectures) can be incorporated into the optical termination enclosures and/or the splice enclosure and/or the fiber distribution hubs and/or into the multi-service terminals and/or into splice cabinets.

Referring to FIG. 39, the central office 612 includes an outside plant interface 640 which often includes racks of optical connection equipment. The central office 612 also includes wireline network control 641 such as optical line terminals that assist in managing and controlling signal traffic through the network. The central office 612 can further include centralized radio access network (C-RAN) 643 computing capabilities such as a base band unit/digital function unit. The central office 612 further includes general computing capability 645.

Core or trunk cables can be routed outwardly from the OSP interface 640 to various locations. As depicted, a main trunk cable 650 is routed through the splice cabinet 431 to a fiber distribution hub 400a. A first branch 656 which includes an MST 430 supporting a plurality of subscriber locations 616 and local wireless services such as Wi-Fi services. The FDH 400a also includes a second branch 660 including multi-service terminal 430 providing optical communications with a C-RAN hub 670. The C-RAN hub provides localized computing at the edge and can include base band unit processing capabilities. The C-RAN hub 670 supports a macro cell 618*a* which typically includes a plurality of radio heads and corresponding antenna supported on a tower. The C-RAN hubs 670 also supports a small cell 620*a* which also typically includes a radio head and an antenna mounted generally at a lower location such as a phone pole. A third branch 675 extends outwardly from the fiber distribution hub 400*a* to provide optical communication with a small cell 620*b*. A fourth branch 690 extends outwardly from the fiber distribution hub 654 and includes an MST 430 coupled to a small cell 620*c*, a subscriber location and multi-dwelling unit. A fifth branch 700 includes a chain of splice enclosures 500 coupled to subscriber locations either directly by drop lines or indirectly through an MST 430.

An indexing line 680 outwardly from the fiber distribution hub 654. The indexing line can have a looped configuration and can include a plurality of indexing terminals 681 at which optical fibers are dropped from the main line to facilitate accessing at subscriber locations. At least some of the indexing terminals 681 can include passive optical splitters 683. In certain examples, the passive optical splitters can include reconfigurable splitting architectures of the type previously described herein by which the output provided at the drop locations of the indexing terminal can be varied in power. In certain examples, multiple split ratios could be utilized and/or ports can also be provided with un-split signals suitable for point-to-point communication. In alternative examples, the terminal 340 of FIG. 27 can be used in place of the indexing terminals 681. In this way, at each of the drop locations corresponding to each of the terminals, individual drop lines can be selected via the switching architecture. This allows the system to be more readily reconfigured to meet customer demand and to enhance the most effective use of optical power.

In certain examples, the C-RAN hub 670 can include internal processing capabilities typically provided by a base band unit that interfaces with the radio units of the macro cell 618*a* and the small cell 620*a* to control operation of such cells. In certain examples, supplemental processing can be provided by the C-RAN 643 at the central office 610. By providing remote switching architectures at the FDH 400*a*, the system can be operated in a web-style configuration to make use of the computing power provided at the C-RAN hub 670. For example, the C-RAN hub 670 can be coupled through the FDH 400*a* to the small cell 620*b* of the third branch 675 as well as the small cell 620*c* of the fourth branch 690. In certain examples, the switching circuitry can include loop back or cross connect switching circuitry. In this way, it is not necessary to utilize the C-RAN 643 at the central office 612 to control the small cells 620*b*, 620*c* that are in the general vicinity of the remote C-RAN hub 670. This promotes a more efficient allocation of resources and can result in faster operation of the system.

The fiber optic network 600 also includes the fiber optic distribution cable 352 having integrated breakout locations 350. The integrated breakout locations 350 can have the same general configuration as the breakout location 350 of FIG. 28. Thus, remote switching capabilities can be integrated into each of the breakout locations 350 of the cable 352 to allow for maximum flexibility and re-configurability in this system.

Figure 40:
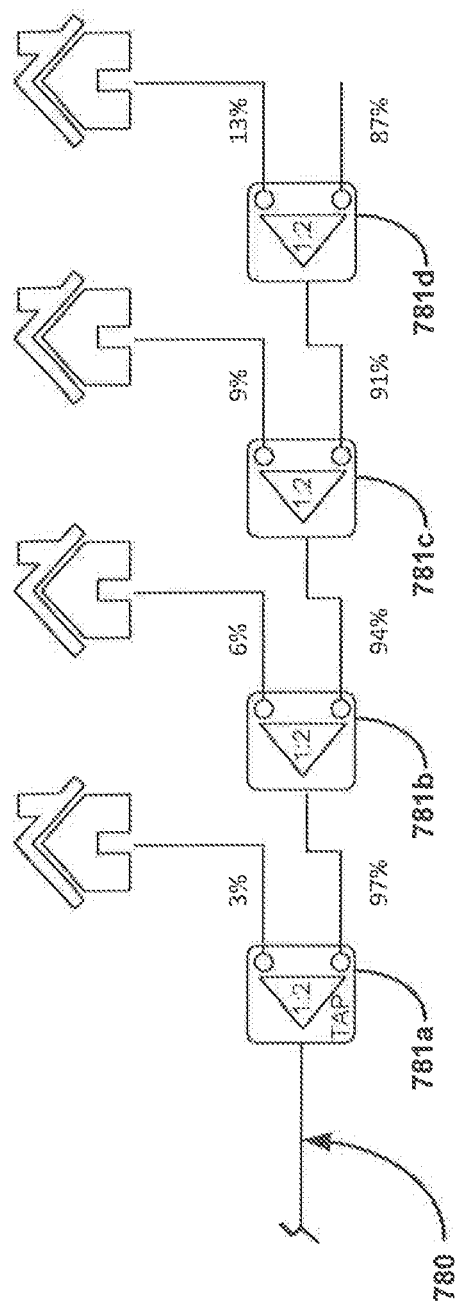
FIG. 40 is an enlarged view of a tap line of the fiber optic network architecture of FIG. 39.

The fiber optic network can also include a tap line architecture for distributing services to subscriber locations. Branch line 780 is an example of a tap line. The tap line 780 includes a plurality of tapping terminals 781*a*-781*d* that are strung together along the branch. At each of the terminals 781*a*-781*d*, a portion of the main signal is tapped off. In order to maintain uniform power at each of the tap locations, it is necessary for the tapping percentage to increase along the length of the tapping chain (see FIG. 40). In certain examples, the tapping terminals can have reconfigurable taps that allow the power of the tapped signal to be reconfigured as needed. For example, if it is necessary to add a tap location at an intermediate location along the chain of tapping terminals, the tapping terminals downstream of the added tapping terminal can have their tapping percentage increased so that sufficient power is tapped.

Referring still to FIG. 39, the fiber optic network also includes a distribution loop 800 including a plurality of terminals such as optical termination enclosures 470. The optical termination enclosures 470 support subscriber locations, small cells 620*d*, 620*e* and a macro cell 618*b*. A C-RAN hub 671 having computing in the form of base band processing is supported with fiber optic communications distributed by the distribution loop 800. The C-RAN 671 is at the edge of the network. By utilizing switching within the optical termination enclosures 470*a*, 470*b*, the base band unit processing abilities in the C-RAN hub can be used to interface with the small cell 620*d* corresponding to optical termination enclosure 470*b* without requiring centralized processing. In certain examples, block switching can be incorporated at the OSP interface 640 and at the OTE 470*a* to switch between a forward feed direction and a reverse feed direction at the OTE. For example in the case of a line failure in the forward direction, the OSP interface 640 can use block switching to switch the optical signals corresponding to OTE 470*a* to the reverse direction to that service to the OTE 470*a* and the C-RAN 671 hub are not interrupted or are only minimally interrupted.

VII. Reconfigurable Wavelength Division Multiplexer/Demultiplexer

Figure 41:
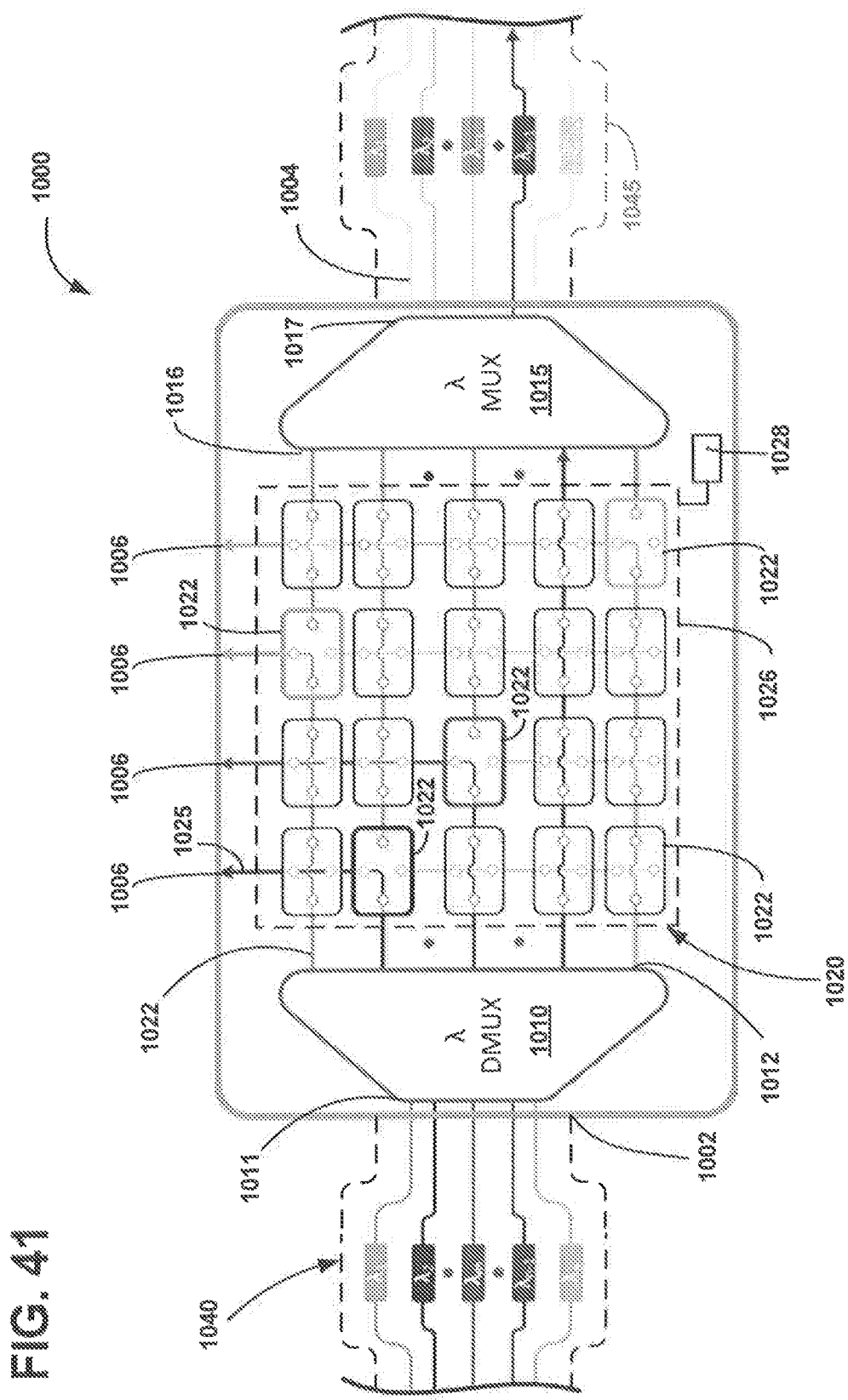
FIG. 41 is a schematic diagram of an example signal access unit configured to drop optical signals having one or more selected wavelengths from an input of the signal access unit to one or more access ports or to add optical signals having a selected wavelength from one or more access ports to an output of the signal access unit in accordance with the principles of the present disclosure.

Referring to FIG. 41, a signal access unit 1000 receives an input of optical signals having a plurality of different wavelengths. The signal access unit 1000 has a main output 1004 and at least one access line 1006. The signal access unit 1000 is configured to selectively direct optical signals having a selected wavelength between an input 1002 and the access line 1006 and/or between the access line 1006 and the main output 1004. Optical signals not having the selected wavelength pass through the signal access unit 1000 between the input 1002 and the main output 1004.

The signal access unit 1000 includes a switch arrangement 1020 including a switch 1022 that is optically coupled to the input 1002, the output 1004, and the access line 1006. The switch 1022 is configured to transition between a first configuration and a second configuration. The switch 1022 optically couples the input 1002 to the output 1004 and not to the access line 1006 when in the first configuration. The switch 1022 optically couples the access line 1006 to at least one of the input 1002 and the output 1004 without optically coupling the input 1002 and the output 1004 together when in the second configuration.

In some implementations, the input 1002 receives a connectorized end of a separate cable 1040. In other implementations, the input 1002 is a connectorized end of a stub cable 1040. In certain examples, the cable 1040 includes an optical fiber carrying optical signals of different wavelengths $\lambda 1$-$\lambda n$. In some implementations, the output 1004 receives a connectorized end of a separate cable 1045. In other implementations, the output 1004 is a connectorized end of a stub cable 1045. In certain examples, the cable 1045 includes an optical fiber carrying optical signals of different wavelengths $\lambda 1$-$\lambda n$.

In certain implementations, a controller 1028 is configured to receive an indication of a selected wavelength and to operate the switch arrangement 1020 to change the switch 1022 between the first and second configurations based on the indication of the selected wavelength. In certain examples, the controller 1028 communicates with the switch arrangement 1020 over a circuit board 1026.

In certain implementations, the signal access unit 1000 includes a demultiplexer 1010 coupled to the input 1002 and a multiplexer 1015 coupled to the main output 1004. The demultiplexer 1010 is configured to separate optical signals received at the input 1002 onto a plurality of demultiplexer outputs 1012 based on wavelength. The multiplexer 1015 is configured to combine optical signals received at a plurality of multiplexer inputs 1016 and to direct the combined signal to the output 1004. The switch 1022 optically couples to the input 1002 via at least one of the demultiplexer outputs 1012 and optically couples to the output 1004 via at least one of the multiplexer inputs 1016.

In certain implementations, the signal access unit 1000 includes a plurality of access ports 1006. Each access line 1006 is configured to be optically coupled to one of the demultiplexer outputs 1012 and/or to one of the multiplexer inputs 1016. In certain examples, the signal access unit 1000 includes more demultiplexer outputs 1012 than access ports 1006. Any demultiplexer output 1012 not optically coupled to one of the access ports 1006 is optically coupled to a respective one of the multiplexer inputs 1016. In the example shown, the signal access unit 1000 has five demultiplexer outputs 1012. In other examples, however, the signal access unit 1000 can have any desired number (e.g., two, three, four, six, eight, ten, twelve, sixteen, twenty-four, thirty-two, sixty-four, etc.) of demultiplexer outputs 1012.

The switches 1022 of the switch arrangement 1020 can be any desired type of switch. Some example switches 1022 suitable for use in the switch arrangement 1020 are shown with reference to FIGS. 1-2 and 5-6. For example, the switches 1022 may include total internal reflection (TIR) switches. In another example, the switches 1022 may include adiabatic switches.

Referring back to FIG. 41, each switch 1022 has a first optical line 1024 extending between one of the demultiplexer outputs 1012 and one of the multiplexer inputs 1016. Each switch 1022 also has a second optical line 1025 extending between the switch 1022 and one of the access ports 1006. The controller 1028 actuates each switch 1022 to fill the bar 1023 with the index matching liquid or empty the bar 1023.

Figure 42:
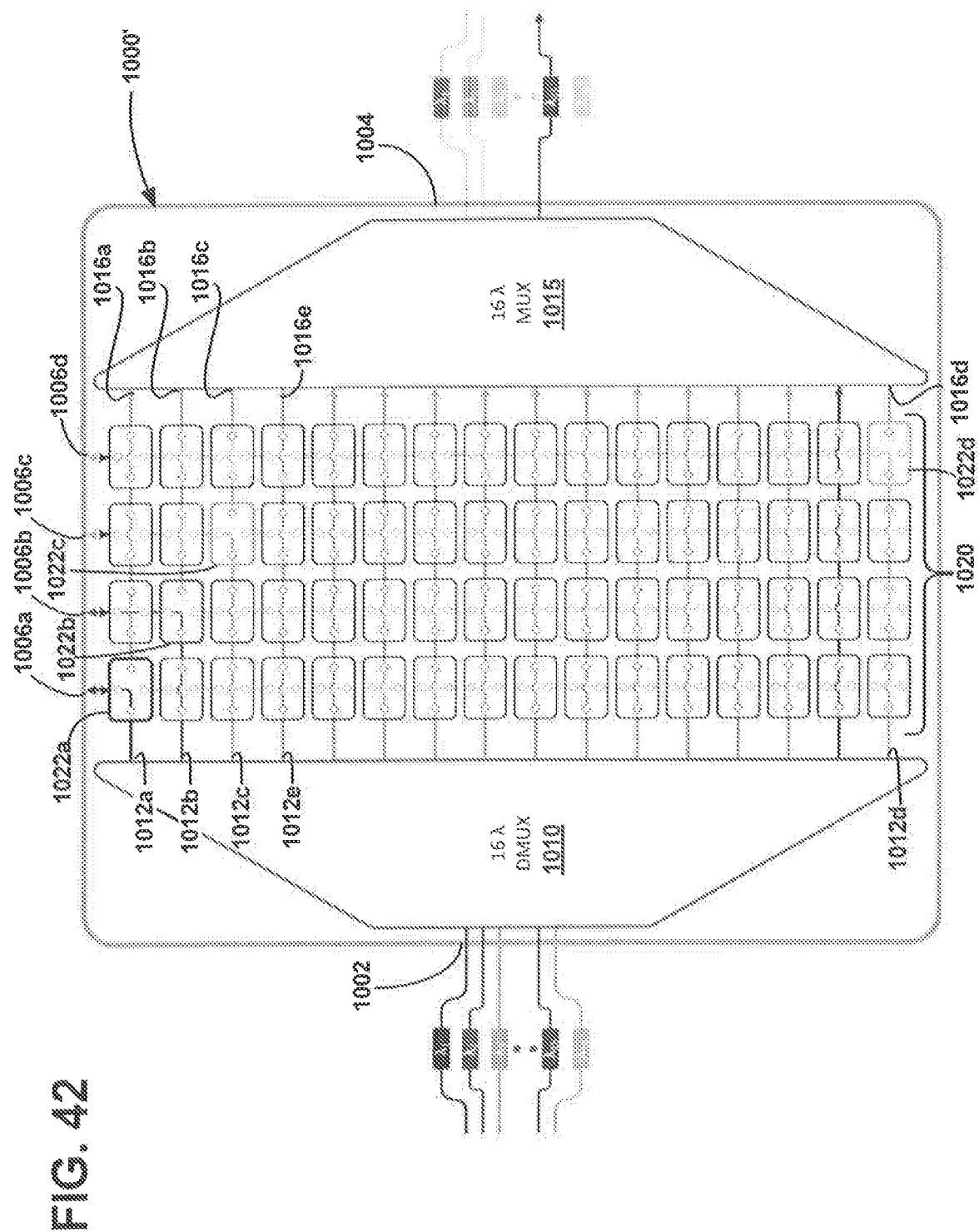
FIG. 42 illustrates the signal access unit of FIG. 41 with additional channels shown.
Figure 43:
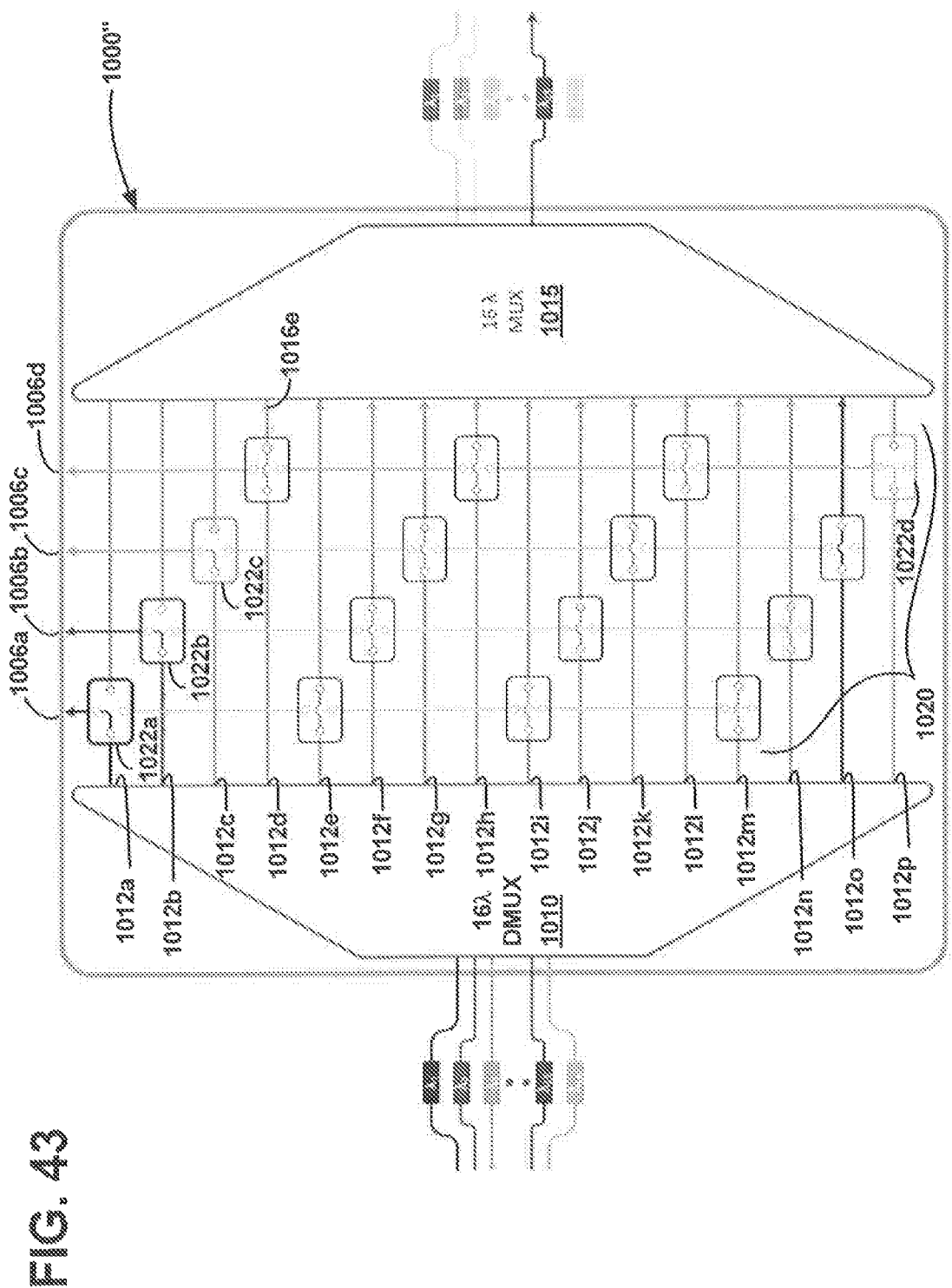
FIG. 43 illustrates the signal access unit of FIG. 42 with a simplified switch arrangement.

FIGS. 42 and 43 illustrate signal access units 1000', 1000" that are substantially the same as the single access unit 1000 shown in FIG. 41 except that additional channels extend between the demultiplexer 1010 and the multiplexer 1015. As the term is used herein, a "channel" refers to an optical line extending between a demultiplexer output and a multiplexer input. Each channel receives optical signals of a particular wavelength or wavelength band from the demultiplexer 1010. In the signal access units 1000', 1000" each have four access ports 1006*a*, 1006*b*, 1006*c*, 1006*d* and sixteen channels extending between the demultiplexer outputs 1012 and the multiplexer inputs 1016. A first demultiplexer output 1012*a* is optically coupled to a first access line 1006*a* via a first switch 1022*a*, a second demultiplexer output 1012*a* is optically coupled to a second access line 1006*a* via a second switch 1022*a*, a third demultiplexer output 1012*a* is optically coupled to a third access line 1006*a* via a third switch 1022*a*, and a fourth demultiplexer output 1012*a* is optically coupled to a fourth access line 1006*a* via a fourth switch 1022*a*. The remaining demultiplexer outputs 1012 are optically coupled to respective multiplexer inputs 1016.

The signal access units 1000', 1000" differ in the number of switches 1022 that connect the channels to the access ports 1006. In FIG. 42, the switch arrangement 1020 has a sufficient number of switch to selectively couple any of the channels to any of the access ports 1006*a*-1006*d*. For example, the number of switches 1022 is equal to the number of access ports 1006 multiplied by the number of channels. In FIG. 43, however, the switch arrangement 1020 can only couple each access line 1006*a*-1006*d* to some of the optical channels. In the example shown, the switch arrangement 1020 has four switches 1022 optically coupled to each access line 1006*a*-1006*d*. The four switches 1022 are optically coupled to four of the demultiplexer outputs 1012. For example, the first access line 1006*a* can be optically coupled to demultiplexer output 1012*a*, 1012*e*, 1012*i*, 1012*m*, but cannot be optically coupled to any of demultiplexer outputs 1012*b*-1012*d*, 1012*f*-1012*h*, 1012*j*-1012*l*, or 1012*n*-1012*p*.

Accordingly, the signal access unit 1000" is less flexible than the signal access unit 1000' in that the signal access unit 1000" is less customizable in which signal wavelength can be supplied to each access line 1006. However, the signal access unit 1000" requires fewer switches 1022 than the signal access unit 1000'. Accordingly, the signal access unit 1000" is cheaper than the signal access unit 1000' in terms of material cost, can be made smaller than the signal access unit 1000', and has lower switch loss.

In some implementations, the access port(s) 1006 of the signal access unit 1000, 1000', 1000" are drop port(s) and the switch arrangement 1020 optically couples each drop port 1006 to the input 1002. In such implementations, at least one of the multiplexer inputs 1016 does not receive signals from either the input 1002 or the drop port 1006. Rather, the at least one multiplexer input 1016 may be a dark line. In other implementations, the access port(s) 1006 of the signal access unit 1000, 1000', 1000" are add port(s) and the switch arrangement 1020 optically couples each add port 1006 to the output 1004. In such implementations, at least one of the demultiplexer outputs 1012 does not optically couple to either the output 1004 or the add port 1006. Rather, the at least one demultiplexer output 1012 may be a dark line. In still other implementations, some of the access ports 1006 of the signal access unit 1000, 1000', 1000" are drop port(s) and some of the access ports 1006 of the signal access unit 1000, 1000', 1000" are add port(s). In still other implementations, each access line 1006 of the signal access unit 1000, 1000', 1000" may be both a drop port and an add port as will be described herein.

Figure 44:
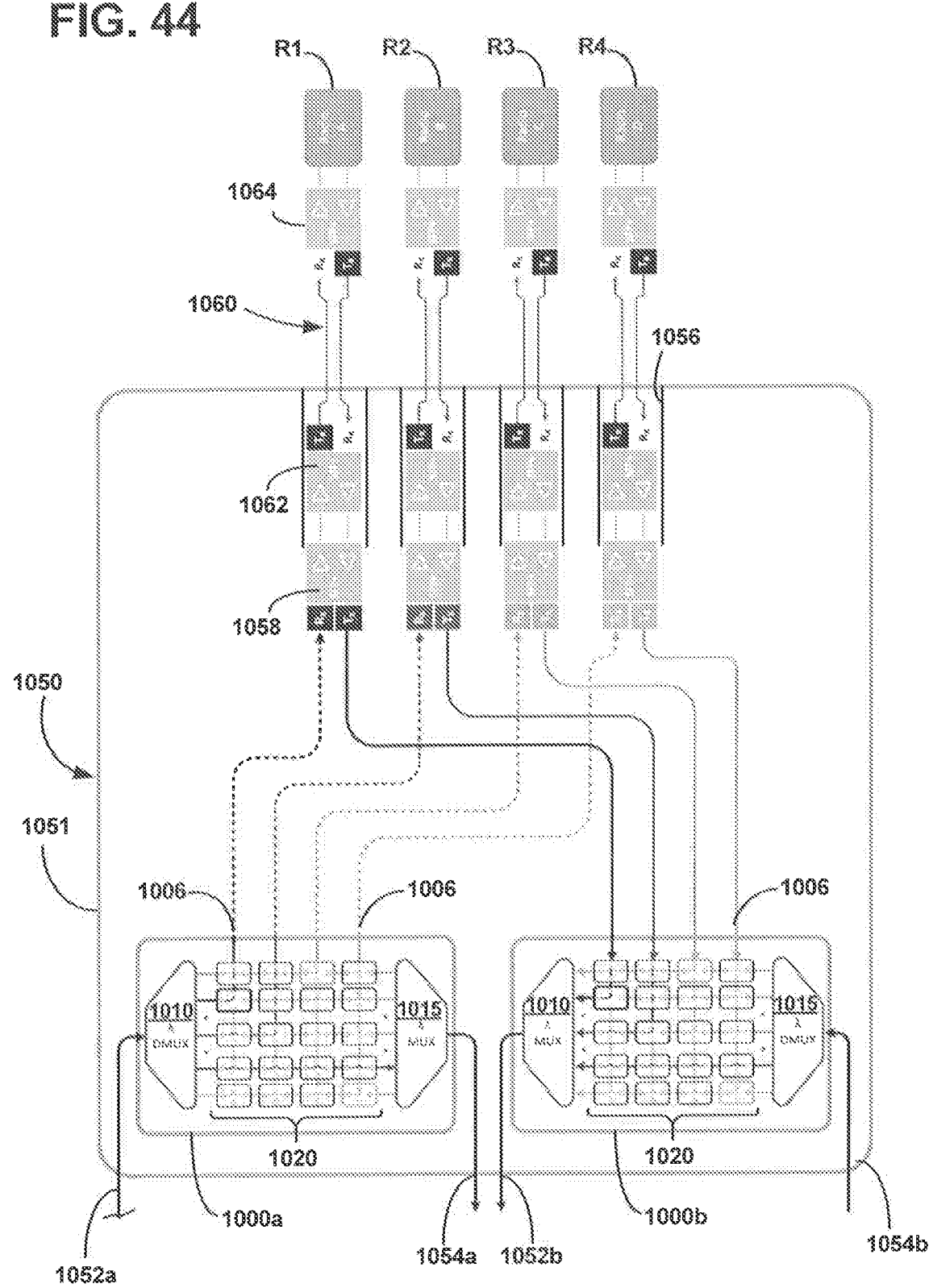
FIG. 44 is a schematic diagram of an example signal access enclosure including first and second signal access units of FIG. 41 within a sealed interior such that optical signals dropped from the first signal access unit are provided to transmit lines of the access ports and optical signals added to the second signal access unit are provided from the receive lines of the access ports.
Figure 45:
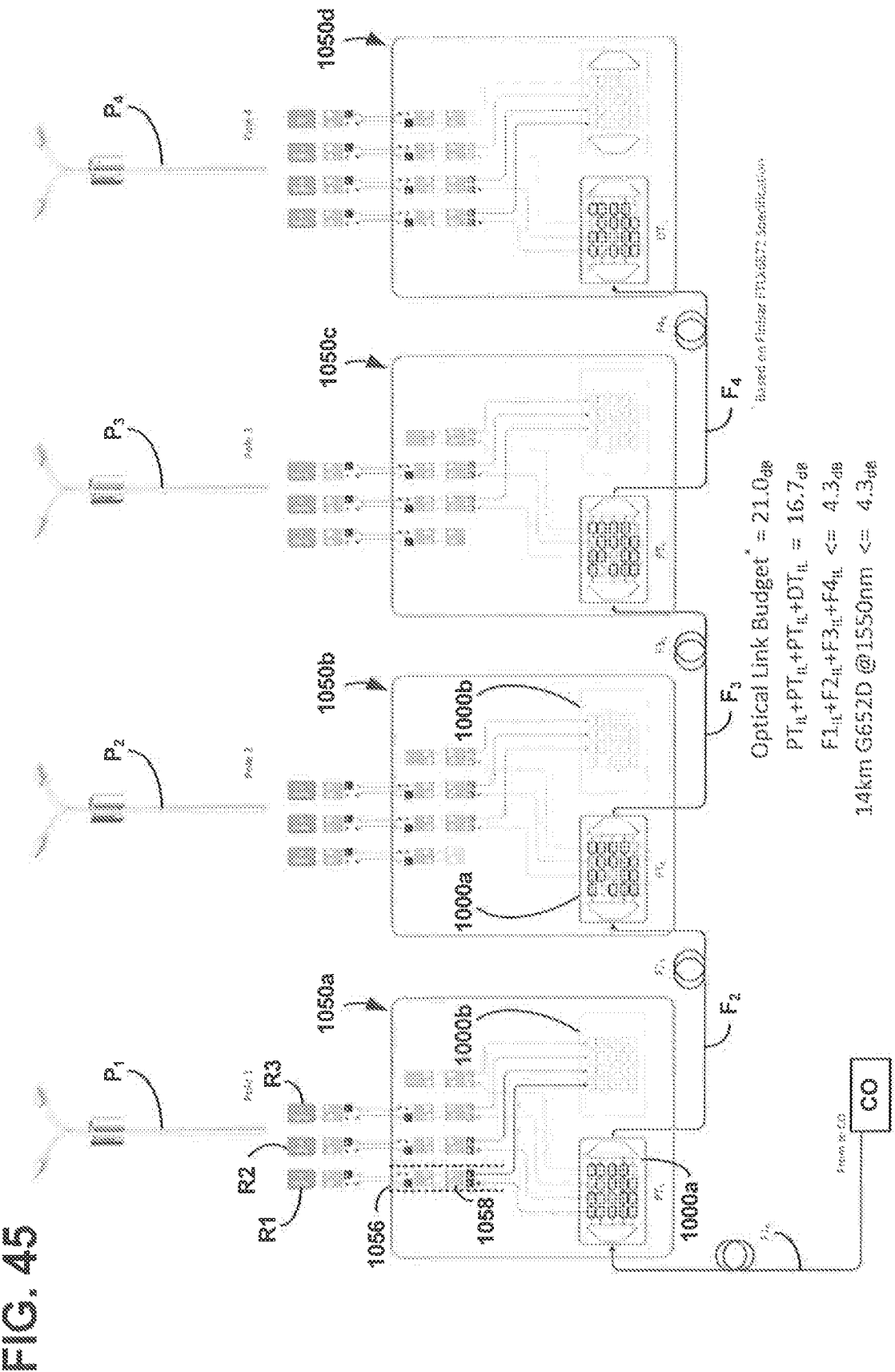
FIG. 45 illustrates multiple signal access enclosures of FIG. 44 chained together in a network.

FIGS. 44 and 45 illustrate a signal access enclosure 1050 that includes first and second signal access units. The first and second signal access units can include any of the signal access units 1000, 1000', 1000" discussed herein. The signal access enclosure 1050 includes a body 1051 defining a first input 1052*a*, a second input 1052*b*, a first output 1054*a*, a second output 1054*b*, and multiple access ports 1056. The first and second signal access units 1000*a*, 1000*b* are disposed within the body 1050.

Each of the signal access units 1000*a*, 1000*b* includes a demultiplexer 1010, a multiplexer 1015, and a switch arrangement 1020. The first signal access unit 1000*a* drops optical signals of selected wavelengths and the second signal access unit 1000*b* adds optical signals of selected wavelengths. The switch arrangement 1020 of the first signal access unit 1000*a* connects select output channels of the demultiplexer 1010 of the first signal access unit 1000*a* to corresponding access lines 1006 of the first signal access unit 1000*a*. The switch arrangement 1020 of the second signal access unit 1000*b* connects select input channels of the multiplexer 1010 of the second signal access unit 1000*b* to corresponding access lines 1006 of the second signal access unit 1000*b*. Outputs of the demultiplexer 1010 of the first signal access unit 1000*a* that are not directed to access lines 1006 are instead directed to the multiplexer 1015 and combined onto the first output 1054*a*. Inputs of the multiplexer 1015 of the second signal access unit 1000*b* that are not received from the access lines 1006 are instead combined onto the second output 1054*b*.

In certain implementations, the access lines 1006 of the signal access units 1000*a*, 1000*b* are routed to connectors 1058 at the access ports 1056. In some examples, each connector 1058 receives an access line 1006 from the first signal access unit 1000*a* and an access line 1006 from the second signal access unit 1000*b*. Accordingly, the connector 1058 may have a transmit line Tx and a receive line Rx. In an example, the connector 1058 is an SFP+ connector.

An add/drop cable 1060 may optically couple the signal access enclosure 1050 to a radio head R1-R4 or other equipment via one of the access ports 1056. For example, each add/drop cable 1060 may have a first connectorized end 1062 and a second connectorized end 1064. The first connectorized end 1062 is plugged into one of the access ports 1056. The second connectorized end 1064 is plugged into one of the radio heads R1-R4.

The signal access enclosure 1050 includes ruggedized access ports 1056. For example, each access port 1056 is configured to environmentally seal the enclosure interior and to robustly secure (e.g., via a twist-to-lock fastener) to an add/drop cable 1060. In certain examples, the access ports 1056 are configured so that the first connectorized ends 1062 of the add/drop cables 1060 are received within the environmentally sealed interior of the body 1051 when plugged into the access ports 1056.

FIG. 45 illustrates multiple signal access enclosures 1050*a*-1050*d* chained together in network. In the example shown, each signal access enclosure 1050*a*-1050*d* is disposed at a pole P1-P4 at which antennas are disposed. Radio heads R1, R2, R3, etc. are also disposed at the poles P1-P4 to supply signals to the antennas and receive signals from the antennas. Each signal access enclosure 1050*a*, 1050*b*, 1050*c*, 1050*d* is associated with a pole P1, P2, P3, P4. In other examples, however, multiple signal access enclosures 1050 could service the radio heads at a single pole or a signal access enclosure 1050 could service radio heads at multiple poles.

As shown in FIG. 45, a first feeder cable F1 optically couples a central office CO to a first signal access enclosure 1050*a*. In an example, the first feeder cable F1 includes only a single optical fiber. The first feeder cable F1 is optically coupled to the first input 1052*a* of the first signal access enclosure 1050*a*. One or more signal wavelengths (or wavelength bands) are dropped at the first signal access enclosure 1050*a*. Each access port 1056 is associated with a selected wavelength or wavelength band. In certain examples, each access port 1056 has a transmit line Tx and a receive line Rx associated with a selected wavelength or wavelength band.

In the example shown, each signal access enclosure 1050*a*-1050*d* has four access ports 1056. In other examples, however, the signal access enclosures 1050*a*-1050*d* can have any desired number of access ports 1056 (e.g., a suitable number of access ports 1056 to provide service to any radio heads at a corresponding pole). In the example shown, each of the signal access enclosures 1050*a*-1050*d* includes five channels. In other examples, however, each signal access enclosure 1050*a*-1050*d* can have any desired number of channels.

One end of a second feeder cable F2 is optically coupled to the first output 1054*a* of the first signal access enclosure 1050*a*. An opposite end of the second feeder cable F2 is optically coupled to the first input 1052*a* of the second signal access enclosure 1050*b*. Accordingly, optical signals having wavelengths not dropped at the first signal access enclosure 1050*a* are input into the first signal access unit 1000 of the second signal access enclosure 1050*b*. At the second signal access enclosure 1050*b*, optical signals of selected wavelengths are dropped and/or added via respective access ports 1056.

In some examples, the selected wavelengths dropped/added at the second signal access enclosure 1050*b* are different from the selected wavelengths dropped/added at the first signal access enclosure 1050*a*. In other examples, the selected wavelengths dropped/added at the second signal access enclosure 1050*b* are the same as the selected wavelengths dropped/added at the first signal access enclosure 1050*a* as will be disclosed in further detail herein with respect to FIG. 49.

A third feeder cable F3 optically couples the first output 1054*a* of the second signal access enclosure 1050*b* to the first input 1052*a* of a third signal access enclosure 1050*c*. Optical signals of selected wavelengths are dropped and/or added at the third signal access enclosure 1050*c* via respective access ports 1056. A fourth feeder cable F4 optically couples the first output 1054*a* of the third signal access enclosure 1050*c* to the first input 1052*a* of a fourth signal access enclosure 1050*d*. Optical signals of selected wavelengths are dropped and/or added at the fourth signal access enclosure 1050*d* via respective access ports 1056.

Figure 46:
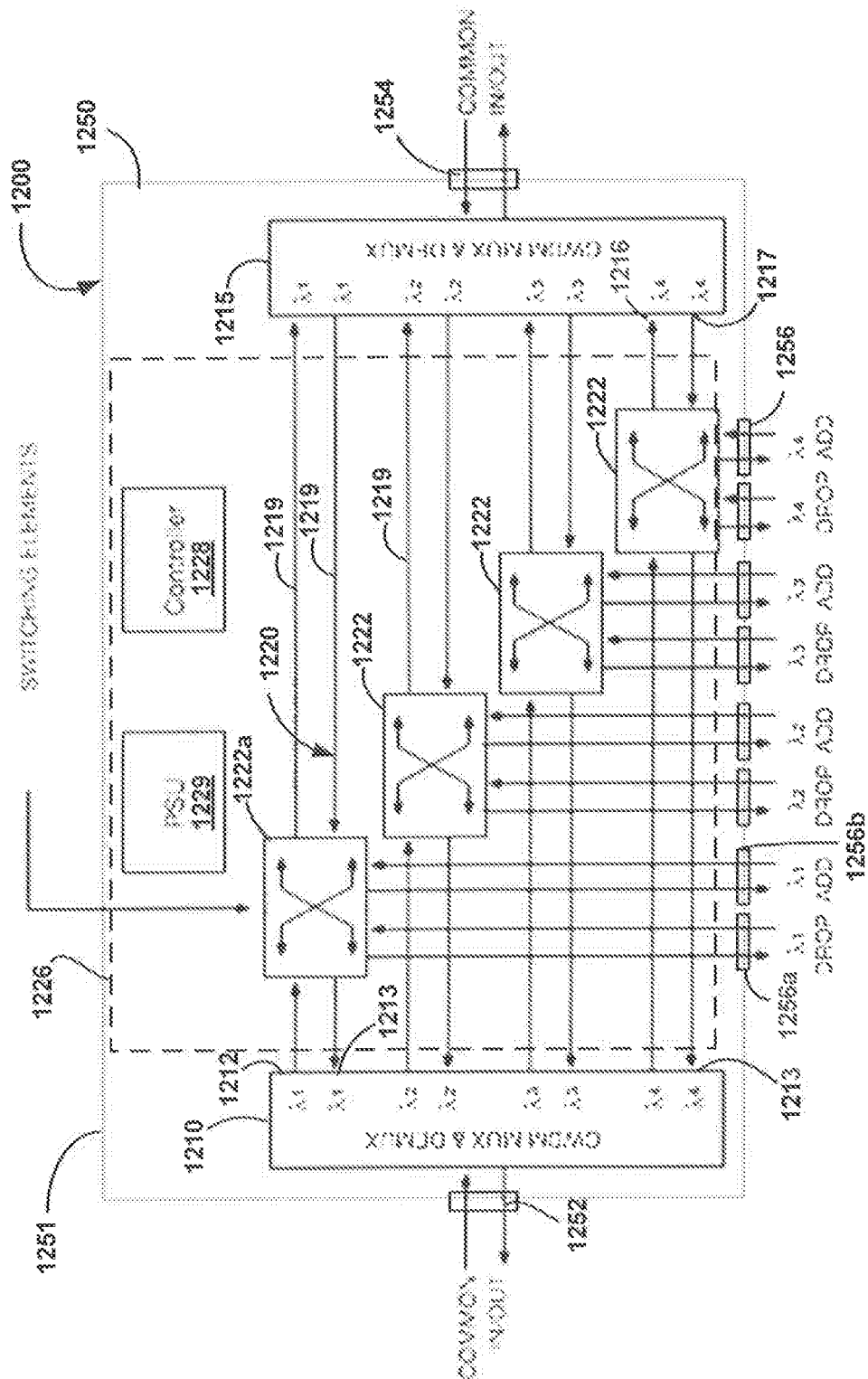
FIG. 46 illustrates another example signal access enclosure including two multiplexer/demultiplexer units.

FIG. 46 illustrates another example signal access enclosure 1250 having a first main port 1252, a second main port 1254, and one or more access ports 1256. In certain implementations, the signal access enclosure 1250 includes a body 1251 defining a sealed interior. In certain implementations, the first main port 1252, the second main port 1254, and the access ports 1256 are ruggedized (e.g., environmentally sealed at least when a cable or plug is received). In certain implementations, the first and second main ports 1252, 1254 are configured to receive optical signals carried in a first direction and optical signals carried in a second, reverse direction. For example, the first and second main ports 1252, 1254 may each receive first and second optical lines.

The signal access enclosure 1250 includes a first multiplexer/demultiplexer (mux&demux) unit 1210 and a second mux&demux unit 1215. A plurality of channels 1219 extend between the first and second mux&demux units 1210, 1215. The first mux&demux unit 1210 is optically coupled to the first main port 1252 and the second mux&demux unit 1215 is optically coupled to the second main port 1254. Each mux&demux unit 1210, 1215 is configured to separate optical signals received at the respective main port 1252, 1254 by wavelength onto the respective channel outputs 1212, 1217. Each mux&demux unit 1210, 1215 also is configured to combine optical signals received at the respective channel inputs 1213, 1216 and to direct the combined signal to the respective main port 1252, 1254. Each channel 1219 extends either between one of the channel inputs 1213 of the first mux&demux unit 1210 and one of the channel outputs 1217 of the second mux&demux unit 1215 or between one of the channel outputs 1212 of the first mux&demux unit 1210 and one of the channel inputs 1216 of the second mux&demux unit 1215.

A switching arrangement 1220 is disposed between the first and second mux&demux units 1210, 1215. The switching arrangement 1220 includes a plurality of switches 1222. In certain implementations, the switching arrangement 1220 is mounted to a substrate (e.g., a circuit board) with a controller 1228. A power supply 1229 also can be mounted to the substrate to power the controller 1228 and/or the switch arrangement 1220. The controller 1228 transitions each switch 1222 of the switch arrangement 1220 between first and second configurations to determine which channels 1219 are optically coupled to the access ports 1256.

In some implementations, each channel 1219 has a separate switch 1222 capable of optically coupling the channel 1219 to one of the access ports 1256. In other implementations, each channel input 1213, 1216 is paired with a channel output 1212, 1217 of the same mux&demux unit so that both channels 1219 in the pair are associated with a common wavelength or wavelength band. In some such implementations, each switch 1222 is capable of optically coupling each pair of channels 1219 to one or two access ports 1256. In an example, each switch 1222 is capable of optically coupling a first channel 1219 in the pair to a drop port 1256 and a second channel 1219 in the pair to an add port 1256.

For example, in FIG. 46, a first switch 1222a is optically coupled to a first channel input 1213 and a first channel output 1212 of the first mux&demux unit 1210. The first switch 1222a also is optically coupled to a first channel input 1216 and a first channel output 1217 of the second mux&demux unit 1215. The first switch 1222a also is optically coupled to a first access port 1256a and a second access port 1256b. In certain examples, the first switch 1222a can be transitioned to a first configuration in which the first channel output 1212 of the first mux&demux unit 1210 is optically coupled to the first channel input 1216 of the second mux&demux unit 1215 and the first channel output 1217 of the second mux&demux unit 1215 is optically coupled to the first channel input 1213 of the first mux&demux unit 1210. The first switch 1222a also can be transitioned to a second configuration in which the first channel output 1212 of the first mux&demux unit 1210 is optically coupled to a transmit line of a first access port 1256a and the first channel input 1216 of the second mux&demux unit 1215 is optically coupled to a receive line of the first access port 1256a. In certain examples, the first channel output 1217 of the second mux&demux unit 1215 is optically coupled to a transmit line of a second access port 1256b and the first channel input 1213 of the first mux&demux unit 1210 is optically coupled to a receive line of the second access port 1256b.

Figure 47:
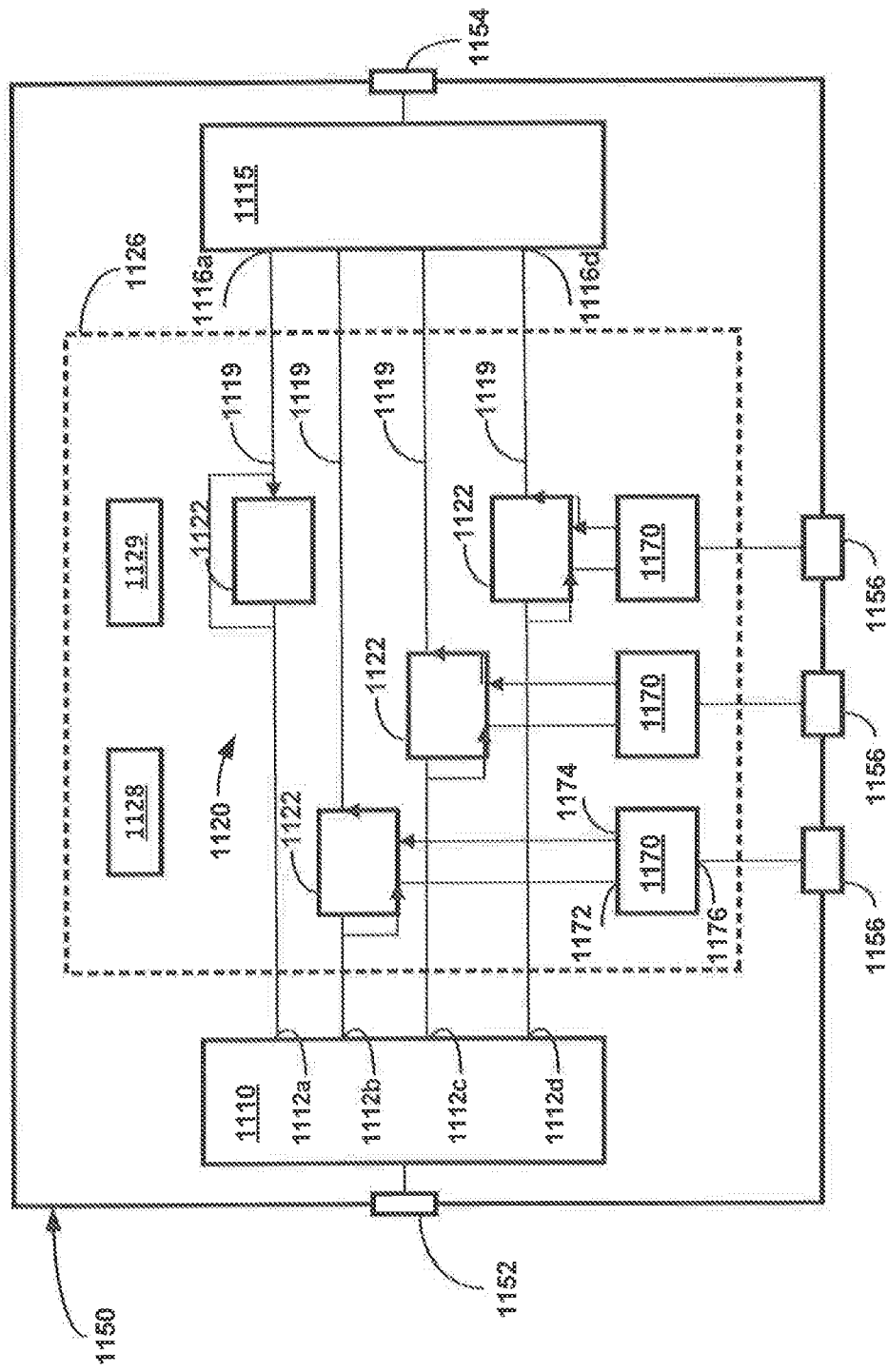
FIG. 47 illustrates how optical taps can be added to the access ports of any of the signal access enclosures described herein.

FIG. 47 illustrates another example signal access enclosure 1150 having a first main port 1152, a second main port 1154, and one or more access ports 1156. In certain implementations, the signal access enclosure 1150 includes a body 1151 defining a sealed interior. In certain implementations, the first main port 1152, the second main port 1154, and the access ports 1156 are ruggedized. In certain implementations, the first and second main ports 1152, 1154 are configured to receive optical signals carried in a first direction and optical signals carried in a second, reverse direction.

The signal access enclosure 1150 includes a first mux&demux unit 1110 and a second mux&demux unit 1115. A plurality of channels 1119 extend between the first and second mux&demux units 1110, 1115. In certain examples, the mux&demux units 1110, 1115 are substantially the same as the mux&demux units 1210, 1215 of FIG. 46. However, FIG. 47 shows fewer channels 1119 for ease in viewing. It will be understood, however, that the signal access enclosure 1150 can have a greater or lesser number of channels 1119 than what is shown in FIG. 47.

A switching arrangement 1120 is disposed between the first and second mux&demux units 1110, 1115. The switching arrangement 1120 includes a plurality of switches 1122. In certain implementations, the switching arrangement 1120 is mounted to a substrate (e.g., a circuit board) with a controller 1128. A power supply 1129 also can be mounted to the substrate to power the controller 1128 and/or the switch arrangement 1120. The controller 1128 transitions each switch 1122 of the switch arrangement 1120 between first and second configurations to determine which channels 1119 are optically coupled to the access ports 1156.

The signal access enclosure 1150 includes a plurality of optical taps 1170 disposed between the switches 1122 and the access ports 1056. Each optical tap 1170 having a tap input 1172, a first tap output 1174, and a second tap output 1176. The optical tap 1170 directs part of an optical signal received at the tap input 1172 to the first tap output 1174 and directs another part of the optical signal to the second tap output 1176. The second part has less power than the first part. The second tap output 1176 of each tap 1170 is directed to one of the access ports 1156.

When disposed in a first configuration, a switch 1122 optically couples together a channel input and a channel output of the first and second mux&demux units 1110, 1115. When disposed in a second configuration, the switch 1122 optically couples a channel output of one of the mux&demux units 1110, 1115 to the tap input 1172 of one of the optical taps 1170. The optical tap 1170 directs a small portion of the optical signals from the channel output to the access port 1156 (e.g., to a transmit line of the access port). The switch 1122 also may optically couple the first tap output 1174 of the optical tap 1170 to the corresponding channel input of the other of the mux&demux units 1110, 1115.

In FIG. 47, only channel outputs 1112 of the first mux&demux unit 1110 and channel inputs 1116 of the second mux&demux unit 1115 are shown for clarity. Accordingly, in FIG. 47, only optical signals carried through the first mux&demux unit 1110 are directed to the access ports 1156. It will be understood, however, that each of the mux&demux units 1110, 1115 may have both channel inputs and channel outputs. It also will be understood that optical signals from one or more output channels of the second mux&demux unit 1115 also may be tapped off and directed to one or more of the access ports 1156.

FIGS. 48-51 illustrate examples of modules 1300, 1320 that can define or otherwise be connected to the access ports 1156. The modules 1300, 1320 each have a first connection interface designed to optically couple to the access lines 1006 of the signal access units or otherwise receive signals from the channels 1119, 1219 of the signal access enclosures 1150, 1250. The first connection interface is designed to send or receive optical signals at a particular wavelength.

The modules 1300, 1320 also have a second connection interface that is configured to receive a connectorized end of a cable to be connected to the access port 1156. The second connection interface of some types of modules 1300 is not configured to send or receive optical signals at a particular wavelength. The modules 1300 are configured to convert signals between the first and second connection interfaces. In some examples, the second connection interface of a module 1300 is an electrical connector interface. In other examples, the second connection interface of a module 1300 is an optical connector interface that is not restricted to a single wavelength or wavelength band. The second connection interface of other types of modules 1320 may also be designed to send or receive optical signals at a particular wavelength.

Figure 48:
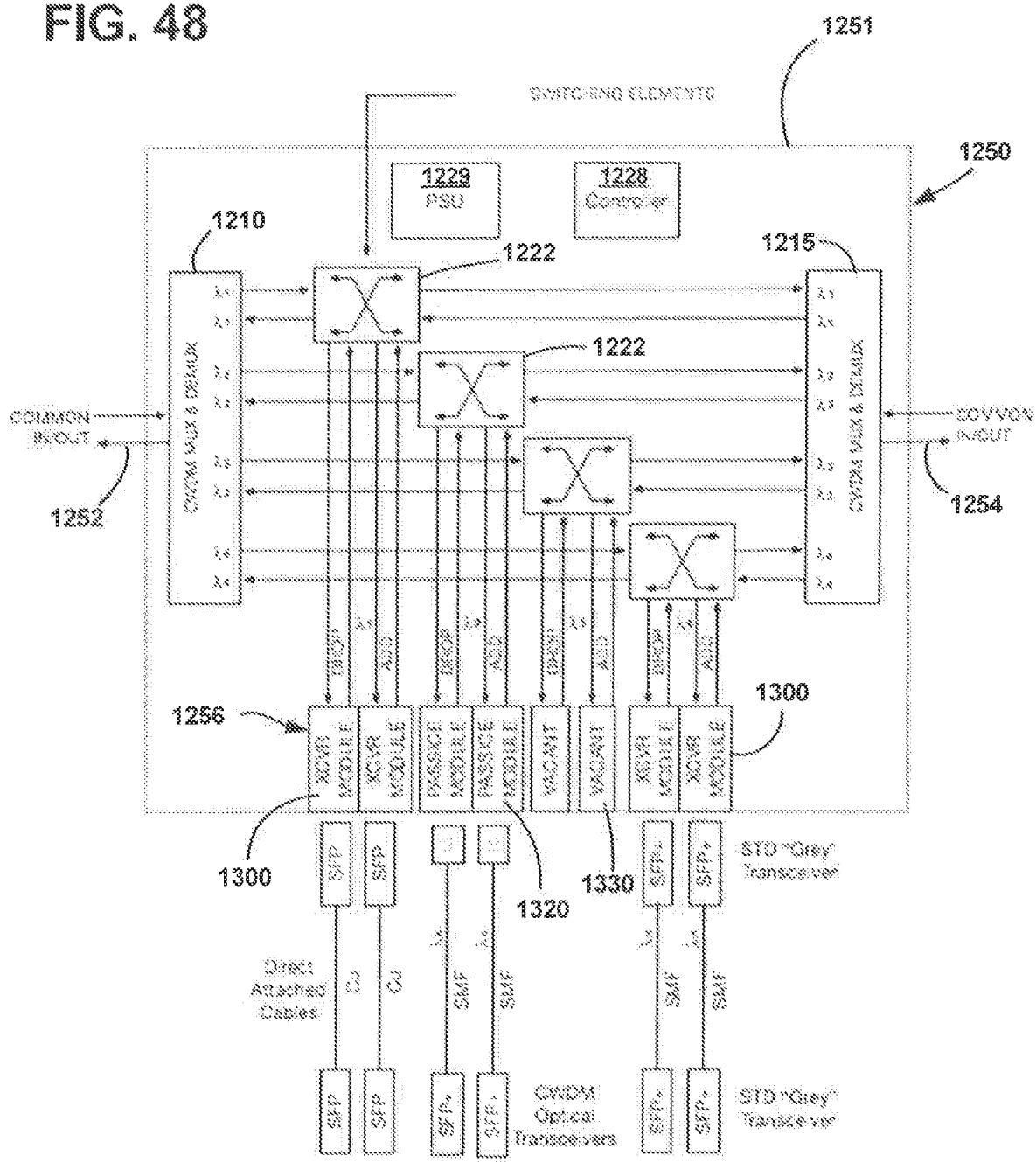
FIG. 48 illustrates how various interface modules can be added to the access ports of any of the signal access enclosures described herein.

In certain implementations, the signal access enclosure 1050, 1150, 1250 define slots 1330 at which one or more modules 1300, 1320 may be disposed (see FIG. 48). In some examples, the modules 1300, 1320 may be installable at the slots 1330 in the field. For example, the modules 1300, 1320 may have a plug-and-play type connection to the enclosure body 1051, 1151, 1251. In other examples, the modules 1300, 1320 are pre-installed in the factory.

Figure 49:
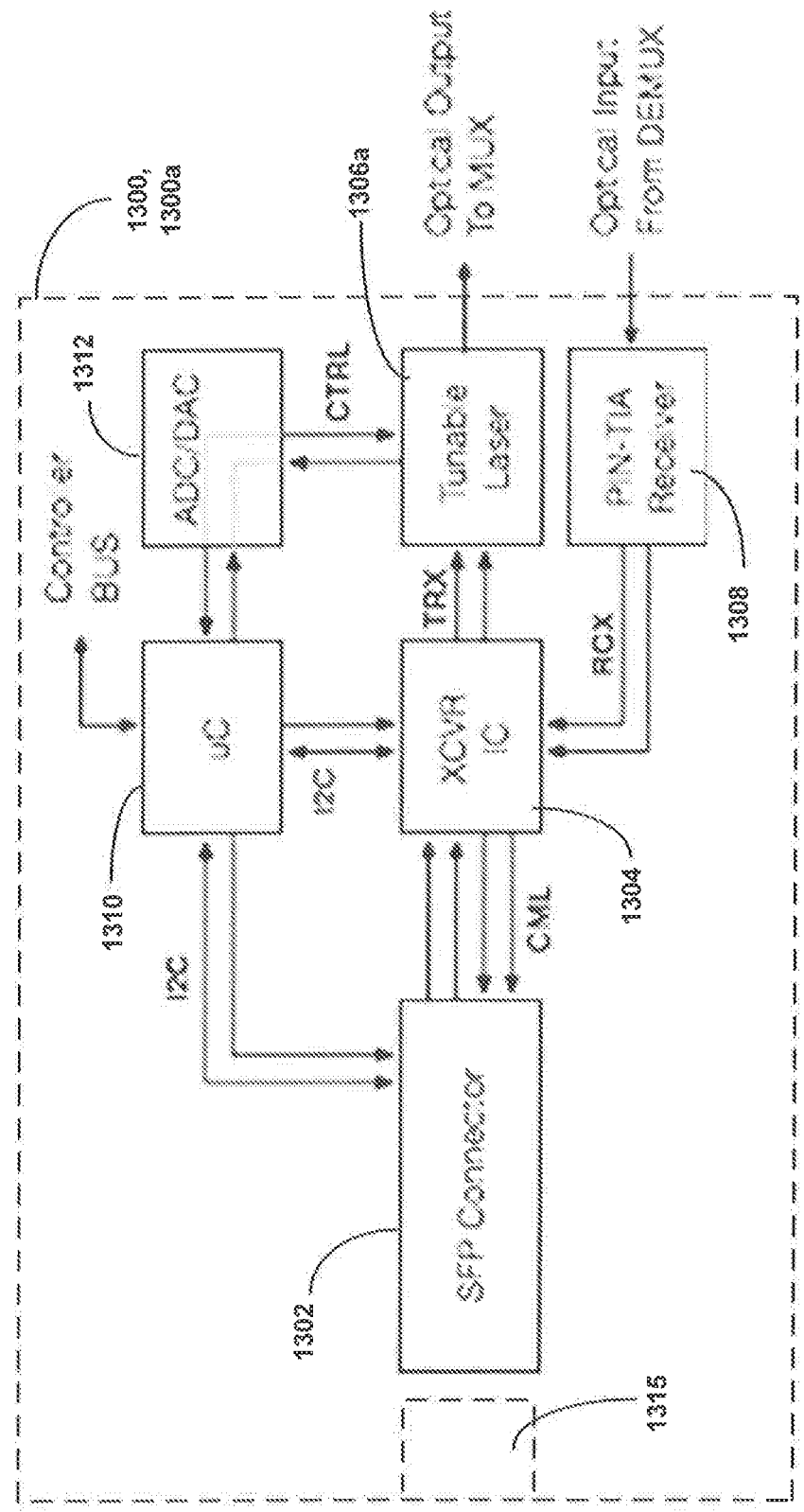
FIG. 49 illustrates a first example interface module of FIG. 48.
Figure 50:
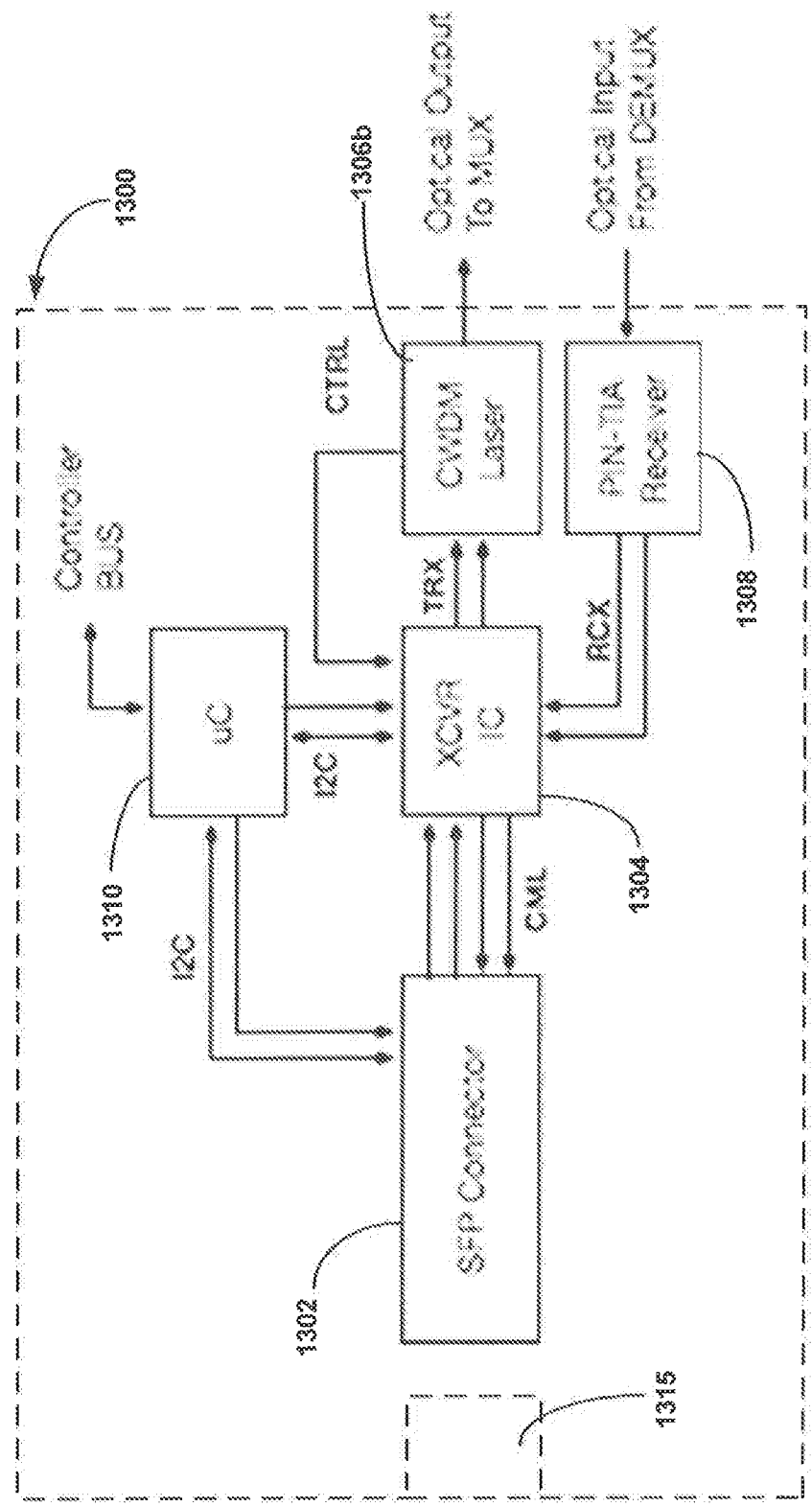
FIG. 50 illustrates a second example interface module of FIG. 48.

FIGS. 49 and 50 illustrates modules 1300A, 1300B that converts signals between first and second connection interfaces. Each module 1300A, 1300B defines a port 1315 at which a connectorized end of a cable can be received. Each module 1300A, 1300B also includes a connector (e.g., an SFP connector) configured to receive electrical signals from the connectorized end received at the port 1315. For example, the port 1315 can have an SFP interface so that a DAC or SFP+ transceiver can be received. Each module 1300A, 1300B also includes an integrated circuit 1304 or other converter that translates between electrical signals and optical signals.

In some examples, the electrical signals include a transmit signal and a receive signal. Each module 1300A, 1300B includes a receiver 1308 (e.g., a PIN-TIA receiver) that receives an optical signal at a particular wavelength or wavelength band. The receiver 1308 optically couples to the line of the access port that is optically coupled to the channel output of the demultiplexer or mux&demux unit.

The first module 1300A includes a tunable laser 1306A that outputs the converted optical signal at a particular wavelength or wavelength band. The output of the laser 1306A is optically coupled to the line of the access port that is optically coupled to the channel input of a multiplexer or mux&demux unit. Using a tunable laser 1306A enables identical module 1300A to be placed at various access ports of the signal access enclosure. Each module 1300A can be tuned to the wavelength selected for the access port. A controller 1310 and analog/digital converter 1312 cooperate to keep the laser on the correct wavelength and amplitude.

The second module 1300B includes a CWDM laser 1306B that outputs optical signals at a particular wavelength band or wavelength. Accordingly, the laser 1306B in each second module 1300B would need to be selected to match the wavelength or wavelength band associated with the respective access port. The output of the laser 1306B is optically coupled to the line of the access port that is optically coupled to the channel input of a multiplexer or mux&demux unit.

Figure 51:
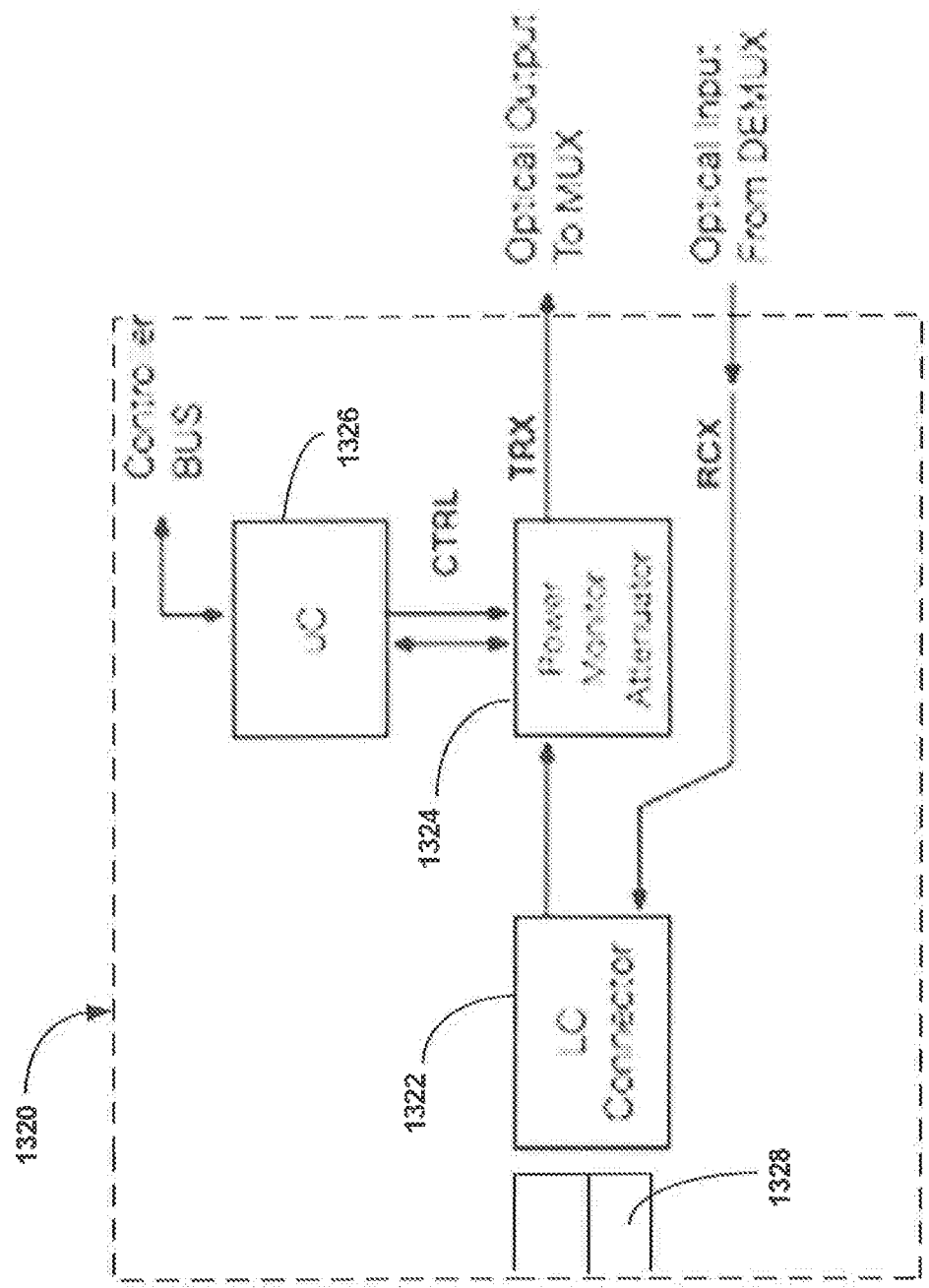
FIG. 51 illustrates a third example interface module of FIG. 48.

FIG. 51 illustrates a module 1320 that passively monitors and applies attenuation as required but otherwise does not convert the signals between the first and second connection interfaces. The module 1320 defines a port 1328 at which a connectorized end of a cable can be received. The module 1320 also includes a connector 1322 (e.g., a duplex LC connector) configured to receive optical signals from the connectorized end received at the port 1328. For example, the port 1328 can have a duplex LC connector interface. The module 1320 directly connects the connector 1322 to the access port. For example, the module 1320 may connect a first LC plug connector of the duplex LC connector 1322 to the line of the access port coupled to the channel output line of a demultiplexer or mux&demux unit. In certain examples, the module 1320 includes a power monitor attenuator 1324 that attenuates the power of a signal obtained from the connector 1322 (e.g., from a second LC plug connector of the duplex LC connector 1322). The attenuated signal is supplied to the line of the access port that optically couples to the input of a multiplexer or mux&demux unit. The module 1320 may include a controller (e.g., a microcontroller) to manage the attenuator 1324.

VIII. Examples

Illustrative examples of devices, arrangements, systems and architectures of the present disclosure are provided below.

Example 1

A fiber optic device including: a fiber optic cable having pre-manufactured breakout locations integrated with the fiber optic cable prior to deployment of the fiber optic cable, the fiber optic cable having a plurality of optical fibers that extend through a length of the fiber optic cable, the breakout locations including optical switches or optically coupling the optical fibers of the fiber optic cable to access locations.

Example 2

The fiber optic device of Example 1, wherein the breakout locations are sealed by overmolds in which the optical switches are contained.

Example 3

The fiber optic device of any of Examples 1-2, wherein at a given one of the breakout location, switches are provided for allowing the access location to be coupled to different ones of the optical fibers of the fiber optic cable dependent upon a configuration of the switches.

Example 4

The fiber optic device of any of Examples 1-3, wherein each of the breakout location includes a switch matrix.

Example 5

A fiber optic device including: a network enclosure including a fiber distribution hub or an environmentally sealed terminal with hardened ports or an environmentally sealed splice enclosure, or an environmentally sealed optical tap device or an environmentally sealed optical splitting device or an environmentally sealed wavelength division multi-plexing or de-multi-plexing device or a fiber break-out enclosure; and an optical switch incorporated within the network enclosure.

Example 6

The fiber optic device of Example 5, further comprising optical input and optical outputs within the network enclosure, wherein the switch includes a switch matrix for switching between the optical inputs and the optical outputs.

Example 7

The fiber optic device of any of Examples 5 and 6, further comprising optical input and optical outputs within the network enclosure, wherein the switch includes a switch matrix for cross-switching between the optical inputs.

Example 8

The fiber optic device of any of Examples 5-7, further comprising optical input and optical outputs within the network enclosure, wherein the switch includes a switch matrix for cross-switching between the optical outputs.

Example 9

The fiber optic device of any of Examples 5-8, further comprising optical input and optical outputs within the network enclosure, wherein the switch includes a switch matrix for selectively coupling at least one of the optical inputs to at least one of the optical outputs when in a first switch state, and for coupling the at least one optical input to at least one optical drop location when in a second switch state.

Example 10

The fiber optic device of any of Examples 5-9, further comprising optical input and optical outputs within the network enclosure, wherein the switch includes a switch matrix for selectively coupling at least one of the optical outputs to at least one of the optical inputs when in a first switch state, and for coupling the at least one optical output to at least one optical drop location when in a second switch state.

Example 11

The fiber optic device of any of Examples 5-10, wherein the drop access location includes a hardened demateable fiber optic connection location.

Example 12

The fiber optic device of Example 11, wherein the hardened demateable fiber optic connection location is adapted to mate in a sealed manner with a hardened fiber optic connector.

Example 13

The fiber optic device of any of Examples 10 and 11, wherein the hardened demateable fiber optic connection location includes a threaded connection interface adapted to mate with a mechanical coupler of the corresponding fiber optic connector adapted to mate with the demateable fiber optic connection location.

Example 14

The fiber optic device of any of Examples 1-13, wherein the switch is part of a block switching arrangement.

Example 15

The fiber optic device of any of Examples 1-14, wherein the switch is part of a loop-back switching arrangement.

Example 16

A fiber optic device including: a network enclosure; and an optical switch matrix incorporated within the network enclosure, the optical switch matrix including optical inputs, optical outputs and optical drop locations, and wherein the switch matrix couples at least one of the optical inputs to at least one of the optical outputs when in a first switch state, and couples the at least one optical input to at least one optical drop location when in a second switch state.

Example 17

The fiber optic device of any of Example 1-16, wherein the network enclosure is environmentally sealed and includes at least one hardened demateable connection location accessible from outside the network enclosure.

Example 18

The fiber optic device of Example 17, wherein the hardened demateable connection location corresponds to an optical drop access location.

Example 19

The fiber optic device of any of Examples 17 and 18, wherein the hardened demateable fiber optic connection location is adapted to mate in a sealed manner with a hardened fiber optic connector.

Example 20

The fiber optic device of any of Examples 17-19, wherein the hardened demateable fiber optic connection location includes a threaded connection interface adapted to mate with a mechanical coupler of the corresponding fiber optic connector adapted to mate with the demateable fiber optic connection location.

Example 21

A network architecture including: a network center and a network edge; and switching architecture for optically connecting two locations at the network edge without passing through the network center.

Example 22

A fiber optic device including: a switching matrix for switching between inputs locations and output locations of the switching matrix; and a module that can selectively be coupled to the switching matrix, the module including an optical power splitting module or a wavelength division multiplexing or demultiplexing module.

Example 23

A fiber optic device including: a first switching matrix for switching between inputs locations and output locations of the first switching matrix; a second switching matrix for switching between inputs locations and output locations of the second switching matrix; a first passive optical power splitter coupled between the output locations of the first switching matrix and the input locations of the second switching matrix; a second passive optical power splitter coupled between the output locations of the first switching matrix and the input locations of the second switching matrix, the first and second optical power splitters having different split ratios; and a wavelength division de-multiplexing device coupled between the output locations of the first switching matrix and the input locations of the second switching matrix.

Example 24

The fiber optic device of any of Examples 1-23, wherein the switches include total internal reflection optical switches, adiabatic optical switches or micro electromechanical optical switches.

The present invention relates to reconfigurable fiber optic network systems. The systems allow for the possibility to place switches and reconfigurable splitters in the edge/access network, which current switching technologies do not allow because of power consumption and device cost.

Various devices can be utilized with respect to the switches and/or splitters including silicon photonics and micro mechanics technologies. Various optical cells form the building blocks to create the optical circuit made up of one or more optical cells placed on a single chip.

As shown in FIGS. 13-18, various application circuits are shown including:
1. NXN switch
2. Wavelength dependent NXN switch
3. Block switching
4. Splitter with a programmable split ratio
5. Splitter with a programmable power split ratio
6. A combined switch and splitter.

The reconfigurable networks of the present invention include an overall system, telecommunications equipment, switches, splitters, and power and/or data delivery.

An overall system for a reconfigurable network can include one of more of the following features:
1. Power delivery.
   a. RF Harvesting.
   b. Light harvesting.
   c. Inductive power transfer with a handheld device that can also transmit data.
   d. Combine any form of power harvesting for powering an optical switch.
2. Add thin conductors to fiber cables for low power delivery combined with data.
3. A technician has a tool that will configure the switch in the closure. This facilitates a fully remotely reconfigurable network.
4. Integrate the functionality in a mobile phone.
5. Device includes GPS to provide network design information while the technician is in the field.
6. Lifi communication e.g. integrated in a torch/flashlight.
7. Data transmission over fiber:
   a. Separate wavelength.
   b. Time division multiplexing.
   c. Separate phase.
   d. Low frequency amplitude overmodulation of the GPON (Giga-bit Capable Passive Optical Network) signal.
8. Closure that cannot be reopened and that contains an optical switch.
9. A cable with 1000 fibers with a reconfigurable switch every 1-2 km so that the cable can be reconfigured.
10. Programmable FlexNap (pre-engineered, factory manufactured break-out cable).
11. GPON street cabinet replacement—A cabinet being replaced by a much smaller housing including the optical switch.
12. Load balancing and capacity optimization over time and space.
13. GPON programmable terminal.
14. Nimble fiber indexing (Terminal & Hub).
15. GPON—Software Tunable optical taps.

Various applications of reconfigurable networks are described below including the structural features and advantages over prior technologies.
1. GPON—Street Cabinet Replacement
   Replacement of street cabinet by Optical Switch & Splitter
      Feed from F1 (main trunk) fibers
      Splitting of F1 fiber
      Feed F2 (fiber closer to the edge)Fiber
   Switch function included
      Only feeding connected F2 fibers
      Maximize usage of splitter outputs
   Split function depends on architecture
      Fixed split for centralized splitter architecture
      Programmable split ratio in distributed split allows further optimization of network resource usage
   Reduced FDH size
      Going from Street Cab to (potentially buried) enclosure
      Reduces real estate and installation cost
   Reduce Central Office/Data Center cost
      Less active equipment (Utilization Rate optimization)
      Reduced energy consumption and floor space
   No more Outside Plant patching
      Reduced Operating Expense
      Faster customer turnup
      No patching mistakes
      No documentation issues
2. GPON—Programmable Terminal
   Configurable terminal
      Fixed # outputs
      Includes Switch
      Includes programmable splitter
      Dynamic output ports assignment
   Distributed Split
      Adapt terminal split ratio to match actual number of active users
      Adapt hub split ratio accordingly
   Network Convergence
      Dynamically decide to assign drop port to Point-to-Point (P2P) or Splitter Output
      Use only required number of F2 fibers required by take rate
      Reconfigure terminal after installation as needed to support deployment
   Wavelength Selective Terminal for NGPON 2
      Only send end user wavelength to corresponding drop
      Especially useful for multi-operator context with operator-specific wavelength
   Flexibility & Speed
      Dynamically decide to assign drop port to P2P or Splitter
      Instant reconfiguration
   Reduce Central Office/Data Center cost
      Less active equipment (Utilization Rate optimization) especially in multi-operator NGPON-2 context
      Reduced energy consumption and floor space
   Capex Optimization
      No need to over-dimension network to support several scenarios
      Optimize usage of network resources
      Single product reference
3. Converged Networks—Nimble Fiber Indexing (Terminal and Hub)
   Nimble Fiber Indexing Terminal Dynamically decide on # of indexed fibers
Includes Switch to index and to branch off fibers
Includes programmable splitter for GPON outputs
Can be combined with drop terminal to increase port capacity Switch & Split in FDH
  Adapt split ratio on specific fibers to actual terminal split ratio
  P2P connection to feed P2P fiber
Flexibility & Speed
  Dynamically decide to assign drop port to P2P or Splitter
  Instant reconfiguration
  Add capacity later as needed with a drop terminal
Manufacturing and stock management
  One single product reference for all indexing variants
  Value for customers: less SKUs to keep on stock
Network Optimization
  No need to over-dimension network to support several scenarios
  Optimize usage of network resources
  Optimize reach of fiber indexing chains
4. GPON—Software Tunable Optical Taps
  Current application
    Tap=Asymmetric 1:2 splitter
    Provides just enough signal strength to the drop
    Ideally requires a different power split ratio at every tap
    In practice, limited set of power split ratios available
    Popular architecture for US MSO (similar to coax arch)
  Tunable solution
    One single tap product with programmable power split
    Can be configured by technician at installation (no power required at tap)
    Can be configured remotely/SW controlled (tap powering mechanism required)
  Manufacturing and stock management
    One single product reference for all taps
    Value for customers: less SKUs (stock keeping unit) to keep on stock Network Optimization
    Actual power split can be set to theoretical optimum
    Optimize usage of network resources
    Optimize reach of fiber network
5. FTTH (fiber to the home) line testing from CO (central office)
  GPON—CO OTDR (optical time domain reflectometer) trace drop not visible
    Behind 1:64 split
    Trace buried in background noise and mixed with other drops
  Switch solution
    Embed switches in every splitter location
    Focus light on the path of the line under test while testing
    Ensure end to end line visibility
    Wavelength-selective switch to re-configure only test wavelength
  Reduced Operating Expense
    Directly identify if customer problem is linked to fiber problem or not
    Directly identify in which part of the network the optical fault is located
    Spend less money and time detecting and fixing network problems
  Quality of Service Optimization
    Reduced downtime
    Network condition known at all times
    Preventive maintenance possible
6. Core Network—Wavelength Selective Switching
7. Data Center—Block Switching for UHDR applications
  For the switches and/or splitters, power maybe needed to change states, for example. Bringing control data and power to the switch maybe include:
    Reconfigurable switches require (limited) power to change their optical function
    Power must be made available to the device while it performs configuration change
    Reconfigurable switches may require a data link
      Downstream to know in which state to configure themselves
      Possibly upstream to inform the network of the state they are in (polling)
    Several concepts can be used to provide energy and data
      Power: light from fiber, light from sun, RF radiations, battery
      Data: through fiber, wireless, electrical
    Data and energy must be locally managed on the device
      Need for power management, possibly power storage (DC/DC, Supercap, battery.)
      Need for communication integrated circuit (also consuming power) and microcontroller The following patent applications are herein fully incorporated by reference for use in optical fiber signal transmission and/or switching of optical switches:

| Serial No. | Filing Date | Title |
| --- | --- | --- |
| PCT/EP2015/080617 | Dec. 18, 2015 | INTEGRATED OPTICAL SWITCHING AND SPLITTING FOR OPTICAL NETWORKS |
| PCT/EP2016/066976 | Jul. 15, 2016 | OPTICAL FIBER AND WAVEGUIDE DEVICES HAVING EXPANDED BEAM COUPLING |
| PCT/EP2016/053265 | Feb. 16, 2016 | REMOTE CONTROL AND POWER SUPPLY FOR OPTICAL NETWORKS |
| PCT/EP2017/052475 | Feb. 3, 2017 | APPARATUS FOR MONITORING FIBER SIGNAL TRAFFIC AT A FIBER CONNECTOR |
| PCT/EP2016/075475 | Oct. 21, 2016 | INTEGRATED OPTICAL SWITCHING AND SPLITTING FOR TROUBLESHOOTING IN OPTICAL NETWORKS |
| PCT/EP2017/052476 | Feb. 3, 2017 | REMOTELY SWITCHABLE INDEXING IN OPTICAL NETWORKS |
| PCT/EP2017/052477 | Feb. 3, 2017 | INTEGRATED OPTICAL SWITCHES USING DEUTERATED LIQUIDS FOR INCREASED BANDWIDTH |
| PCT/EP2017/060588 | May 3, 2017 | INTEGRATED OPTICAL SWITCH NETWORK WITH HIGH PERFORMANCE |

-continued

| Serial No. | Filing Date | Title |
|---|---|---|
| U.S. application Ser. No. 62/393,463 | Sep. 12, 2016 | AND COMPACT CONFIGURATION LIQUIDS FOR USE WITH ELECTRO-WETTING ON DIELECTRIC ACTIVE OPTICAL SWITCH |
| U.S. application Ser. No. 62/393,473 | Sep. 12, 2016 | ACTIVE OPTICAL SWITCH SYSTEM WITH ANTI-WETTING COATING |
| U.S. application Ser. No. 62/441,011 | Dec. 30, 2016 | ELECTRO-WETTING ON DIELECTRIC (EWOD) ACTIVATED OPTICAL SWITCH USING CAPILLARY LIQUID CONTROL |
| U.S. application Ser. No. 62/447,251 | Jan. 17, 2017 | METHODS FOR COUPLING OPTICAL FIBERS TO OPTICAL CHIPS WITH HIGH YIELD AND LOW-LOSS |
| U.S. application Ser. No. 62/512,286 | May 30, 2017 | ACTIVE OPTICAL SWITCH SYSTEM WITH SIMULTANEOUSLY ACTIVATED ELECTRO-WETTING ON DIELECTRIC OPTICAL SWITCHES |

What is claimed is:

1. A signal access unit comprising:
an input;
an output;
an access port;
a switch arrangement including a switch that is optically coupled to the input, the output, and the access port, the switch being configured to transition between a first configuration and a second configuration, the switch optically coupling the input to the output and not to the access port when in the first configuration, and the switch optically coupling the access port to at least one of the input and the output without optically coupling the input and the output together when in the second configuration;
a controller configured to receive an indication of a selected wavelength and to operate the switch arrangement to change the switch between the first and second configurations based on the indication of the selected wavelength; and
an optical tap disposed between the switch and the access port, the optical tap having a tap input, a first tap output, and a second tap output, the tap input being optically coupled to the input, the first tap output being optically coupled to the output, and the second tap output being optically coupled to the access port, the optical tap directing a first part of an optical signal received at the tap input to the first tap output and directing a second part of the optical signal to the second tap output, the second part being less than the first part.

2. The signal access unit of claim 1, further comprising:
a demultiplexer coupled to the input, the demultiplexer being configured to separate optical signals received at the input onto a plurality of demultiplexer outputs based on wavelength; and
a multiplexer coupled to the output, the multiplexer being configured to combine optical signals received at a plurality of multiplexer inputs and to direct the combined signal to the output;
wherein the switch optically couples to the input via at least one of the demultiplexer outputs and optically couples to the output via at least one of the multiplexer inputs.

3. The signal access unit of claim 1, wherein the access port is one of a plurality of access ports; wherein the switch of the switch arrangement is one of a plurality of switches, each of the switches being optically coupled to the input, the output, and one of the access ports.

4. The signal access unit of claim 3, wherein the switches include adiabatic switches.

5. The signal access unit of claim 3, wherein the switches include total internal reflection (TIR) switches.

6. The signal access unit of claim 3, wherein each of the switches is optically coupled to the input via at least one of the demultiplexer outputs and optically coupled to the output via at least one of the multiplexer inputs.

7. The signal access unit of claim 6, wherein each switch is optically coupled to a respective one of the demultiplexer outputs and a respective one of the multiplexer inputs.

8. The signal access unit of claim 6, wherein each switch is optically coupled to a plurality of the demultiplexer outputs and a plurality of the multiplexer inputs.

9. The signal access unit of claim 2, wherein the access port is a drop port, and wherein the switch optically couples the drop port to the input.

10. The signal access unit of claim 9, wherein the switch arrangement can be configured to optically couple the drop port to any of the demultiplexer outputs, optionally via the optical tap.

11. The signal access unit of claim 9, wherein the switch arrangement can be configured to optically couple the drop port to less than all of the demultiplexer outputs, optionally via the optical tap.

12. The signal access unit of claim 2, wherein the access port is an add port, and wherein the switch optically couples the add port to the output.

13. The signal access unit of claim 12, wherein the switch arrangement can be configured to optically couple the add port to any of the multiplexer inputs.

14. The signal access unit of claim 12, wherein the switch arrangement can be configured to optically couple the add port to less than all of the multiplexer inputs.

15. The signal access unit of claim 1, further comprising a plug-in module at the access port, the plug-in module configured to receive a WDM optical transceiver, the plug-in module also defining a plug port to receive a non-WDM optical transceiver, and the plug-in module being configured to convert signals between the non-WDM optical transceiver and the WDM optical transceiver.

16. The signal access unit of claim 15, wherein the non-WDM optical transceiver is a standard optical transceiver.

17. The signal access unit of claim 15, wherein the non-WDM optical transceiver is an electrical connector.

18. The signal access unit of claim 17, wherein the electrical connector is an SFP connector.

19. The signal access unit of claim 1, further comprising a body defining an environmentally sealed interior, the body including a first environmentally sealed port defining the input, a second environmentally sealed port defining the output, and a third environmentally sealed port defining the access port.

20. The signal access unit of claim 2, wherein the input is a first input, the output is a first output, the access port is a first access port, the switch arrangement is a first switch arrangement, the demultiplexer is a first demultiplexer, and the multiplexer is a first multiplexer, and wherein the signal access unit further comprises:
- a second input;
- a second output;
- a second access port; and
- a second switch arrangement including a second switch that is optically coupled to the second input, the second output, and the second access port, the second switch being configured to transition between a first configuration and a second configuration, the second switch optically coupling the second input to the second output and not to the second access port when in the first configuration, and the second switch optically coupling the second access port to at least one of the second input and the second output without optically coupling the second input and the second output together when in the second configuration.

21. The signal access unit of claim 20, wherein the controller is configured to receive a second indication of a second selected wavelength and is configured to operate the second switch arrangement to change the second switch between the first and second configurations based on the second indication of the second selected wavelength.

22. The signal access unit of claim 20, further comprising:
- a second demultiplexer coupled to the second input, the second demultiplexer being configured to separate optical signals received at the second input onto a plurality of second demultiplexer outputs based on wavelength; and
- a second multiplexer coupled to the second output, the second multiplexer being configured to combine optical signals received at a plurality of second multiplexer inputs and to direct the combined signal to the second output;
- wherein the second switch optically couples to the second input via at least one of the second demultiplexer outputs and optically couples to the second output via at least one of the second multiplexer inputs.

23. The signal access unit of claim 20, further comprising a body defining an environmentally sealed interior, the body having a plurality of environmentally sealed ports defining the first input, the second input, the first output, the second output, the first access port, and the second access port, wherein the first multiplexer, the second multiplexer, the first demultiplexer, the second demultiplexer, the first switch arrangement, and the second switch arrangement are disposed within the interior of the body.

24. The signal access unit of claim 20, wherein the second access port is one of a plurality of second access ports; and wherein the second switch of the second switch arrangement is one of a plurality of second switches, and wherein each of the second switches is optically coupled to at least one of the second access ports.

25. A signal access unit comprising:
- a body defining an input port, an output port, and a plurality of access ports;
- a demultiplexer disposed within the body, the demultiplexer having a demultiplexer input and a plurality of demultiplexer outputs, the demultiplexer input being optically coupled to the input port of the body, the demultiplexer being configured to separate optical signals received at the demultiplexer input onto the demultiplexer outputs based on wavelength;
- a multiplexer disposed within the body, the multiplexer having a plurality of multiplexer inputs and a multiplexer output, the multiplexer being configured to combine optical signals received at the plurality of multiplexer inputs onto the multiplexer output, the multiplexer output being optically coupled to the output port of the body;
- a switching arrangement disposed within the body between the demultiplexer and the multiplexer, the switching arrangement including a plurality of switches; and
- an optical circuit including a plurality of first optical lines, a plurality of second optical lines, and a plurality of third optical lines, each of the first optical lines extending from a respective one of the demultiplexer outputs to a respective one of the switches, each of the second optical lines extending from a respective one of the switches to a respective one of the multiplexer inputs, and each of the third optical lines extending from a respective one of the switches to a respective one of the access ports; and
- a plurality of optical taps, each optical tap being disposed between one of the switches of the switching arrangement and one of the access ports, each optical tap having a tap input, a first tap output, and a second tap output, each tap input being optically coupled to the input port of the body, each first tap output being optically coupled to the output port of the body, and each second tap output being optically coupled to the respective access port, each optical tap directing a first part of an optical signal received at the respective tap input to the respective first tap output and directing a second part of the optical signal to the respective second tap output, the second part being less than the first part.

26. The signal access unit of claim 25, wherein the body also defines a second input port and a second output port, and wherein the signal drop unit further comprises:
- a second demultiplexer disposed within the body, the second demultiplexer having a second demultiplexer input and a plurality of second demultiplexer outputs, the second demultiplexer input being optically coupled to the second input port of the body, the second demultiplexer being configured to separate optical signals received at the second demultiplexer input onto the second demultiplexer outputs based on wavelength;
- a second multiplexer disposed within the body, the second multiplexer having a plurality of second multiplexer inputs and a second multiplexer output, the second multiplexer being configured to combine optical signals received at the plurality of second multiplexer inputs onto the second multiplexer output, the second multiplexer output being optically coupled to the second output port of the body;

a second switching arrangement disposed within the body between the second demultiplexer and the second multiplexer, the second switching arrangement including a plurality of switches; and a second optical circuit including a plurality of first optical lines, a plurality of second optical lines, and a plurality of third optical lines, each of the first optical lines of the second optical circuit extending from a respective one of the second demultiplexer outputs to a respective one of the switches of the second switching arrangement, each of the second optical lines of the second optical circuit extending from a respective one of the switches of the second switch arrangement to a respective one of the second multiplexer inputs, and each of the third optical lines of the second optical circuit extending from a respective one of the switches of the second switching arrangement to a respective one of the access ports.

27. The signal access unit of claim 26, wherein each of the access ports receives a respective one of the third optical lines of the optical circuit and a respective one of the third optical lines of the second optical circuit.

28. The signal access unit of claim 25, further comprising:

a second demultiplexer disposed within the body, the second demultiplexer having a second demultiplexer input and a plurality of second demultiplexer outputs, the second demultiplexer input being optically coupled to the second input port of the body, the second demultiplexer being configured to separate optical signals received at the second demultiplexer input onto the second demultiplexer outputs based on wavelength;

a second multiplexer disposed within the body, the second multiplexer having a plurality of second multiplexer inputs and a second multiplexer output, the second multiplexer being configured to combine optical signals received at the plurality of second multiplexer inputs onto the second multiplexer output, the second multiplexer output being optically coupled to the second output port of the body;

a second switching arrangement disposed within the body between the second demultiplexer and the second multiplexer, the second switching arrangement including a plurality of switches;

a second optical circuit including a plurality of first optical lines, a plurality of second optical lines, and a plurality of third optical lines, each of the first optical lines of the second optical circuit extending from a respective one of the second demultiplexer outputs to a respective one of the switches of the second switching arrangement, each of the second optical lines of the second optical circuit extending from a respective one of the switches of the second switch arrangement to a respective one of the second multiplexer inputs, and each of the third optical lines of the second optical circuit extending from a respective one of the switches of the second switching arrangement to a respective one of the access ports; and a plurality of optical taps, each optical tap having a tap input, a first tap output, and a second tap output, each optical tap directing a first part of an optical signal received at the respective tap input to the respective first tap output and directing a second part of the optical signal to the respective second tap output, the second part being less than the first part, wherein the tap input of each optical tap is optically coupled to one of the third lines of one of the optical circuit and the second optical circuit, wherein the first tap output of each optical tap is optically coupled to one of the third lines of the other of the optical circuit and the second optical circuit, and wherein the second tap output of each optical tap is optically coupled to one of the access ports.

29. The signal access unit of claim 25, further comprising a plurality of plug-in modules disposed at at least some of the access ports, each of the plug-in modules being configured to convert optical signals of a specific wavelength to an electrical signal.

30. A signal access unit comprising:

a body defining a first main port, a second main port, and at least one access port;

a first multiplexer/demultiplexer unit disposed within the body, the first multiplexer/demultiplexer unit having a main line and a plurality of channel lines, the main line being optically coupled to the first main port of the body, the first multiplexer/demultiplexer unit being configured to separate optical signals received at the main line onto the channel lines by wavelength, the first multiplexer/demultiplexer unit also configured to combine optical signals received at the channel lines onto the main line;

a second multiplexer/demultiplexer unit disposed within the body, the second multiplexer/demultiplexer unit having a main line and a plurality of channel lines, the main line of the second multiplexer/demultiplexer unit being optically coupled to the second main port of the body, the second multiplexer/demultiplexer unit being configured to separate optical signals received at the respective main line onto the respective channel lines by wavelength, the second multiplexer/demultiplexer unit also configured to combine optical signals received at the respective channel lines onto the respective main line;

a switching arrangement disposed within the body between the first multiplexer/demultiplexer unit and the second multiplexer/demultiplexer unit, the switching arrangement including at least one switch configured to transition between a first configuration and a second configuration;

an optical circuit including a first optical line, a second optical line, and a third optical line, the first optical line extending from a respective one of the channel lines of the first multiplexer/demultiplexer unit to the switch, the second optical line extending from the switch to a respective one of the channel lines of the second multiplexer/demultiplexer unit, and the third optical line extending from the switch to the access port; and an optical tap disposed between the at least one switch and the at least one access port, the optical tap having a tap input, a first tap output, and a second tap output, the tap input being optically coupled to the first main port, the first tap output being optically coupled to the second main port, and the second tap output being optically coupled to the at least one access port, the optical tap directing a first part of an optical signal received at the tap input to the first tap output and directing a second part of the optical signal to the second tap output, the second part being less than the first part;

wherein the switch optically couples the first and second optical lines when in the first configuration and the switch optically couples the third optical line to at least one of the first and second optical lines when in the second configuration.

31. The signal access unit of claim 30, wherein the at least one access port is one of a plurality of access ports defined by the body, wherein the switching arrangement includes a plurality of switches, wherein the first optical line is one of a plurality of first optical lines, the second optical line is one of a plurality of second optical lines, and the third optical line is one of a plurality of third optical lines, each of the first optical lines extending from a respective one of the channel lines of the first multiplexer/demultiplexer unit to a respective one of the switches, each of the second optical lines extending from a respective one of the switches to a respective one of the channel lines of the second multiplexer/demultiplexer unit, and each of the third optical lines extending from one of the switches to one of the access ports.

32. The signal access unit of claim 30, further comprising a plurality of plug-in modules, each plug-in module being optically coupled to the access port, each plug-in module also defining a port configured to receive an electrical connector.

33. The signal access unit of claim 30, further comprising a plurality of optical taps, each optical tap having a tap input, a first tap output, and a second tap output, each optical tap directing a first part of an optical signal received at the respective tap input to the respective first tap output and directing a second part of the optical signal to the respective second tap output, the second part being less than the first part, each optical tap being disposed along the third optical line of the optical circuit so that the respective tap input receives optical signals from the switch via the third optical line, the respective first tap output outputs the first part of the optical signals to the respective access port via the third optical line, and a fourth optical line optically couples the respective second tap output to the switch, wherein the switch couples the respective fourth optical line to a respective one of the channel lines of the second multiplexer/demultiplexer unit.

34. The signal access unit of claim 30, further comprising a controller configured to receive an indication of a selected wavelength and to transition the switch between the first and second configurations based on the selected wavelength.

* * * * *